US008451209B2

(12) United States Patent
Sugino et al.

(10) Patent No.: US 8,451,209 B2
(45) Date of Patent: May 28, 2013

(54) LIQUID CRYSTAL DISPLAY DEVICE

(75) Inventors: Michiyuki Sugino, Chiba (JP); Takashi Yoshii, Chiba (JP); Toshiyuki Fujine, Tochigi (JP)

(73) Assignee: Sharp Kabushiki Kaisha, Osaka (JP)

( * ) Notice: Subject to any disclaimer, the term of this patent is extended or adjusted under 35 U.S.C. 154(b) by 1345 days.

(21) Appl. No.: 10/523,011

(22) PCT Filed: Dec. 8, 2003

(86) PCT No.: PCT/JP03/15672
§ 371 (c)(1), (2), (4) Date: Feb. 1, 2005

(87) PCT Pub. No.: WO2004/053826
PCT Pub. Date: Jun. 24, 2004

(65) Prior Publication Data

US 2005/0259064 A1 Nov. 24, 2005

(30) Foreign Application Priority Data

Dec. 6, 2002 (JP) ................................ 2002-355033
Dec. 6, 2002 (JP) ................................ 2002-355034
Feb. 3, 2003 (JP) ................................ 2003-025636

(51) Int. Cl.
*G09G 3/36* (2006.01)
*G09G 3/30* (2006.01)
*G09G 5/00* (2006.01)
*G09G 5/10* (2006.01)
*G06F 3/00* (2006.01)

(52) U.S. Cl.
USPC ................ 345/102; 345/76; 345/87; 345/89; 345/98; 345/99; 345/204; 345/690; 345/692; 725/38; 725/45

(58) Field of Classification Search
USPC ............ 345/102, 87–89, 204, 691, 211–213, 345/58, 98–100, 94, 690, 692; 725/45
See application file for complete search history.

(56) References Cited

U.S. PATENT DOCUMENTS 5,706,417 A * 1/1998 Adelson ........................ 345/640
6,115,423 A 9/2000 Shen et al.

(Continued)

FOREIGN PATENT DOCUMENTS

CN 1402211 A 3/2003
EP 1-061-499 A2 12/2000

(Continued)

OTHER PUBLICATIONS

Kurita, Taiichiro, "Degradation of Quality of Moving Images Displayed on Hold Type Displays and its Improvidng Method", IEICE Gen. Conf. Lecture Papers (1999) pp. 207-208.

*Primary Examiner* — Sumati Lefkowitz
*Assistant Examiner* — Andrew Yeretsky
(74) *Attorney, Agent, or Firm* — Birch, Stewart, Kolasch & Birch, LLP

(57) ABSTRACT

A liquid crystal display device in which a frame of the image signal to be displayed is written into a liquid crystal display panel while a backlight is activated intermittently within one frame period so as to prevent blur injury arising when displaying motion pictures includes: sections and for variably controlling the illumination duration of the backlight based on the detected type of the image content to be displayed. This configuration makes it possible to appropriately control the image quality degradation caused by blur injury, stroboscopic effect and flickering, hence realize total image quality improvement.

37 Claims, 37 Drawing Sheets

U.S. PATENT DOCUMENTS

| | | | | |
|---|---|---|---|---|
| 6,124,842 | A | 9/2000 | Mizutome et al. | |
| 6,396,469 | B1 | 5/2002 | Miwa et al. | |
| 6,750,837 | B1 | 6/2004 | Kondoh | |
| 6,771,243 | B2 | 8/2004 | Hirohata et al. | |
| 6,927,766 | B2 | 8/2005 | Tagawa et al. | |
| 6,937,224 | B1 | 8/2005 | Miyachi | |
| 7,084,861 | B2 | 8/2006 | Iisaka | |
| 7,133,015 | B1 | 11/2006 | Yoshida et al. | |
| 7,151,572 | B2 * | 12/2006 | Shirahama et al. | 348/554 |
| 7,161,576 | B2 | 1/2007 | Kawabe et al. | |
| 7,173,599 | B2 | 2/2007 | Nishimura | |
| 7,218,305 | B2 | 5/2007 | Nose | |
| 7,265,741 | B2 | 9/2007 | Kumamoto et al. | |
| 2001/0003448 | A1 | 6/2001 | Nose et al. | |
| 2001/0024199 | A1 | 9/2001 | Hughes et al. | |
| 2001/0055007 | A1 | 12/2001 | Miura et al. | |
| 2002/0003522 | A1 * | 1/2002 | Baba et al. | 345/89 |
| 2002/0044116 | A1 | 4/2002 | Tagawa et al. | |
| 2002/0057238 | A1 | 5/2002 | Nitta et al. | |
| 2002/0067332 | A1 * | 6/2002 | Hirakata et al. | 345/102 |
| 2002/0067436 | A1 | 6/2002 | Shirahama et al. | |
| 2002/0075249 | A1 * | 6/2002 | Kubota et al. | 345/204 |
| 2002/0097252 | A1 | 7/2002 | Hirohata | |
| 2002/0105494 | A1 | 8/2002 | Lin et al. | |
| 2002/0154088 | A1 | 10/2002 | Nishimura | |
| 2002/0157094 | A1 | 10/2002 | Saito et al. | |
| 2003/0001983 | A1 | 1/2003 | Nose et al. | |
| 2003/0011610 | A1 * | 1/2003 | Kitsutaka | 345/582 |
| 2003/0058229 | A1 | 3/2003 | Kawabe et al. | |
| 2004/0012556 | A1 * | 1/2004 | Yong et al. | 345/102 |
| 2004/0041750 | A1 | 3/2004 | Abe | |
| 2004/0141094 | A1 | 7/2004 | Kumamoto et al. | |
| 2006/0139289 | A1 | 6/2006 | Yoshida et al. | |
| 2006/0279523 | A1 | 12/2006 | Nitta et al. | |
| 2007/0085794 | A1 | 4/2007 | Kawabe et al. | |
| 2007/0139315 | A1 | 6/2007 | Abe | |

FOREIGN PATENT DOCUMENTS

| | | | |
|---|---|---|---|
| EP | 1-091-341 | A2 | 4/2001 |
| EP | 1 197 944 | A2 | 4/2002 |
| EP | 1 471 489 | A1 | 10/2004 |
| JP | 5-303078 | A | 11/1993 |
| JP | 06-149177 | A | 5/1994 |
| JP | 06-236165 | A | 8/1994 |
| JP | 07-066992 | A | 3/1995 |
| JP | 08-313927 | A | 11/1996 |
| JP | 09-127917 | A | 5/1997 |
| JP | 09-281943 | A | 10/1997 |
| JP | 09-325715 | A | 12/1997 |
| JP | 10-097227 | A | 4/1998 |
| JP | 10-108086 | A | 4/1998 |
| JP | 10-333648 | A | 12/1998 |
| JP | 11-109921 | A | 4/1999 |
| JP | 11-202286 | A | 7/1999 |
| JP | 11-296145 | A | 10/1999 |
| JP | 11-341393 | A | 12/1999 |
| JP | 2000-013707 | A | 1/2000 |
| JP | 2000-020206 | A | 1/2000 |
| JP | 2000-206492 | A | 7/2000 |
| JP | 2000-293142 | A | 10/2000 |
| JP | 2002-321551 | A | 11/2000 |
| JP | 2001-060078 | A | 3/2001 |
| JP | 2001-108962 | A | 4/2001 |
| JP | 2001-125547 | A | 5/2001 |
| JP | 2001-159871 | A | 6/2001 |
| JP | 2001-184034 | A | 7/2001 |
| JP | 2001-201763 | A | 7/2001 |
| JP | 2001-210122 | A | 8/2001 |
| JP | 2001-251567 | A | 9/2001 |
| JP | 2001-282174 | A | 10/2001 |
| JP | 2001-296838 | A | 10/2001 |
| JP | 2002-023137 | | 1/2002 |
| JP | 2002-040390 | A | 2/2002 |
| JP | 2002-041002 | | 2/2002 |
| JP | 2002-055657 | A | 2/2002 |
| JP | 2002-072969 | A | 3/2002 |
| JP | 2002-123223 | A | 4/2002 |
| JP | 2002-152690 | A | 5/2002 |
| JP | 2002-156950 | A | 5/2002 |
| JP | 2002-215111 | A | 7/2002 |
| JP | 2002-244627 | A | 8/2002 |
| JP | 2002-287700 | A | 10/2002 |
| JP | 2002-287800 | A | 10/2002 |
| JP | 2002-305695 | A | 10/2002 |
| JP | 2002-311413 | A | 10/2002 |
| JP | 2002-318569 | A | 10/2002 |
| JP | 2002-323876 | A | 11/2002 |
| JP | 2002-365163 | A | 12/2002 |
| JP | 2003-066918 | A | 3/2003 |
| JP | 2003-280617 | A | 10/2003 |
| JP | 2004-533020 | A | 10/2004 |
| KR | 1020020029619 | A | 4/2002 |
| KR | 1020020082790 | A | 10/2002 |
| WO | WO-01/13167 | A1 | 2/2001 |
| WO | WO-02/067238 | A2 | 8/2002 |
| WO | WO-02/104005 | A1 | 12/2002 |
| WO | WO 03/063121 | A1 | 7/2003 |

* cited by examiner

-- Conventional Art --

-- Conventional Art --

-- Conventional Art --

-- Conventional Art --

*FIG. 6* -- Conventional Art --
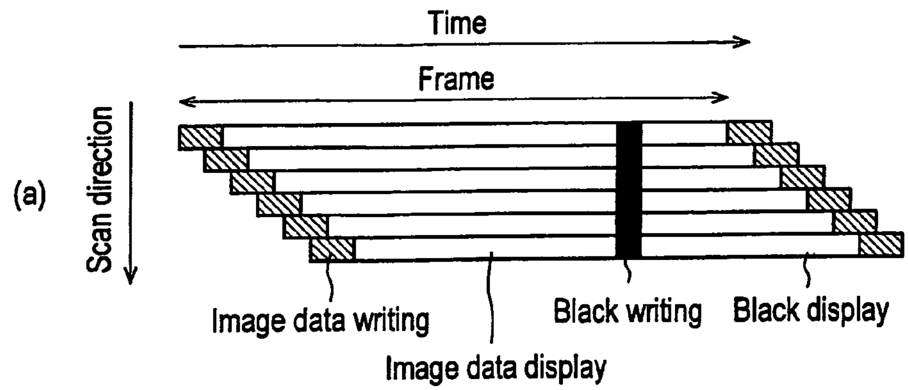
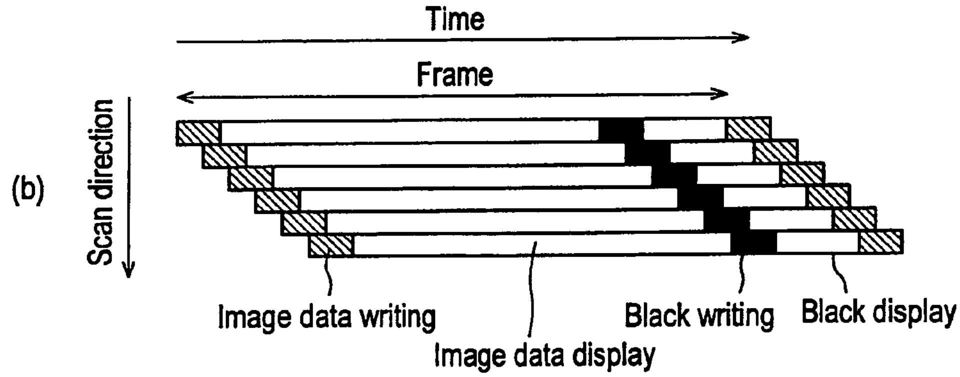
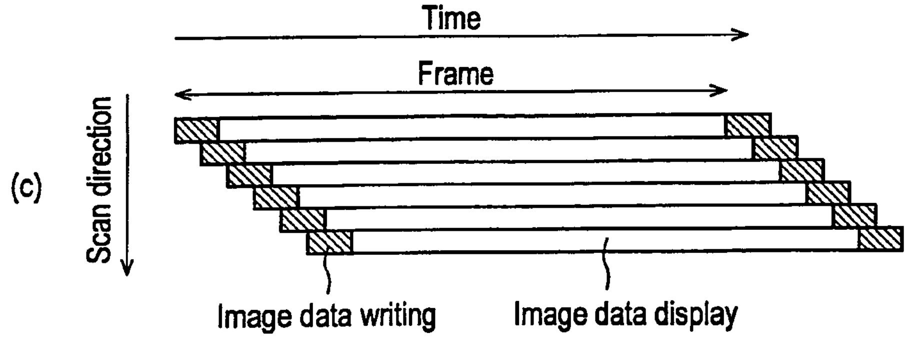

FIG. 18

| | | Reference gray scales | | | | | | | | |
|---|---|---|---|---|---|---|---|---|---|---|
| | | 0 | 32 | 64 | 96 | 128 | 160 | 192 | 224 | 255 |
| Voltage data | Hold type display | V0 | V32 | V64 | V96 | V128 | V160 | V192 | V224 | V225 |
| | Impulse type display | V0 | V32 | V64 | V96 | V128 | V160 | V192 | V224 | V225 |

V-T characteristic voltage of a LCD panel

Gamma characteristic of a LCD

LIQUID CRYSTAL DISPLAY DEVICE

TECHNICAL FIELD

The present invention relates to a liquid crystal display for displaying images by illuminating a liquid crystal display panel with a backlight, and particularly relates to a liquid crystal display which prevents blur injury arising when displaying motion pictures, by simulating impulse type display.

BACKGROUND ART

Recently, flat panel type displays (FPDs) such as liquid crystal displays (LCDs) and others, which can achieve high resolution, low power consumption and space saving have been extensively developed. Among these, application of LCDs for use in computer displays, television displays and others is quite significant. However, in contrast to the cathode ray tube (CRT) displays which used to be mainly adopted for these purposes, LCDs have been pointed out as a drawback which is so-called 'blur injury', that is, the edges of moving part are perceived to be hazy by the observer when a picture with motion is displayed.

As disclosed in, for example, Japanese Patent Application Laid-open Hei 9-325715, the cause of blur injury in motion picture display is not only attributed to the delay of the optical response time of liquid crystal, but also attributed to the LCD display method itself. CRT displays in which display is effected by illuminating the fluorescent body with scanning electronic beams, are of so-called impulse-type display in which emission of light from each pixel presents a generally impulsive characteristic though a slight afterglow of the fluorescent body may occur.

In contrast, because the electricity charged by application of an electric field to the liquid crystal is held at relatively high ratio until the next application of an electric field (in particular, TFT LCDs present a remarkably high charge holding performance because every dot that constitutes a pixel is formed with a TFT switch and every pixel normally has sub capacitance), LCD displays are driven in a so-called hold-type display mode in which each liquid crystal pixel continues to emit light until data is rewritten by application of an electric field based on the image data of the next frame.

In such a hold-type display, the impulse response of image display light has a temporal spread, hence the temporal frequency characteristic lowers, which in turn causes degradation of the spatial frequency characteristic, leading to blur in the observed image. To deal with this, the above-mentioned Japanese Patent Application Laid-open Hei 9-325715 has proposed a display device improved in blur injury in the observed image, by on-off controlling a shutter disposed over the display surface or a light source lamp (backlight) so that the display light will be presented to the observer during only the rear half period of each field of the display image, to thereby limit the temporal spread of impulse response.

This will be detailed with reference to FIGS. 1 and 2. In FIG. 1, 111 designates a light source lamp such as a strobe, etc., which can be turned on and off at high speed; 112 a power source for supplying electric power to light source lamp 111; 113 a transmission type display device such as a TFT liquid crystal device, etc., which converts electric image signals into light for image display; 116 a drive circuit for generating drive signals for driving display device 113 in accordance with the image signals and synchronizing signals; and 117 a pulse generating circuit for generating control pulses in synchronism with the vertical synchronization of the input synchronizing signals so as to perform on/off control of power source 112.

When the illumination ratio is 50%, light source lamp 111 is turned off during the period from time t1 to time t2 within one field period T and turned on during the period from time t2 to time t3, by pulsing application of electric power from power source 112 (see FIG. 2). When the illumination ratio is 25%, the lamp is turned off during the period from time t1 to time t6 within one field period T and turned on during the period from time t6 to time t3, by pulsing application of electric power from power source 112 (see FIG. 2).

In sum, the illuminating period of light source lamp 111 is controlled by pulse generating circuit 117 and power source 112. Accordingly, total response of image display light for image display is given by the pulse-on waveform from time t2 to time t3 and the pulse-on waveform from time t4 to t5 only, for the case of the illumination ratio of 50%, for instance. Therefore, the temporal spread of total response for display is reduced and the temporal frequency characteristic is also improved to be flatter, so that image quality degradation during displaying motion pictures can be inhibited.

The technique for suppressing image quality degradation such as blur injury, etc., arising when displaying motion pictures, by illuminating the full screen range with the backlight a predetermined time after data writing of the image signal for one frame to be displayed on the LCD panel is called a full-screen flashing type, which has been also disclosed in, for instance, Japanese Patent Application Laid-open 2001-201763, Japanese Patent Application Laid-open 2002-55657 and others, other than the above-mentioned Japanese Patent Application Laid-open Hei 9-325715.

In contrast to this full-screen flashing type backlighting technique, so-called scanning type backlighting schemes have been proposed in, for instance, Japanese Patent Application Laid-open Hei 11-202286, Japanese Patent Application Laid-open 2000-321551, Japanese Patent Application Laid-open 2001-296838, in which image quality degradation such as blur injury etc., arising during displaying motion pictures, is suppressed by sequentially activating scan-wise multiple backlight for divided lighting areas that correspond to multiple divided display areas of the LCD panel.

The configuration which approximates impulse-type drive display such as a CRT, from hold-type drive display by high-speed sequential flashing of backlight will be described with reference to FIGS. 3 to 5. In FIG. 3, a multiple number of (four, in this case) direct fluorescent lamps (CCFT) 203 to 206 are arranged parallel to the scan lines, on the backside of a liquid crystal display panel 202, and the lamps 203 to 206 are sequentially activated from top to bottom, in synchronization with the scan signals for liquid crystal display panel 202. Here, lamps 203 to 206 correspond to four display areas into which liquid crystal display panel 202 is divided in the horizontal direction.

FIG. 4 is a chart showing activation timing of the lamps corresponding to FIG. 3. In FIG. 4, the high state presents the lighted state of the lamp. For example, the video signal is written into the top one-fourth of the display area of liquid crystal display panel 202, in duration (1) within one frame period, and fluorescent lamp 203 is activated in duration (4) after a delay of durations (2) and (3) for liquid crystal response time. In this way, the lamps for divided display areas are repeatedly and sequentially activated within one frame period by one after another after writing of the video signal.

Thereby it is possible to simulate impulse-type drive display of a CRT, from hold-type drive display of an LCD, hence the video signal of the previous frame is not perceived when a motion picture is displayed. Consequently it is possible to prevent degradation of motion picture display quality due to edge blur. It should be noted that the same effect can be obtained by activating two lamps at the same time as shown in FIG. 5. This method also lengthen the lit time of the backlight, so that it is possible to prevent decrease of backlight brightness.

Further, in this scan-type backlighting technique, for each of the multiply divided display areas of the liquid crystal display panel, the luminous area corresponding to the backlight is illuminated at a timing when the liquid crystal has been brought to a full optical response, the duration from the time the image is written into the liquid crystal to the time the backlight is activated can be made equal regardless of the position (vertical position) on the display screen. As a result, this configuration is advantageous in making satisfactory improvement of blur injury in motion pictures regardless of the position on the display screen.

On the other hand, contrasting to the above intermittent backlight driving scheme, there have been proposed so-called black insert type liquid crystal displays, in which, instead of making intermittent the backlight in one frame period, the video signal and the black signal are alternately written into the liquid crystal display panel in one frame period so that the light emission time of each pixel (image display duration) from the time a certain video signal frame is scanned to the time the next frame is scanned is shortened to realize emulative impulse type display.

Known examples of such black insert type liquid crystal displays include: one in which, as shown in FIG. 6(*a*), one frame of input image data is sequentially written into the liquid crystal display panel, then the whole screen is written in with black display data so that the display of the whole screen is blackened in a predetermined period; and one in which, as shown in FIG. 6(*b*), part of the screen is displayed with black for a predetermined period so as to shorten the span for displaying the image in one frame period compared to the conventional hold-type display device, by sequentially writing black display data every scan line (Japanese Patent Application Laid-open Hei 9-127917 and Japanese Patent Application Laid-open Hei 11-109921).

In the above-described conventional technologies, attempts to amend image quality degradation due to blur injury arising when displaying motion pictures in a hold-type display device, are made to simulate impulse-type drive display drive as in a CRT or the like, from hold-type drive display drive, by shortening the span of image display, specifically, by implementing intermittent backlight drive within one frame period (e.g., 16.7 msec in the case of 60 Hz progressive scan), or by writing black display data to the liquid crystal display panel after writing of image display data.

Here, in order to amend image quality degradation due to blur injury, it is preferred that the impulse ratio (the ratio of the image display duration in one frame period) is made lower. However, reduction of the impulse ratio may induce the following problems (1) to (3).

(1) The extent of the effect of motion blur depends on the image type. For example, in the case of CG (computer graphics), animation and game images, the movie is rendered by a series discrete images (at one moment only within every frame) as shown in FIG. 7(*a*) though they are supposed to be continuous. That is, there are some cases where no motion blur which will function to interpolate interval between frames is added.

Smooth motion can be obtained if motion blur is generated and added by an image process. However, when a picture without any motion blur, i.e., a content image which originally lacks smoothness in motion is displayed with a low impulse ratio, a stroboscopic defect, i.e., discrete motion of moving objects, occurs, leading to more trouble of image quality degradation.

Images taken by a storage type camera that is usually used as a television camera, have different amounts of motion blur depending on the shutter speeds, because each frame is an accumulation of light while the shutter being open. For example, since movies and images taken indoors such as in a studio under strong lighting (e.g., news programs, broadcasts of indoor competitions such as swimming races) are taken at high shutter speeds (that is, the opening duration of the shutter is short), a moving object is supposed to be added with a small amount of motion blur during shooting, as shown in FIG. 7(*b*). When such an image with a small amount of motion blur is displayed with a low impulse ratio, there is a high possibility of the aforementioned stroboscopic defect occurring.

On the other hand, an image that is shot dark, outdoors, such as a broadcast of a night game of baseball match or soccer match may be taken at low shutter speeds (that is, the opening duration of the shutter is long). In such a case, a moving object is supposed to be added with a large amount of motion blur during shooting, as shown in FIG. 7(*c*). When such an image with a large amount of motion blur is displayed with a low impulse ratio, smooth motion can be reproduced by virtue of motion blur. Thus, in this case no stroboscopic defect stated above will occur, therefore it is preferred to give priority to display of a sharp and clear motion picture by reducing blur injury.

(2) Secondly, the visual characteristics when watching motion pictures is considered to be attributed to ocular movement, time integration of vision and the non-linearity of the visual response to photic stimulation intensity. Of ocular movement, the characteristic of the following movement (movement of left and right eyes chasing a moving object approximately similarly), which is the most important characteristic for perceiving motion pictures, varies depending on the speeds of moving objects and the like, and there is a possibility that the aforementioned stroboscopic defect may occur in some image contents when the image is displayed with a low impulse ratio.

For example, in the case of an image (motion pan), i.e., where the full frame uniformly moves in the horizontal direction such as in a sport program broadcast of a soccer or volleyball game, it is preferred that sharp and clear display of motion pictures reduced in blur injury is achieved by setting the impulse ratio as low as possible because image quality degradation due to blur injury becomes conspicuous. In contrast, when a target person is fixed with the background being moved, there is a high risk of image quality degradation due to occurrence of the aforementioned stroboscopic defect if the impulse ratio is set low.

(3) Further, if the impulse ratio is set low, it is true motion picture blur injury defects will be reduced. However, because black display duration (non-image display duration) in one frame period increases, flicker becomes conspicuous especially in white image display areas and leads to image degradation due to flickering.

As has been described above, when the impulse ratio is set low, image quality may degrade due to occurrence of stroboscopic, flickering or other image quality defects depending on the type of image content, hence it has been difficult to achieve improvement of total image quality.

Further, the optimal impulse ratio is different depending on the image contents, image materials and the like. Moreover, sensitivity (dynamic visual acuity) to blur injury, stroboscopic effects and flickering greatly varies between individual users, so that it is impossible to realize improvement of total image quality for individual users.

In view of the above problems, it is therefore an object of the present invention to provide a liquid crystal display which can realize improvement of total image quality, by variably controlling the ratio of the image display duration in one frame period in accordance with the type of the image content to be displayed so as to suitably suppress the image quality degradation due to blur injury, stroboscopic effect, flickering and other defects.

Also, in view of the above problems, it is another object of the present invention to provide a liquid crystal display which can realize improvement of total image quality for individual users, by allowing for variable control of the ratio of the image display duration in one frame period in accordance with the user's instructional input so as to suitably suppress the image quality degradation due to blur injury, stroboscopic effect, flickering and other defects.

DISCLOSURE OF INVENTION

The first invention is a liquid crystal display device wherein the image signal to be displayed is written into a liquid crystal display panel while a backlight is activated intermittently within one frame period, comprising: a section for detecting the type of the image content to be displayed; and a section for variably controlling the illumination duration of the backlight based on the detected type of the image content.

The second invention is characterized in that, in the first invention, the backlight emits a flash of light over the full screen every one frame period in synchronization with the vertical synchronizing signal supplied to the liquid crystal display panel.

The third invention is characterized in that, in the first invention, the backlight is operated so that multiple luminous sections are activated, one to the next, scan-wise in synchronization with the vertical and horizontal synchronizing signals supplied to the liquid crystal display panel.

The fourth invention is characterized in that, in the first to third invention, the luminous intensity of the backlight is varied in accordance with the illumination duration of the backlight.

The fifth invention is characterized in that, in the first to third invention, the gray scale levels of the input image signal are varied in accordance with the illumination duration of the backlight.

The sixth invention is characterized in that, in the first to third invention, the gray scale voltages applied to the liquid crystal display panel in response to the input image signal are varied in accordance with the illumination duration of the backlight.

The seventh invention is characterized in that, in the first to third invention, the frame frequency of the input image signal is varied based on the type of the image content.

The eighth invention is characterized in that, in the first to third invention, the type of the image content to be displayed is detected based on the contents information included in the broadcast data.

The ninth invention is characterized in that, in the first to third invention, the type of the image content to be displayed is detected based on the contents information obtained from external media.

The tenth invention is characterized in that, in the first to third invention, the type of the image content to be displayed is detected based on the video source select command information input by the user.

The eleventh invention is a liquid crystal display device wherein the image signal to be displayed and the black display signal are written into a liquid crystal display panel within one frame period, comprising: a section for detecting the type of the image content to be displayed; and a section for variably controlling the duration in which the black display signal is supplied to the liquid crystal display panel based on the detected type of the image content.

The twelfth invention is characterized in that, in the eleventh invention, the luminous intensity of the backlight that illuminates the liquid crystal display panel is varied in accordance with the application duration of the black display signal.

The thirteenth invention is characterized in that, in the eleventh invention, the gray scale levels of the input image signal are varied in accordance with the application duration of the black display signal.

The fourteenth invention is characterized in that, in the eleventh invention, the gray scale voltages applied to the liquid crystal display panel in response to the input image signal are varied in accordance with the application duration of the black display signal.

The fifteenth invention is characterized in that, in the eleventh to fourteenth invention, the type of the image content to be displayed is detected based on the contents information included in the broadcast data.

The sixteenth invention is characterized in that, in the eleventh to fourteenth invention, the type of the image content to be displayed is detected based on the contents information obtained from external media.

The seventeenth invention is characterized in that, in the eleventh to fourteenth invention, the type of the image content to be displayed is detected based on the video source select command information input by the user.

The eighteenth invention is a liquid crystal display device wherein display duration of the image signal and non-display duration are provided in one frame period, comprising: a section for detecting the type of the image content to be displayed; and a section for variably controlling the ratio of the display duration of the image signal in the one frame period, based on the detected type of image content.

The nineteenth invention is characterized in that, in the eighteenth invention, the gray scale levels of the input image signal are varied in accordance with the illumination duration of the backlight.

The twentieth invention is characterized in that, in the eighteenth invention, the gray scale voltages applied to the liquid crystal display panel in response to the input image signal are varied in accordance with the illumination duration of the backlight.

The twenty-first invention is characterized in that, in the eighteenth to twentieth invention, the type of the image content to be displayed is detected based on the contents information included in the broadcast data.

The twenty-second invention is characterized in that, in the eighteenth to twentieth invention, the type of the image content to be displayed is detected based on the contents information obtained from external media.

The twenty-third invention is characterized in that, in the eighteenth to twentieth invention, the type of the image content to be displayed is detected based on the video source select command information input by the user.

The twenty-fourth invention is a liquid crystal display device wherein the image signal to be displayed is written into a liquid crystal display panel while a backlight is activated intermittently within one frame period, comprising: a section for detecting a user's instructional input; and a section for variably controlling the illumination duration of the backlight based on the detected user's instructional input.

The twenty-fifth invention is characterized in that, in the twenty-fourth invention, the backlight emits a flash of light over the full screen every one frame period in synchronization with the vertical synchronizing signal supplied to the liquid crystal display panel.

The twenty-sixth invention is characterized in that, in the twenty-fourth invention, the backlight is operated so that multiple luminous sections are activated, one to the next, scan-wise in synchronization with the vertical and horizontal synchronizing signals supplied to the liquid crystal display panel.

The twenty-seventh invention is characterized in that, in the twenty-fourth to twenty-sixth invention, the luminous intensity of the backlight is varied in accordance with the illumination duration of the backlight.

The twenty-eighth invention is characterized in that, in the twenty-fourth to twenty-sixth invention, the gray scale levels of the input image signal are varied in accordance with the illumination duration of the backlight.

The twenty-ninth invention is characterized in that, in the twenty-fourth to twenty-sixth invention, the gray scale voltages applied to the liquid crystal display panel in response to the input image signal are varied in accordance with the illumination duration of the backlight.

The thirtieth invention is characterized in that, in the twenty-fourth to twenty-sixth invention, the frame frequency of the input image signal is varied based on the user's instruction.

The thirty-first invention is characterized in that, in the twenty-fourth to twenty-sixth invention, the illumination duration of the backlight is varied based on the video source select command information input by the user.

The thirty-second invention is characterized in that, in the twenty-fourth to twenty-sixth invention, the illumination duration of the backlight is varied based on the video adjustment command information input by the user.

The thirty-third invention is a liquid crystal display device wherein the image signal to be displayed and the black display signal are written into a liquid crystal display panel within one frame period, comprising: a section for detecting a user's instructional input; and a section for variably controlling the duration in which the black display signal is supplied to the liquid crystal display panel based on the user's instructional input.

The thirty-fourth invention is characterized in that, in the thirty-third invention, the luminous intensity of the backlight that illuminates the liquid crystal display panel is varied in accordance with the application duration of the black display signal.

The thirty-fifth invention is characterized in that, in the thirty-third invention, the gray scale levels of the input image signal are varied in accordance with the application duration of the black display signal.

The thirty-sixth invention is characterized in that, in the thirty-third invention, the gray scale voltages applied to the liquid crystal display panel in response to the input image signal are varied in accordance with the application duration of the black display signal.

The thirty-seventh invention is characterized in that, in the thirty-third to thirty-sixth invention, the application duration of the black display signal is varied based on the video source select command information input by the user.

The thirty-eighth invention is characterized in that, in the thirty-third to thirty-sixth invention, the application duration of the black display signal is varied based on the video adjustment command information input by the user.

The thirty-ninth invention is a liquid crystal display device wherein display duration of the image signal and non-display duration are provided in one frame period, comprising: a section for detecting a user's instructional input; and a section for variably controlling the ratio of the display duration of the image signal in the one frame period, based on the detected user's instruction.

The fortieth invention is characterized in that, in the thirty-ninth invention, the gray scale levels of the input image signal are varied in accordance with the ratio of the display duration of the image signal in the one frame period.

The forty-first invention is characterized in that, in the thirty-ninth invention, the gray scale voltages applied to the liquid crystal display panel in response to the input image signal are varied in accordance with the ratio of the display duration of the image signal in the one frame period.

The forty-second invention is characterized in that, in the thirty-ninth to forty-first invention, the ratio of the display duration of the image signal in the one frame period is varied based on the video source select command information input by the user.

The forty-third invention is characterized in that, in the thirty-ninth to forty-first invention, the ratio of the display duration of the image signal in the one frame period is varied based on the video adjustment command information input by the user.

According to the liquid crystal display device of the present invention, when the backlight is driven intermittently to prevent blur injury, the backlight illumination duration or the ratio of the image display duration in one frame period (impulse ratio) is appropriately switched in accordance with the type of the image content to be displayed or in accordance with the user's instruction, whereby it is possible to appropriately control the image quality degradation due to blur injury, stroboscopic effect, flickering and other factors, hence realize total image quality improvement.

Similarly, when blur injury is prevented by writing the black display signal into the liquid crystal display panel, the black display duration or the ratio of the image display duration in one frame period (impulse ratio) is appropriately switched in accordance with the type of the image content to be displayed or in accordance with the user's instruction, whereby it is possible to appropriately control the image quality degradation due to blur injury, stroboscopic effect, flickering and other factors, hence realize total image quality improvement.

BRIEF DESCRIPTION OF DRAWINGS

FIG. 6 includes schematic illustrative views showing mechanisms of display operations, (a) and (b) showing the mechanisms of impulse-type display with black insertion and (c) showing the mechanism of hold-type display.

FIG. 18 is a schematic illustrative chart showing a content example of a data storage of reference gray scale voltage data in a liquid crystal display of the present invention.

BEST MODE FOR CARRYING OUT THE INVENTION

The embodiment of the present invention will be described hereinbelow.

To begin with, the first to fourth embodiments of liquid crystal displays in which the impulse ratio is automatically switched in accordance with the detection result of the type of the content to be displayed will be described.

[The First Embodiment]

Figure 8:
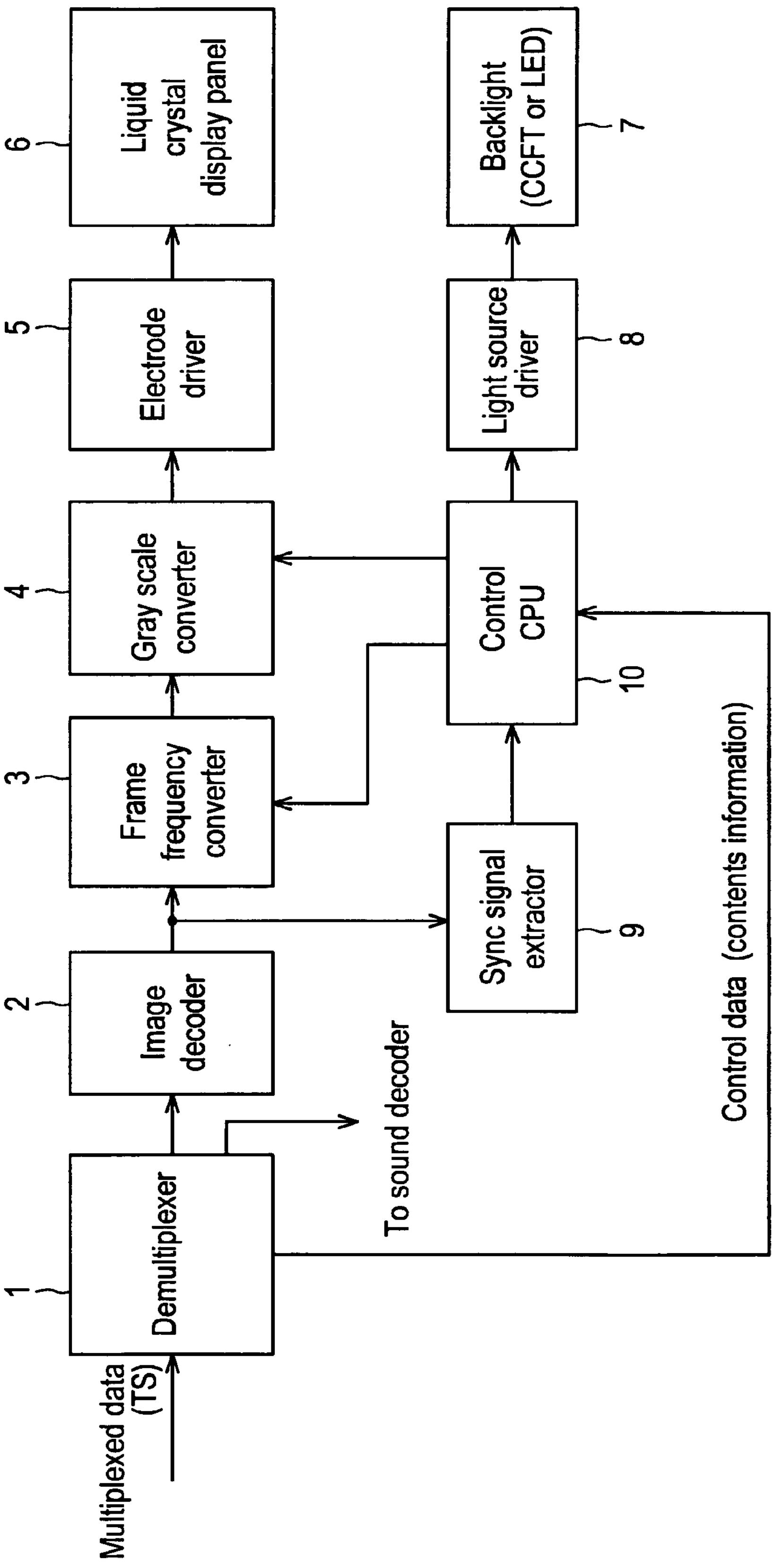
FIG. 8 is a functional block diagram showing a fundamental schematic configuration in the first embodiment of a liquid crystal display of the present invention.
Figure 9:
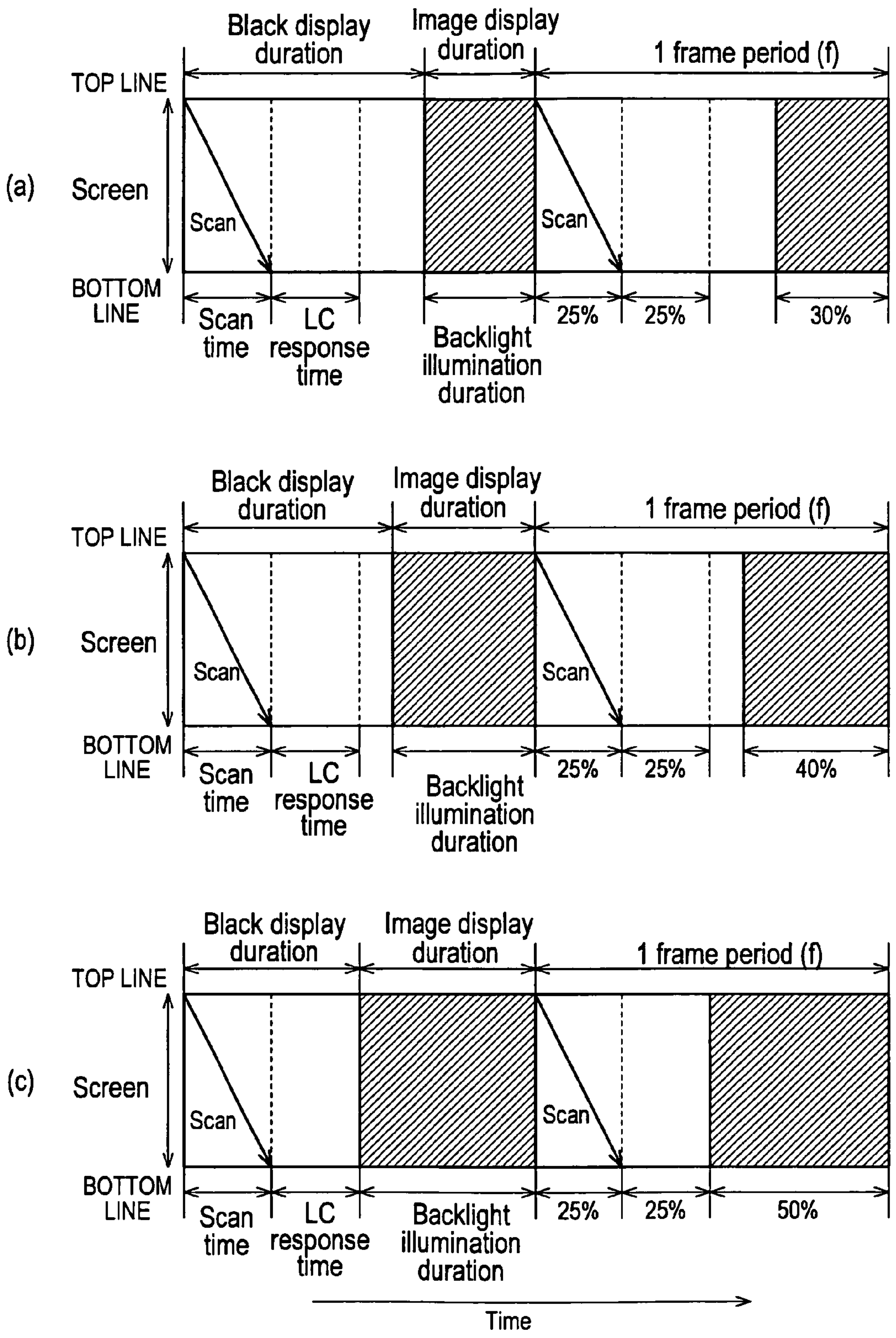
FIG. 9 is an illustrative view for explaining one example of a basic operating mechanism in the first embodiment of a liquid crystal display of the present invention.
Figure 10:
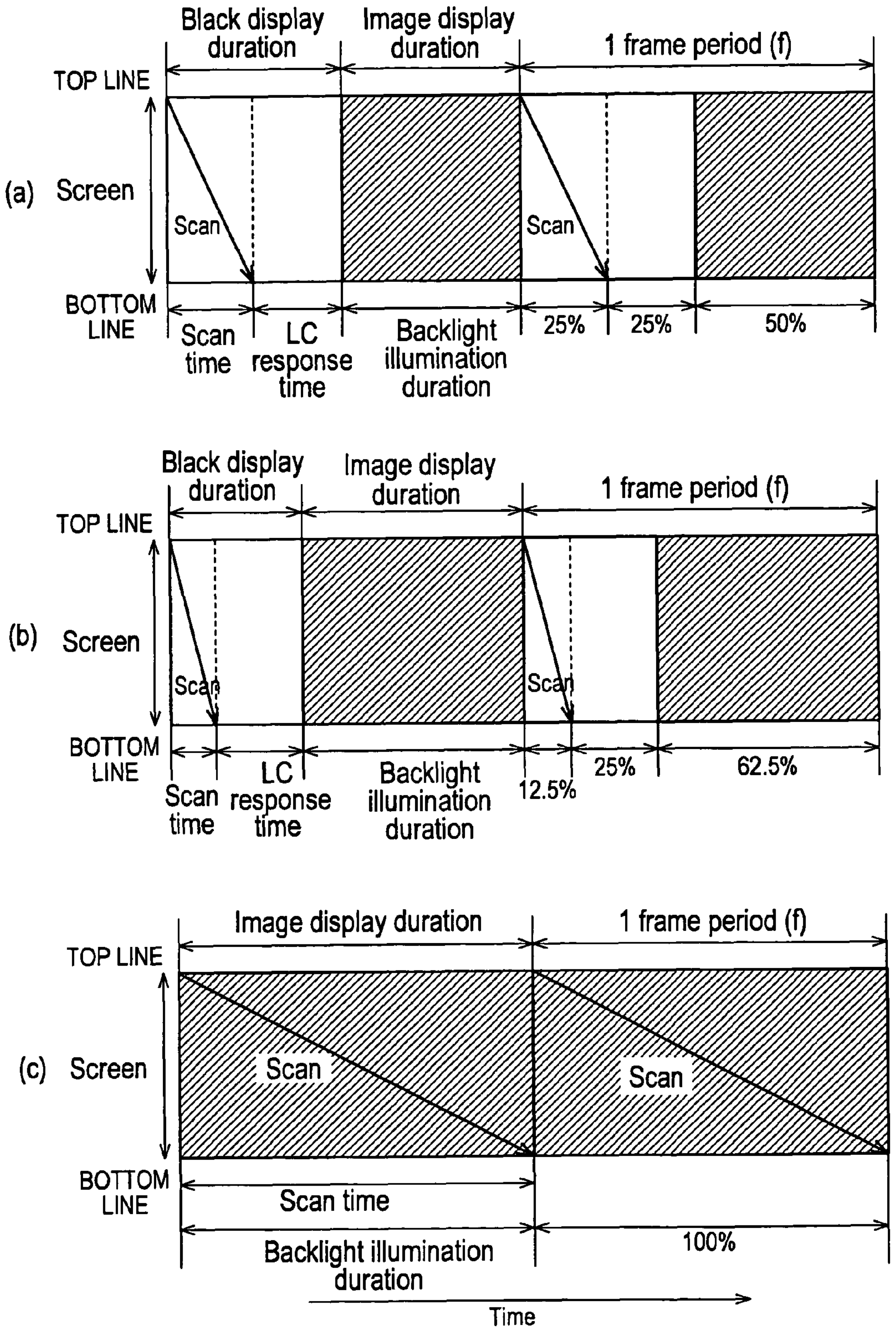
FIG. 10 is an illustrative view for explaining another example of a basic operating mechanism in the first embodiment of a liquid crystal display of the present invention.

The first embodiment of the present invention will be hereinbelow described in detail with reference to FIGS. 8 to 10. Herein, FIG. 8 is a functional block diagram showing a fundamental schematic configuration of a liquid crystal display of the present embodiment. FIG. 9 is an illustrative view for explaining one example of a basic operating mechanism in the liquid crystal display of the present embodiment. FIG. 10 is an illustrative view for explaining another example of a basic operating mechanism in the liquid crystal display of the present embodiment.

The liquid crystal display of the present embodiment includes: as shown in FIG. 8, a demultiplexer 1 for separating images, sound data and control data (contents information, etc.,) from input multiplexed data (transport stream) made up of compression coded images in an MPEG (Moving Picture Expert Group) scheme or the like, sound data and control data and outputting these pieces of data to an image decoder 2, a sound decoder (not shown) and a control CPU 10, respectively; and the image decoder 2 for decoding the separated image data based on MPEG.

The device further includes: a frame frequency converter 3 for converting the frame frequency of the decoded input image signal to a high frequency; a gray scale converter 4 for converting the gray scale levels of the input image signal; an electrode driver 5 for driving the data electrodes and scanning electrodes of a liquid crystal display panel 6 in accordance with the input image signal; and an active-matrix liquid crystal display panel 6.

The device further includes: a bottom-emitting backlight 7 arranged on the back of the liquid crystal display panel 6; a light source driver 8 for implementing intermittent drive, i.e., turning on/off the backlight 7 in one vertical display period (one frame period); a synchronizing signal extractor 9 for extracting synchronizing signals from the input image signal decoded through the image decoder 2; and a control CPU 10 which acquires and analyzes contents information from the control data separated through a demultiplexer 1 and outputs a control signal to light source driver 8 so as to control the on/off timing of backlight 7 based on the vertical synchronizing signal extracted through the synchronizing signal extractor 9.

As the contents information included in the control data, program information (genre information, etc.) contained in digital broadcast data transmitted from a broadcasting station by way of CS (communication satellite), BS (broadcasting satellite) and the like, or the contents information read out from disk media such as DVDs (digital video disks) can be used. Control CPU 10 analyzes these so as to detect and determine the type of the content of the image to be displayed, and generates a control signal for varying the backlight illumination duration (image display duration) by referring to a ROM, for example, in which impulse ratio information is stored beforehand for every type of image contents.

Here, the types of contents indicate the categories such as sport, drama, news, animation, game, etc. If the contents information contained in the aforementioned broadcast data, further includes shooting information descriptive of the shooting conditions such as shutter speed, information as to additional motion blur and the like, other than the EPG (electronic program guide) information descriptive of the program genre, categories and the like, the control CPU 10 is able to detect the content type of the image to be displayed based on this information. It is also possible to determine the type of the content of the image to be displayed, based on the video source (video position) select command information that was input by the user through the menu setup frame or the like, EPG (electronic program guide) information obtained from external media, the information of shooting conditions added to the image data when the user shot or recorded it, other than the aforementioned contents information contained in the aforementioned broadcast data (this will be detailed later).

The control CPU 10 also makes control of light source driver 8 so as to vary the luminous brightness of backlight 7 or makes control of gray scale converter 4 so as to vary the gray scale levels of the input image signal as it variably controls the illumination duration of backlight 7 (image display duration). In this case, the luminous brightness (backlight brightness) of backlight 7 is enhanced while the input image signal levels are converted by gray scale converter 4 so that the input image signal and the display brightness will hold a constant relationship if the illumination duration (illumination ratio) of backlight 7 is reduced.

Gray scale converter 4 converts the input image signal levels (gray scale levels) in order to effect image display without change of gamma characteristic if the impulse ratio is varied. Specifically, for each impulse ratio, a conversion table (LUT) for converting the input image signal levels (gray scale levels) so that gamma characteristic will not vary has been stored in ROM or the like, and gray scale converter 4 converts the input image signal levels (gray scale levels) with reference to this conversion table. In this way, it is possible to suppress the occurrence of image quality degradation due to change in gamma characteristic.

If the impulse ratio is made lower without change of the luminous brightness of backlight 7, pixels with low brightness values are marred, hence the input image signal levels (gray scale levels) are converted so as to increase the display brightness and enhance the contrast in dark gray scale. Alternatively, if the impulse ratio is made higher, pixels with high brightness values are marred, hence the input image signal levels (gray scale levels) are converted so as to decrease the display brightness and enhance the contrast in light gray scales. Thus, it is possible to achieve vivid image display.

Further, the control CPU 10 controls frame frequency converter 3, as required, so as to vary the frame frequency of the image signal to be supplied to liquid crystal display panel 6. Frame frequency converter 3, for example, having a frame memory, stores one frame of image of the input image signal, into the frame memory, then outputs the image signal of which the frame frequency has been converted into a predetermined value based on the control signal from control CPU 10, to thereby compress the input image signal with respect to the temporal axis.

As the backlight 7, other than bottom-emitting fluorescent lamps, bottom-emitting or side-illuminating LED light sources, EL light sources and the like can be used. In particular, an LED (light emitting diode) which has a response speed of some tens nsec to some hundreds nsec, is good in response compared to a fluorescent lamp having a response speed of millisecond order, hence is able to achieve more preferable on/off performance for switching.

The liquid crystal display of the present embodiment is to prevent blur injury arising when displaying motion pictures, using a full-screen flashing type backlight lighting system. Illustratively, the whole frame of display has been completely scanned (written with an image), then a drive waveform is applied to backlight 7 after a lapse of a predetermined time, so that backlight 7 is totally lightened at once (made to flash) to illuminate the full screen of the display frame, in the backlight illumination duration indicated by hatching in FIG. 9.

Here, the backlight illumination duration indicated by hatching in FIG. 9, i.e., the image display duration in one frame period (impulse ratio) is varied based on the type of the image content to be displayed, whereby occurrence of image quality degradation due to blur injury, stroboscopic effect, flickering and other factors is appropriately controlled, thus total image quality improvement is realized.

For example, FIGS. 9(*a*) to (*c*) show an operational example of switching of the impulse ratio, into three classes, i.e., 30%, 40% and 50%, respectively, by converting the frame frequency (60 Hz) of the input image signal fourfold into 240 Hz through frame frequency converter 3 and variably controlling the backlight illumination duration.

Figure 7:
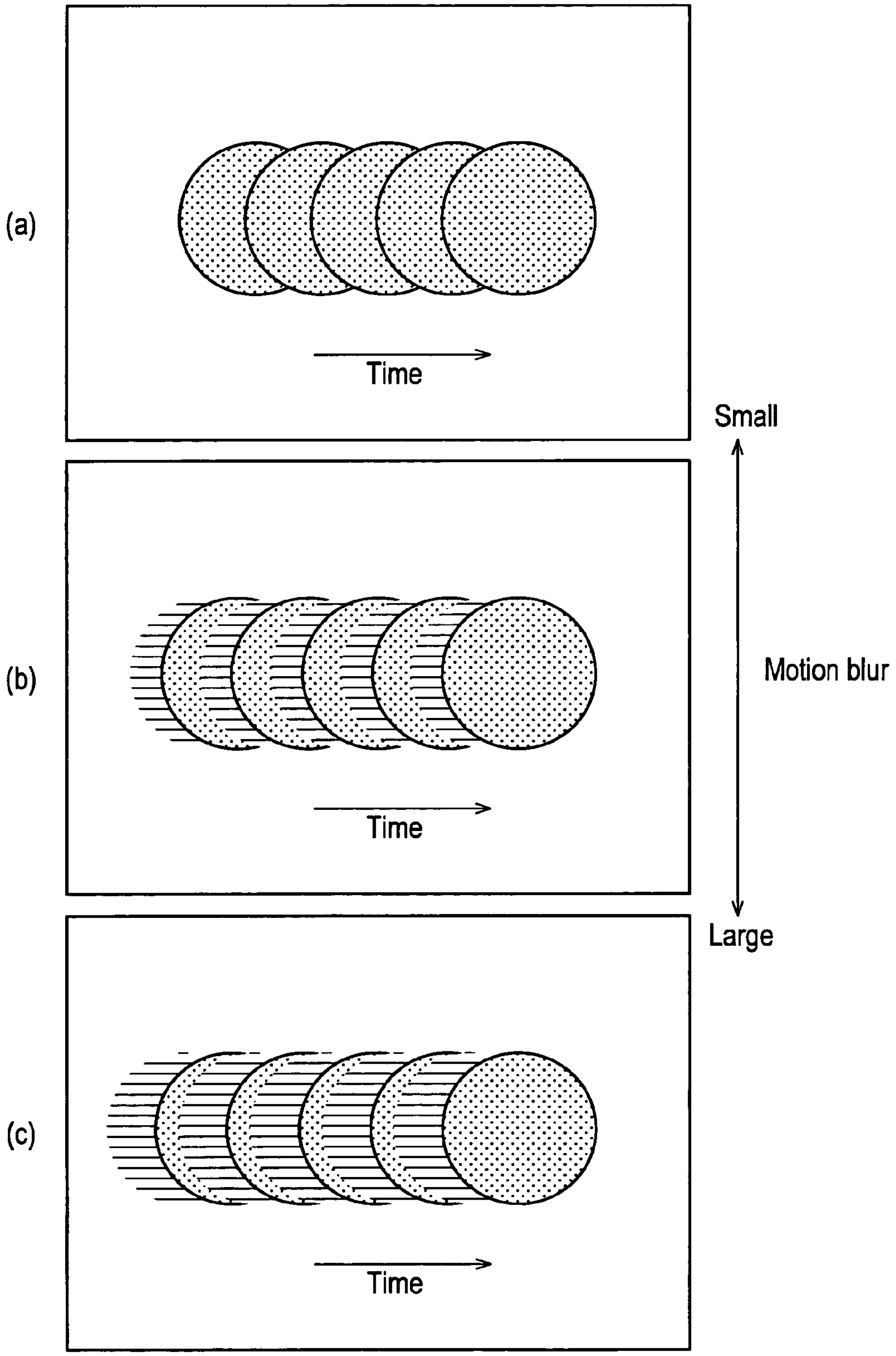
FIG. 7 is an illustrative view schematically explaining types of image contents different in the amount of motion blur.

Specifically, in a case where input image content is one that was shot dark, outdoors, such as a broadcast of a night game of baseball or soccer (see FIG. 7(*c*)), the material was likely taken at low shutter speeds, entailing a large amount of motion blur. Therefore, there is little possibility of image quality defects such as stroboscopic effect, flickering and others occurring even if the impulse ratio is set small.

For this reason, as shown in FIG. 9(*a*), after the image write-scan has been completed, backlight 7 is activated after a lapse of a period of time (here 45% of one frame period) sufficiently longer than the predetermined liquid crystal response time, then is kept lit for the backlight illumination duration (image display duration) until the image write-scan of the next frame starts. Thereby, the impulse ratio is set to be 30% and it is possible to realize sharp and clear motion picture display by preventing occurrence of blur injuries as well as to render smooth motion of moving objects with a certain amount of motion blur.

When an input image content is, for example, a movie or one that was shot under strong lighting in a studio or the like (e.g., news programs, broadcasts of indoor competitions such as swimming races)(see FIG. 7(*b*)), the material was likely taken at high shutter speeds, entailing a small amount of motion blur. Therefore, there is a possibility of image quality defects such as stroboscopic effect, flickering and others occurring if the impulse ratio is set small.

For this reason, as shown in FIG. 9(*b*), after the image write-scan has been completed, backlight 7 is activated after a lapse of a period of time (here 35% of one frame period) longer than the predetermined liquid crystal response time, so that the backlight illumination duration (image display duration) is increased. Thereby, the impulse ratio is set to be 40% and it is possible to reproduce smooth motion of moving objects by preventing occurrence of blur injuries while suppressing occurrence of image quality defects such as stroboscopic effect, flickering and the like.

When an input image content is one that is free from motion blur such as CG (computer graphics), animation, games and the like (see FIG. 7(*a*)), there is a high possibility of image quality defects such as stroboscopic effect, flickering and others occurring if the impulse ratio is set small.

For this reason, as shown in FIG. 9(*c*), after the image write-scan has been completed, backlight 7 is activated immediately after a lapse of just the predetermined liquid crystal response time (in this case, 25% of one frame period), then is kept lit for the backlight illumination duration (image display duration) until the image write-scan of the next frame starts. Thereby, the impulse ratio is set to be 50% and it is possible to reproduce smooth motion of moving objects by suppressing occurrence of blur injuries while preventing occurrence of image quality defects such as stroboscopic effect, flickering and the like.

As has been described above, the backlight illumination duration (image display duration) is varied by delaying the time at which the backlight is turned on or by bringing forward the time at which the backlight is turned off, in accordance with the type of the image content to be displayed. Thereby, it is possible to appropriately inhibit image quality degradation due to blur injury, stroboscopic effect, flickering and other factors, hence realize total improvement in image quality.

Here, the example shown in FIG. 9, the frame frequency of the display image signal is fixed (240 Hz). However, it is possible to change the impulse ratio by causing control CPU 10 to control frame frequency converter 3 so as to vary the frame frequency of the display image signal while varying the backlight illumination duration, such as in FIG. 10.

For example, when an input image content is one that was shot dark, outdoors, such as a broadcast of a night game of baseball or soccer (see FIG. 7(*c*)), the material was likely taken at low shutter speeds, entailing a large amount of motion blur. Therefore, there is little possibility of image quality defects such as stroboscopic effect, flickering and others occurring even if the impulse ratio is set small.

For this reason, as shown in FIG. 10(*a*), the frame frequency of the input image signal is converted fourfold into 240 Hz so that the image write-scanning duration is 25% of one frame period, and after the image write-scan has been completed, backlight 7 is activated after a lapse of the predetermined liquid crystal response time (here 25% of one frame period), then is kept lit for the backlight illumination duration (image display duration) until the image write-scan of the next frame starts. Thereby, the impulse ratio is set to be 50% and it is possible to realize sharp and clear display of motion pictures by preventing occurrence of blur injuries as well as to render smooth motion of moving objects with a certain amount of motion blur.

When an input image content is, for example, a motion picture or one that was shot under strong lighting in a studio or the like (e.g., news programs, broadcasts of indoor competitions such as swimming races)(see FIG. 7(*b*)), the material was likely taken at high shutter speeds, entailing a small amount of motion blur. Therefore, there is a possibility of image quality defects such as stroboscopic effect, flickering and others occurring if the impulse ratio is set small.

Therefore, as shown in FIG. 10(*b*), the frame frequency of the input image signal is converted eightfold into 480 Hz so as to reduce the image write-scanning duration to 12.5% of one frame period, and after the image write-scan has been completed, backlight 7 is activated after a lapse of the predetermined liquid crystal response time (here 25% of one frame period), so that the backlight illumination duration (image display duration) is increased. Thereby, the impulse ratio is set to be 62.5% and it is possible to reproduce smooth motion of moving objects by preventing occurrence of blur injuries while suppressing occurrence of image quality defects such as stroboscopic effect, flickering and the like.

Further, when an input image content is one that is free from motion blur such as CG (computer graphics), animation, games and the like (see FIG. 7(*a*)), there is a high possibility of image quality defects such as stroboscopic effect, flickering and others occurring if the impulse ratio is set small.

For this reason, as shown in FIG. 10(*c*), with no conversion of the frame frequency of the input image signal implemented, backlight 7 is controlled so as to be continuously and fully activated (continuous illumination) without regard to the liquid crystal response duration, the impulse ratio is switched to be 100% (full hold-type display mode), whereby it is possible to reproduce smooth motion of moving objects (image quality defects such as stroboscopic effect, flickering etc., will be alleviated as moving objects blur).

As has been described above, the backlight illumination duration (image display duration) in one frame period is varied in accordance with the type of the image content to be displayed, whereby it is possible to appropriately inhibit image quality degradation due to blur injury, stroboscopic effect, flickering and other factors, hence realize total improvement in image quality. Further, it is also possible to further improve the variable flexibility of the impulse ratio in accordance with the size, response characteristic etc., of liquid crystal display panel 6 in combination with the example shown in FIG. 9.

The above embodiment is configured so that the backlight illumination duration, or the image display duration in one frame period (impulse ratio) can be switched to three classes including the full hold type display mode (impulse ratio: 100%), in accordance with the types of image contents. However, the present invention should not be limited to this. It goes without saying that the present invention can be realized as long as the impulse ratio can be switched between two or more predetermined values, in accordance with the type of the image content. For example, it is possible to construct a simple configuration in which the display is simply switched between the impulse type display mode and the hold type display mode, (i.e., the impulse-type display mode off), in an alternative manner.

Further, as the contents information, the EPG (electronic program guide) information that can be obtained from the broadcasting signal from a broadcasting station or, from external media can be used. Alternatively, when additional motion blur data and/or information of the shooting conditions such as shutter speed, etc., as to the input image content can be obtained, based on this information it is possible to determine the type of the image content to be displayed.

Moreover, in order to achieve the optimal image quality (video output characteristic) adjustment for each of input video sources such as "standard", "cinema", "game" and the like, the image display device of this kind is configured so that the user is able to select the input video source (video position) through a menu setting frame. This information as to the input video source selection designated by the user may also be used to determine the type of the image content to be displayed to thereby variably control the impulse ratio. For example, when "game" is selected and designated as the selection item of the video source (video position) through the menu setting frame, it is possible to switch and set the impulse ratio to a high value in link with this selection. In this way, it is possible to provide a configuration in which the impulse ratio is variably controlled by determining the type of the image content to be displayed with reference to the user's instructional information concerning video adjustment items.

As has been described heretofore, the liquid crystal display of the present embodiment is able to appropriately control the image quality degradation due to blur injury, stroboscopic effect, flickering and other factors, hence realize total image quality improvement, by suitably switching the backlight illumination duration or the ratio of the image display duration in one frame period (impulse ratio), in a configuration that simulates impulse-type drive display using full-screen flashing type backlight illumination.

Further, since the luminous brightness of backlight 7 (backlight brightness) can be varied in accordance with the illumination duration of backlight 7 in one frame period (impulse ratio) while the gray scale levels of the input image signal are converted through gray scale converter 4, it is possible to always keep the relationship between the input image signal and the display brightness constant regardless of the impulse ratio.

Instead of driving backlight 7 in a full-screen flashing illumination (intermittent illumination) manner as in the above embodiment, it is also possible to modulate the image display light by arranging a shutter device such as of LCD or the like that limits the light transmitting duration (image display duration) in one frame period, between a continuously illuminating backlight and a liquid crystal display panel.

[The Second Embodiment]

Next, the second embodiment of the present invention will be described with reference to FIGS. 11 and 12. The same components as in the first embodiment will be allotted with the same reference numerals and their description is omitted. Here, FIG. 11 is an illustrative view for explaining one example of a basic operating mechanism in the liquid crystal display of the present embodiment, and FIG. 12 is an illustrative view for explaining another example of a basic operating mechanism in the liquid crystal display of the present embodiment.

Figure 1:
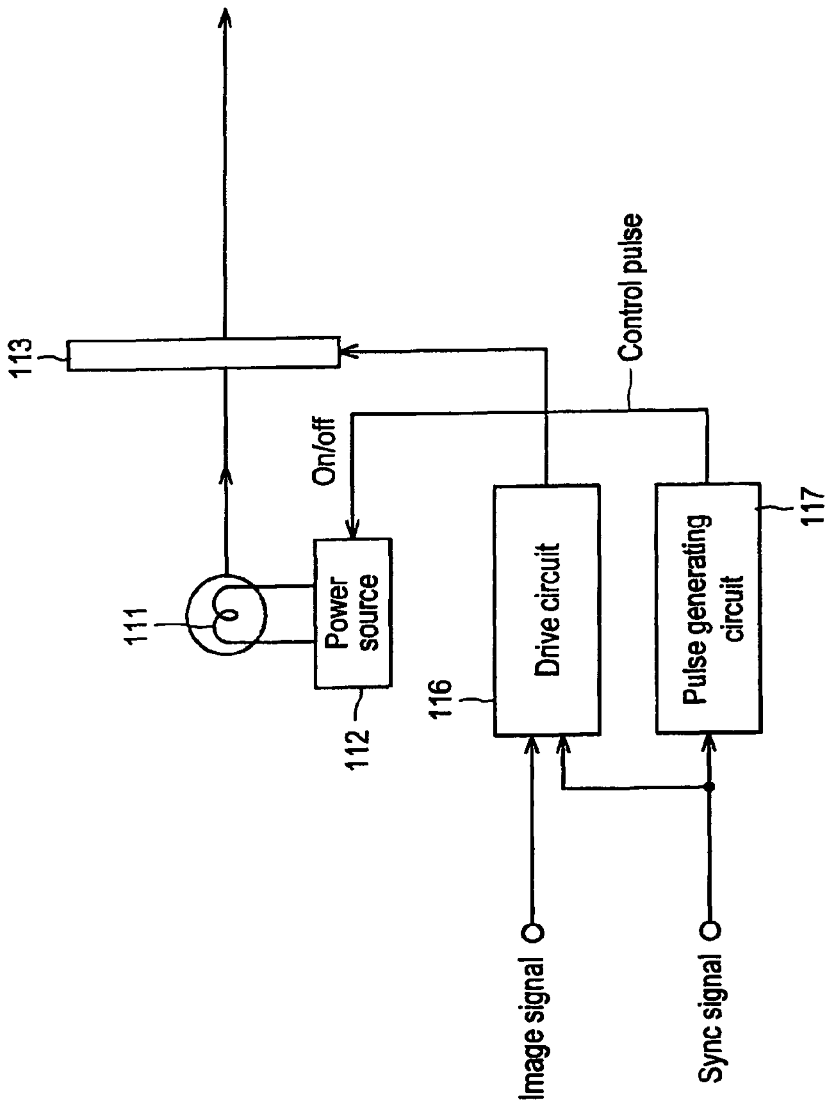
FIG. 1 is a functional block diagram showing a fundamental schematic configuration in a conventional liquid crystal display (full-screen flash type).
Figure 2:
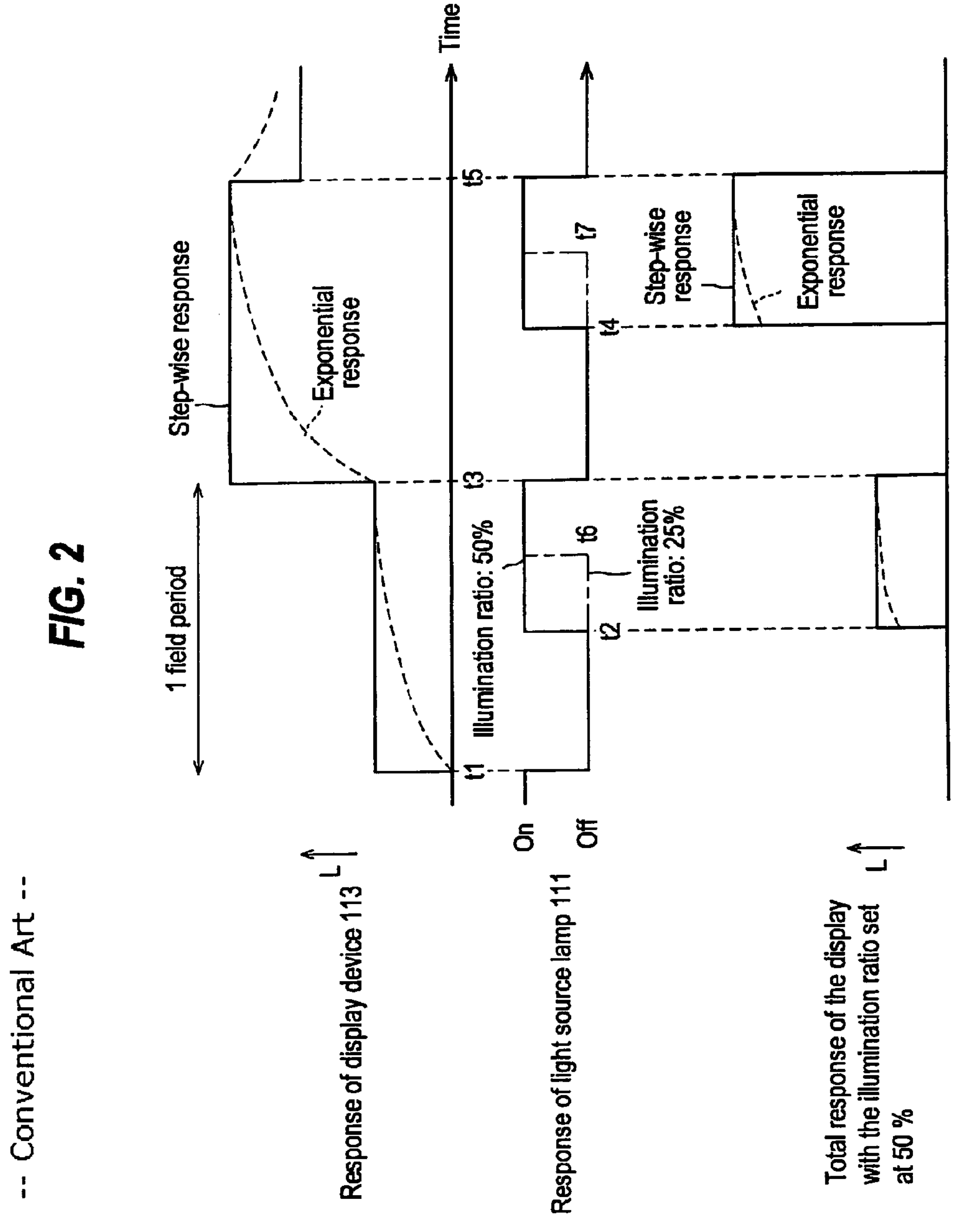
FIG. 2 is an illustrative view showing display response in a conventional liquid crystal display (full-screen flash type).
Figure 3:
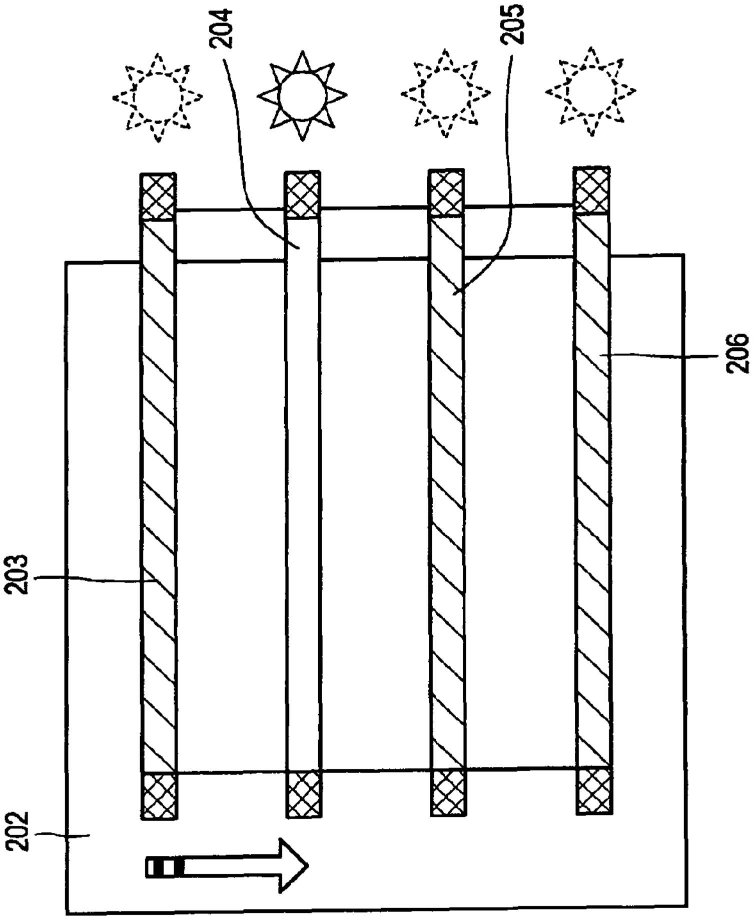
FIG. 3 is an illustrative view showing a layout example of backlight for a liquid crystal display panel in a conventional liquid crystal display (scan type).
Figure 4:
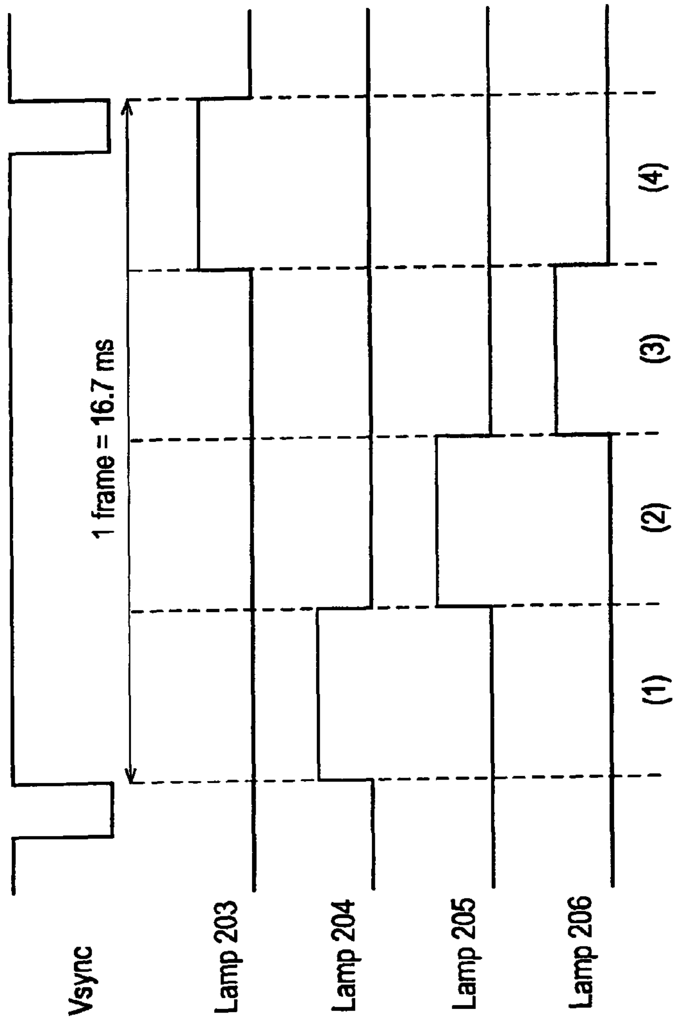
FIG. 4 is an illustrative view showing one example of timing for turning on/off individual lamps in a conventional liquid crystal display (scan type).
Figure 5:
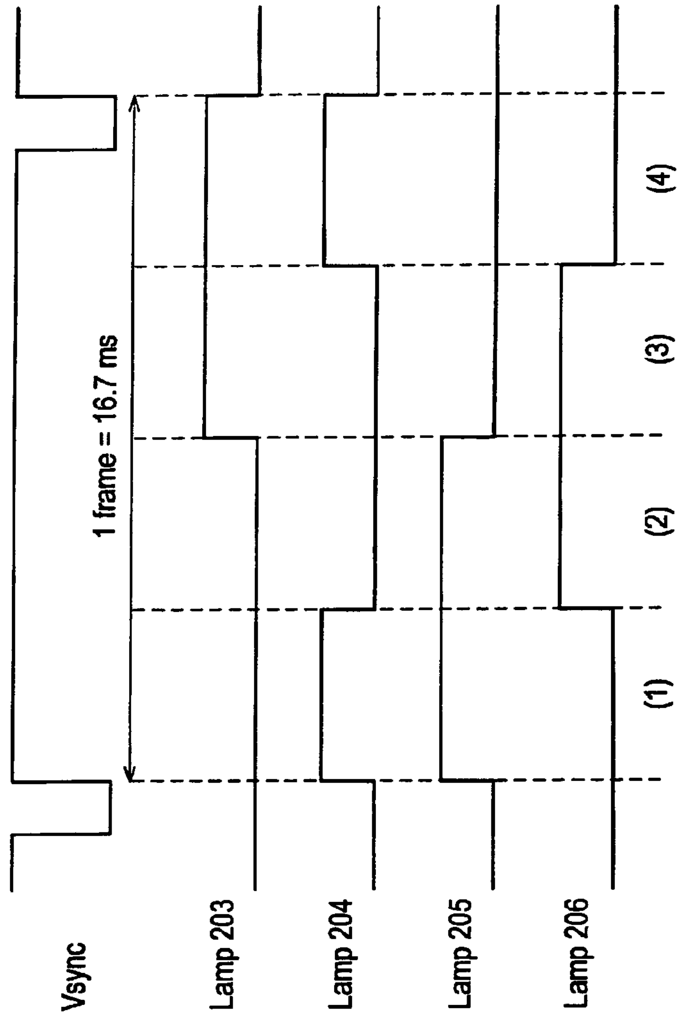
FIG. 5 is an illustrative view showing another example of timing for turning on/off individual lamps in a conventional liquid crystal display (scan type).

The liquid crystal display of the present embodiment is to prevent blur injury arising when displaying motion pictures, with scanning type backlight illumination, and the basic functional block diagram is much the same as the first embodiment described above with reference to FIG. 1. The difference is that a multiple number of bottom-emitting fluorescent lamps disposed parallel to the scan lines, or a multiple number of bottom-emitting or side-illuminating LED light sources or EL light sources, or others are used to constitute a backlight 7, and the light source is divided into luminous sections every predetermined number so that these sections are controlled to sequentially illuminate scan-wise in one frame period. Control CPU 10 controls the timing of activating scan-wise the luminous sections one to another in the backlight, based on the vertical/horizontal synchronizing signals (scan signals) extracted through synchronizing signal extractor 9 and the contents information contained in the control data that was separated through demultiplexer 1.

Figure 11:
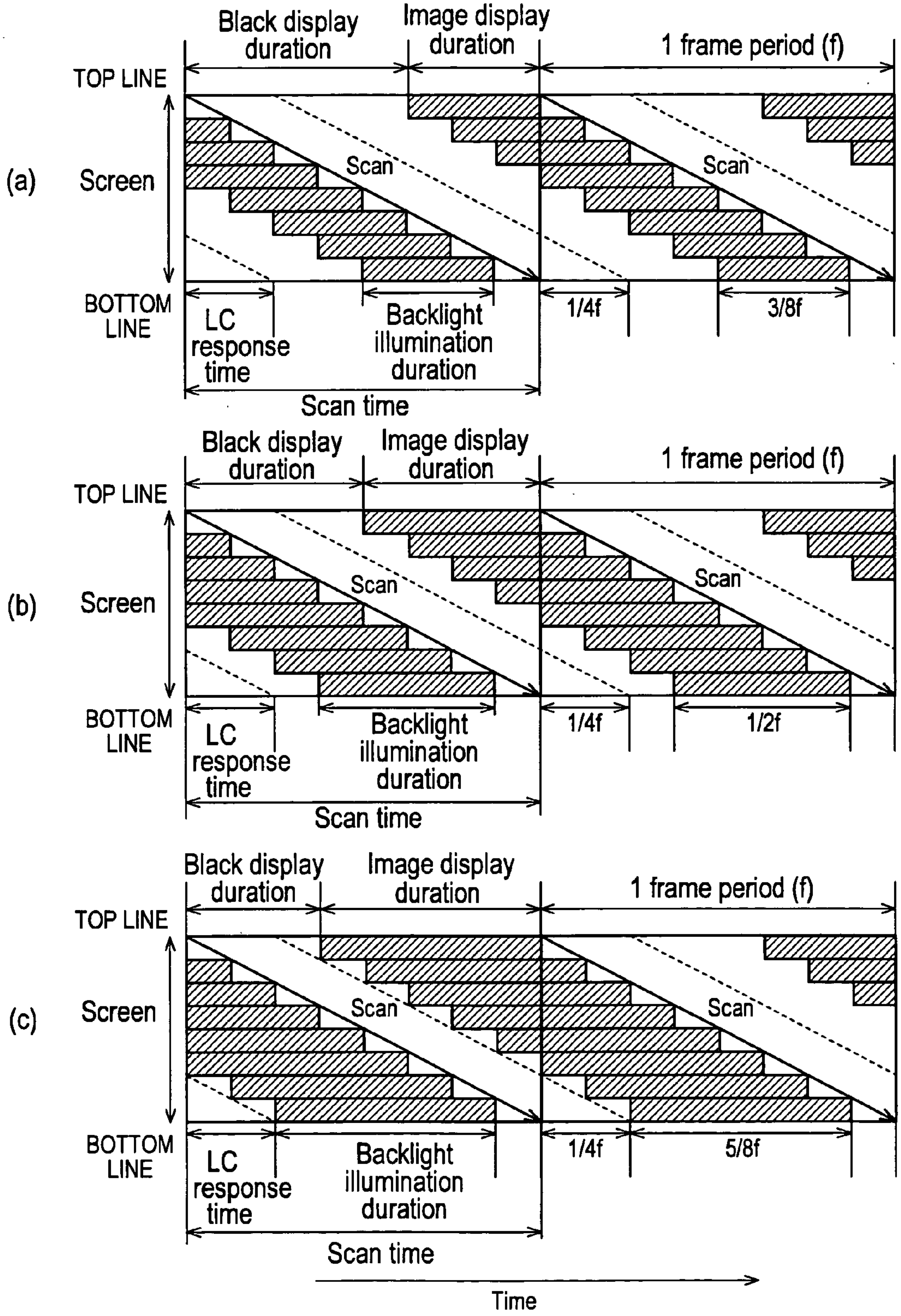
FIG. 11 is an illustrative view for explaining one example of a basic operating mechanism in the second embodiment of a liquid crystal display of the present invention.
Figure 12:
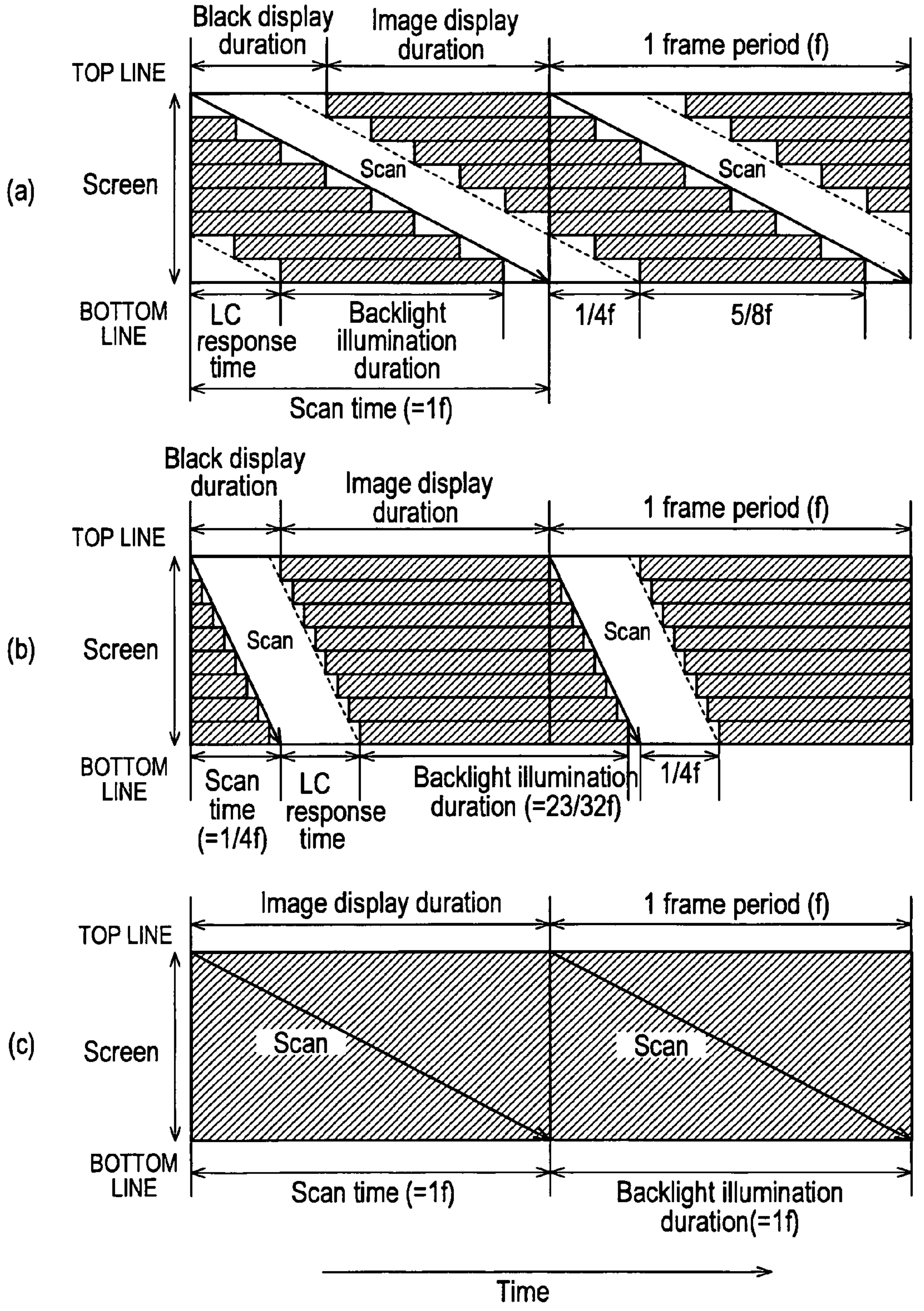
FIG. 12 is an illustrative view for explaining another example of a basic operating mechanism in the second embodiment of a liquid crystal display of the present invention.

Illustratively, as shown in FIG. 11, in the present embodiment, scanning (image writing) of a certain group of horizontal lines (divided display section) has been completed, then the luminous section (made of a group of fluorescent lamps or a group of LEDs) of backlight 7 corresponding to the group of horizontal lines is activated taking into account a lapse of the LC response delay. This process is repeated one to the next in the vertical direction. In this way, it is possible to sequentially shift the backlight illumination duration corresponding to the write-scanning section of the image signal, from one luminous section to the next with the passage of time, as indicated by hatching in FIG. 11.

The backlight illumination duration of each luminous section indicated by hatching in FIG. 11, or the image display duration in one frame period (impulse ratio), is varied based on the type of the image content to be displayed, whereby image quality degradation arising depending on the type of the image content due to blur injury, stroboscopic effect, flickering and other factors is appropriately controlled, thus total image quality improvement is realized.

Also in this embodiment, control CPU 10 makes control of light source driver 8 so as to vary the luminous brightness of backlight 7 or makes control of gray scale converter 4 so as to vary the gray scale levels of the input image signal as it variably controls the illumination duration of backlight 7 (image display duration). In this case, the luminous brightness (backlight brightness) of backlight 7 is enhanced while the input image signal levels are converted by gray scale converter 4 so that the input image signal and the display brightness will hold a constant relationship if the illumination duration (illumination ratio) of backlight 7 is reduced.

Gray scale converter 4 converts the input image signal levels (gray scale levels) in order to effect image display without change of gamma characteristic if the impulse ratio is varied. Specifically, for each impulse ratio, a conversion table (LUT) for converting the input image signal levels (gray scale levels) so that gamma characteristic will not vary has been stored in ROM or the like, and gray scale converter 4 converts the input image signal levels (gray scale levels) with reference to this conversion table. In this way, it is possible to suppress the occurrence of image quality degradation due to change in gamma characteristic.

Further, the control CPU 10 controls frame frequency converter 3, as required, so as to very the frame frequency of the image signal to be supplied to liquid crystal display panel 6. Frame frequency converter 3, having, for example, a frame memory, stores one frame of image of the input image signal, into the frame memory, then outputs the image signal of which the frame frequency has been converted into a predetermined frame frequency based on the control signal from control CPU 10, to thereby compress the input image signal with respect to the temporal axis.

For example, FIGS. 11(*a*) to (*c*) show an operational example of switching of the image display duration in one frame period, into three classes, i.e., 3/8 frame period, 1/2 frame period and 5/8 frame period, respectively, by variably controlling the timing at which backlight illumination for each luminous section of backlight 7 is activated, without change of the frame frequency (60 Hz) of the input image signal.

Specifically, in a case where an input image content is one that was shot dark, outdoors, such as a broadcast of a night game of baseball or soccer (see FIG. 7(*c*)), the material was likely taken at low shutter speeds, entailing a large amount of motion blur. Therefore, there is little possibility of image quality defects such as stroboscopic effect, flickering and others occurring even if the impulse ratio is set small.

For this reason, as shown in FIG. 11(*a*), image write-scan for a certain group of horizontal lines has been completed, then after a lapse of a period of time (here, a 1/2 frame period) sufficiently longer than the predetermined liquid crystal response time, the luminous section of backlight 7 corresponding to the group of horizontal lines is activated and kept lit for the backlight illumination duration (image display duration) until the image write-scan of the next frame starts. Thereby, the impulse ratio is set to be 37.5% and it is possible to realize sharp and clear display of motion pictures by preventing occurrence of blur injuries as well as to render smooth motion of moving objects with a certain amount of motion blur.

When an input image content is, for example, a motion picture or one that was shot under strong lighting in a studio or the like (e.g., news programs, broadcasts of indoor competitions such as swimming races)(see FIG. 7(*b*)), the material was likely taken at high shutter speeds, entailing a small amount of motion blur. Therefore, there is a possibility of image quality defects such as stroboscopic effect, flickering and others occurring if the impulse ratio is set small.

For this reason, as shown in FIG. 11(*b*), image write-scan for a certain group of horizontal lines has been completed, then after a lapse of a period of time (here, a 3/8 frame period) longer than the predetermined liquid crystal response time, the luminous section of backlight 7 corresponding to the group of horizontal lines is activated so that the backlight illumination duration (image display duration) is increased. Thereby, the impulse ratio is set to be 50% and it is possible to reproduce smooth motion of moving objects by preventing occurrence of blur injuries while suppressing occurrence of image quality defects such as stroboscopic effect, flickering and the like.

Further, when an input image content is one that is free from motion blur such as CG (computer graphics), animation, games and the like (see FIG. 7(*a*)), there is a high possibility of image quality defects such as stroboscopic effect, flickering and others occurring if the impulse ratio is set small.

Therefore, as shown in FIG. 11(*c*), image write-scan for a certain group of horizontal lines has been completed, then after a lapse of just the predetermined liquid crystal response time (here, a 1/4 frame period), the luminous section of backlight 7 corresponding to the group of horizontal lines is activated and kept lit for the backlight illumination duration (image display duration) until the image write-scan of the next frame starts. Thus, the impulse ratio is set to be 62.5% and it is possible to reproduce smooth motion of moving objects by preventing occurrence of blur injuries while suppressing occurrence of image quality defects such as stroboscopic effect, flickering and the like.

As has been described above, the backlight illumination duration (image display duration) is varied by delaying the time at which backlight for each luminous section is turned on or by bringing forward the time at which backlight is turned off, in accordance with the type of the image content to be displayed. Thereby, it is possible to appropriately inhibit image quality degradation due to blur injury, stroboscopic effect, flickering and other factors, hence realize total improvement in image quality.

Here, in the example shown in FIG. 11, the frame frequency of the display image signal is fixed (60 Hz). However, it is also possible to change the impulse ratio by causing control CPU 10 to control frame frequency converter 3 so as to vary the frame frequency of the display image signal while varying the backlight illumination duration, as shown in FIG. 12, for example.

For example, when an input image content is one that was shot dark, outdoors, such as a broadcast of a night game of baseball or soccer (see FIG. 7(*c*)), the material was likely taken at low shutter speeds, entailing a large amount of motion blur. Therefore, there is little possibility of image quality defects such as stroboscopic effect, flickering and others occurring even if the impulse ratio is set small.

For this reason, as shown in FIG. 12(*a*), with no frame frequency conversion of the input image signal implemented, image write-scan for a certain group of horizontal lines has been completed, then after a lapse of just the predetermined liquid crystal response time (here, a 1/4 frame period), the luminous section of backlight 7 corresponding to the group of horizontal lines is activated and kept lit for the backlight illumination duration (image display duration) until the image write-scan of the next frame starts. Thereby, the impulse ratio is set to be 62.5% and it is possible to realize sharp and clear display of motion pictures free from occurrence of blur injuries and reproduce smooth motion of moving objects with a certain amount of motion blur.

When an input image content is, for example, a motion picture or one that was shot under strong lighting in a studio or the like (e.g., news programs, broadcasts of indoor competitions such as swimming races)(see FIG. 7(*b*)), the material was likely taken at high shutter speeds, entailing a small amount of motion blur. Therefore, there is a possibility of image quality defects such as stroboscopic effect, flickering and others occurring if the impulse ratio is set small.

Therefore, as shown in FIG. 12(*b*), the frame frequency of the input image signal is converted fourfold into 240 Hz so as to reduce the image write-scanning duration to a 1/4 frame period, and image write-scan for a certain group of horizontal lines has been completed, then after just a lapse of a period of time (here, a 1/4 frame period) longer than the predetermined liquid crystal response time, the luminous section of backlight 7 corresponding to the group of horizontal lines is activated so that the backlight illumination duration (image display duration) is increased. Thereby, the impulse ratio is set to be about 72% and it is possible to reproduce smooth motion of moving objects by preventing occurrence of blur injuries while suppressing occurrence of image quality defects such as stroboscopic effect, flickering and the like.

Further, when an input image content is one that is free from motion blur such as CG (computer graphics), animation, games and the like (see FIG. 7(*a*)), there is a high possibility of image quality defects such as stroboscopic effect, flickering and others occurring if the impulse ratio is set small.

For this reason, as shown in FIG. 12(*c*), with no conversion of the frame frequency of the input image signal implemented, backlight 7 is controlled so as to be continuously and fully activated (continuous illumination) without regard to the liquid crystal response duration, the impulse ratio is switched to be 100% (full hold-type display mode), whereby it is possible to reproduce smooth motion of moving objects (image quality defects such as stroboscopic effect, flickering etc., will be alleviated as moving objects blur).

As has been described above, the backlight illumination duration (image display duration) in one frame period is varied in accordance with the type of the image content to be displayed, whereby it is possible to appropriately inhibit image quality degradation due to blur injury, stroboscopic effect, flickering and other factors, hence realize total improvement in image quality. Further, it is also possible to further improve the variable flexibility of the impulse ratio in accordance with the size, response characteristic etc., of liquid crystal display panel 6 in combination with the example shown in FIG. 11.

The above embodiment is configured so that the backlight illumination duration (image display duration) in one frame period, i.e., the impulse ratio, can be switched to three classes including the full hold type display mode (impulse ratio: 100%), in accordance with the types of image contents. However, the present invention should not be limited to this. It goes without saying that the present invention can be realized as long as the impulse ratio can be switched between two or more predetermined values, in accordance with the type of the image content. For example, it is possible to construct a simple configuration in which the display is simply switched between the impulse type display mode and the hold type display mode, (i.e., the impulse-type display mode off), in an alternative manner.

Further, as the contents information, the EPG (electronic program guide) information that can be obtained from the broadcasting signal from a broadcasting station or, from external media can be used. Alternatively, when additional motion blur data and/or information of the shooting conditions such as shutter speed, etc., as to the input image content can be obtained, based on this information it is possible to determine the type of the image content to be displayed.

Moreover, in order to achieve the optimal image quality (video output characteristic) adjustment for each of input video sources such as “standard”, “cinema”, “game” and the like, the image display device of this kind is configured so that the user is able to select the input video source (video position) through a menu setting frame. This information as to the input video source selection designated by the user may also be used to determine the type of the image content to be displayed to thereby variably control the impulse ratio. For example, when “game” is selected and designated as the selection item of the video source (video position) through the menu setting frame, it is possible to switch and set the impulse ratio to a high value in link with this selection. In this way, it is possible to provide a configuration in which the impulse ratio is variably controlled by determining the type of the image content to be displayed with reference to the user’s instructional information concerning video adjustment items.

Moreover, in the above embodiment, backlight 7 is divided into eight luminous sections (groups of horizontal lines) so that the sections are sequentially illuminated scan-wise. However, the backlight may be divided into any number of luminous sections as long as it is divided into two or more. Further, it is obvious that backlight 7 is not necessarily divided into horizontal strips (parallel to the scan lines) of luminous sections. Also in this respect, use of a bottom-emitting planar LED device as a backlight 7 can afford improved flexibility for designing the divided luminous sections, compared to the others. Further, use of a LED device as a backlight 7 also makes it possible to control the backlight brightness relatively easily by regulating its drive current.

As has been described heretofore, the liquid crystal display of the present embodiment is able to appropriately control the image quality degradation due to blur injury, stroboscopic effect, flickering and other factors, hence realize total image quality improvement, by suitably switching the backlight illumination duration of each luminous section, or the ratio of the image display duration in one frame period (impulse ratio) in accordance with the type of image content, in a configuration that simulates impulse-type drive display using scanning type backlight illumination.

Further, since the luminous brightness of backlight 7 (backlight brightness) can be varied in accordance with the illumination duration of backlight 7 in one frame period (impulse ratio) while the gray scale levels of the input image signal are converted through gray scale converter 4, it is possible to always keep the relationship between the input image signal and the display brightness constant regardless of the impulse ratio.

Instead of driving multiply divided luminous sections of backlight 7 in a sequential scanning illumination (intermittent illumination) manner as in the above embodiment, it is also possible to modulate the image display light by arranging a shutter device such as of LCD or the like that limits the light transmitting duration (image display duration) for each divided display section in one frame period, between a continuously illuminating backlight and a liquid crystal display panel.

[The Third Embodiment]

Figure 13:
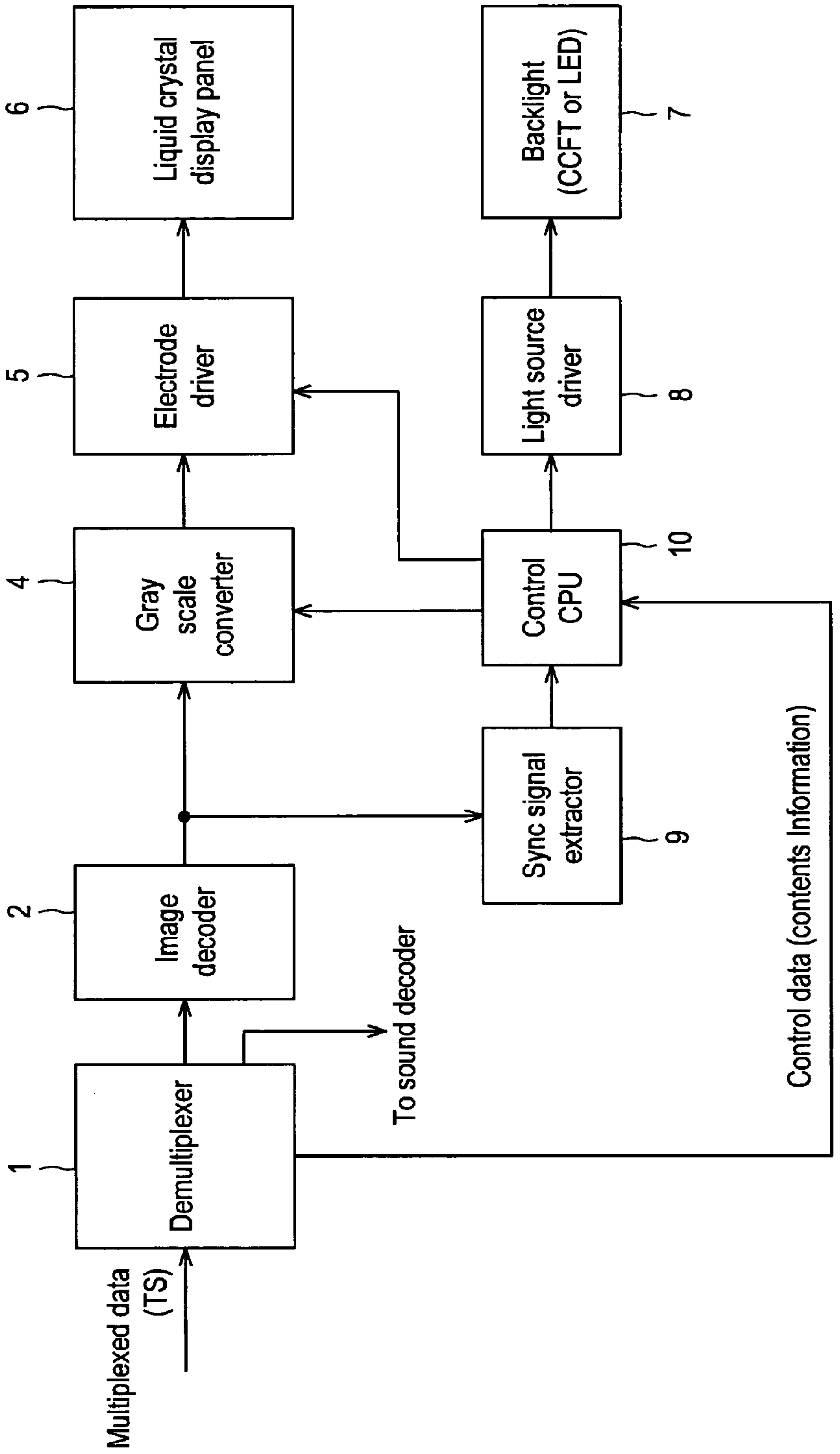
FIG. 13 is a functional block diagram showing a fundamental schematic configuration in the third embodiment of a liquid crystal display of the present invention.
Figure 14:
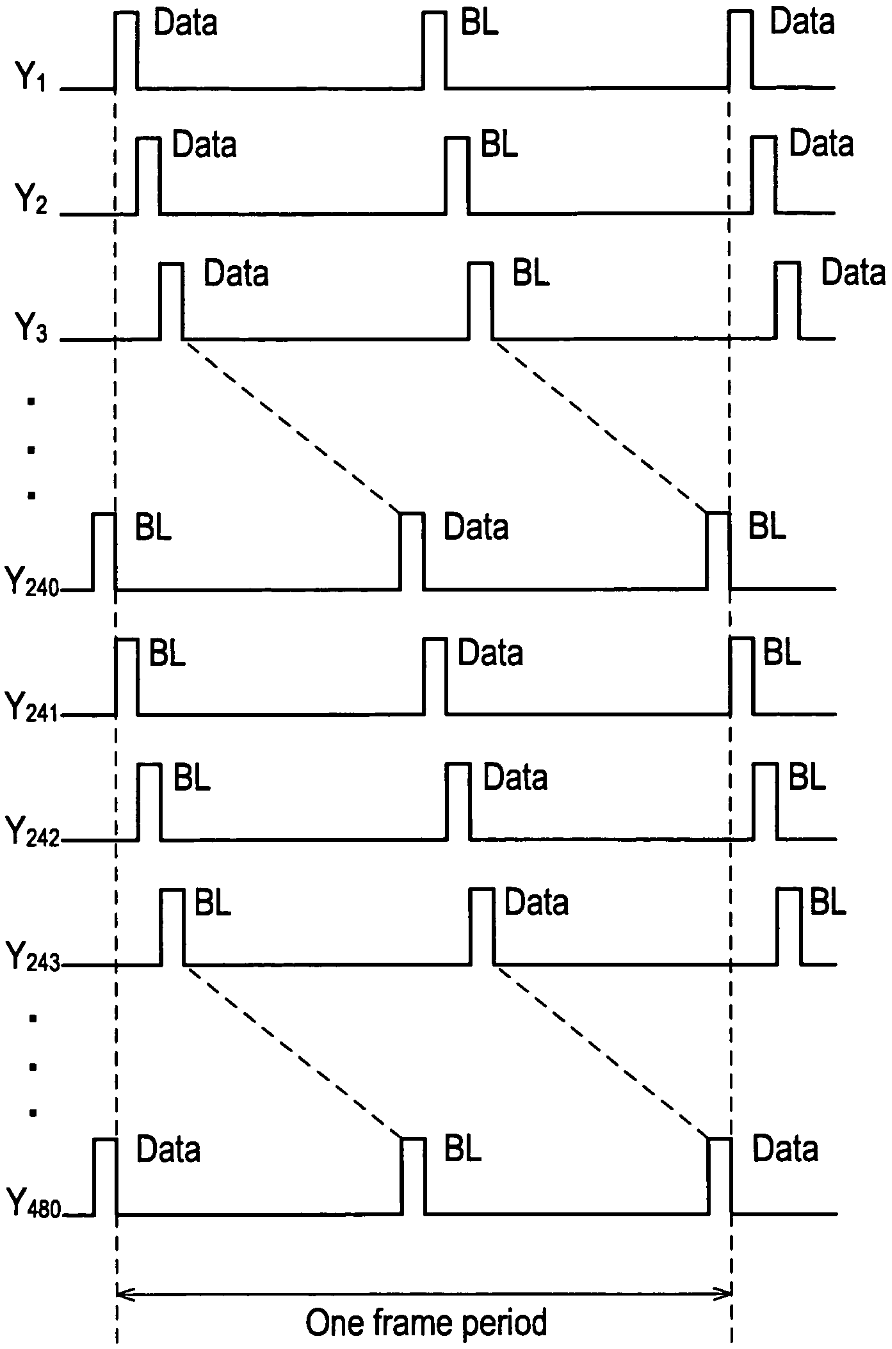
FIG. 14 is a timing chart for explaining an electrode drive operation in the third embodiment of a liquid crystal display of the present invention.
Figure 15:
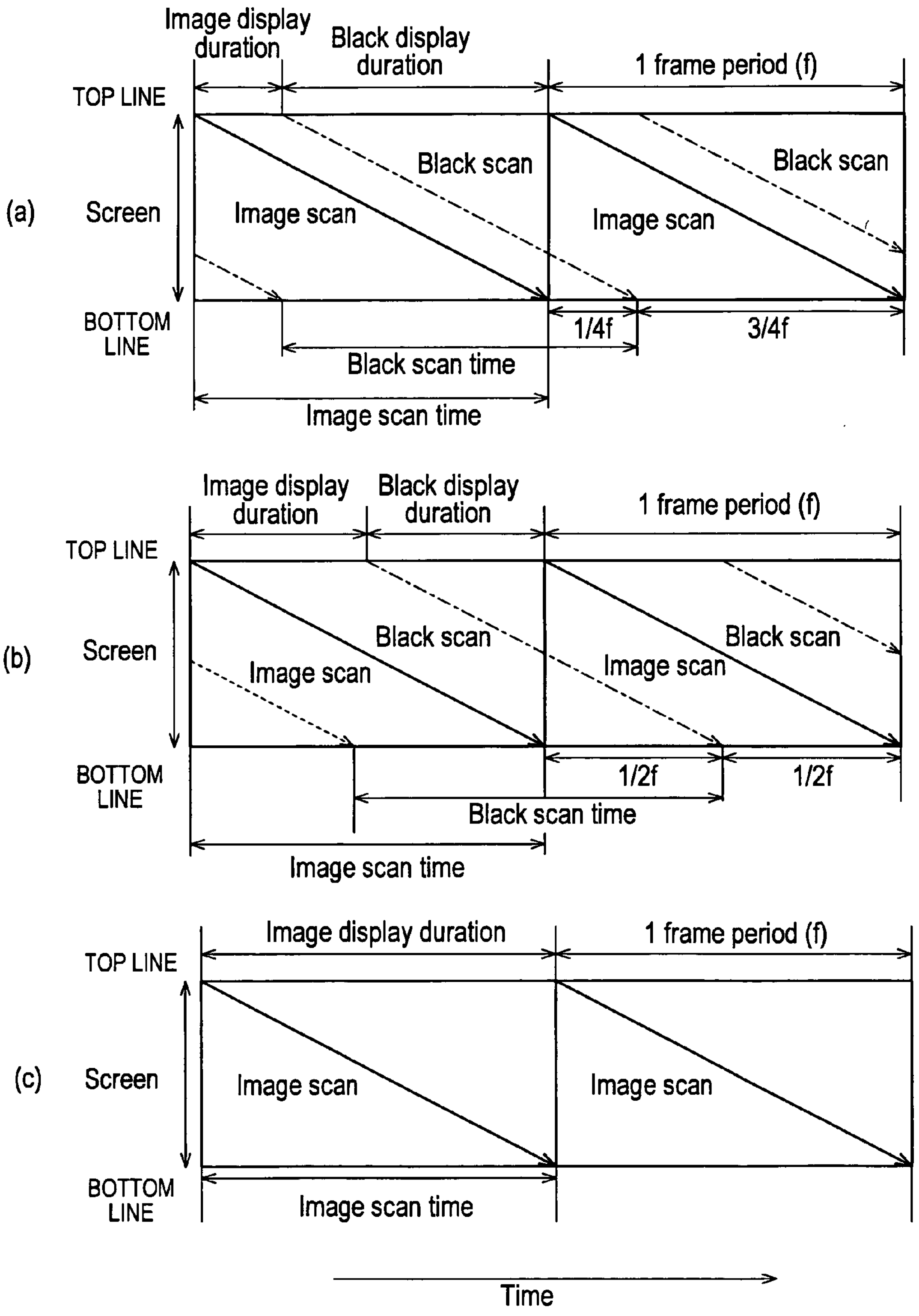
FIG. 15 is an illustrative view for explaining the basic operating mechanism in the third embodiment of a liquid crystal display of the present invention.

Next, the third embodiment of the present invention will be described with reference to FIGS. 13 to 15. The same components as in the second embodiment will be allotted with the same reference numerals and their description is omitted. Here, FIG. 13 is a functional block diagram showing a fundamental schematic configuration of a liquid crystal display of the present embodiment; FIG. 14 is a timing chart for explaining an electrode drive operation in a liquid crystal display of the present embodiment; and FIG. 15 is an illustrative view for explaining one example of a basic operating mechanism in a liquid crystal display of the present embodiment.

The liquid crystal display of this embodiment is to prevent blur injuries arising when displaying motion pictures by the black insertion scheme, or by writing the image display signal scan-wise and subsequently writing the black display signal scan-wise (resetting scan) into liquid crystal display panel 16 within one frame period with backlight 7 constantly activated (continuous illumination), as shown in FIG. 14, and is characterized in that control CPU 10 variably controls the timing when the black display signal is written by electrode driver 5, based on the type of the image content.

Specifically, electrode driver 5 selects each scan line for image display and selects the same line once again for black display. In time with these selections, the driver provides the input image signal and black display signal to every data line. This series of operations is performed in a cycle of one frame period. Thus, the duration for displaying the black signal (black display duration) is generated between one frame of image display and the next frame of image display. Here, the write-timing (delay time) of the black display signal relative to the write-timing of the image signal is varied in accordance with the image contents type determined by control CPU 10.

With the variable control of the black display duration, control CPU 10 further makes control of light source driver 8 so as to vary the luminous brightness of backlight 7 or makes control of gray scale converter 4 so as to vary the gray scale levels of the input image signal. In this case, the luminous brightness (backlight brightness) of backlight 7 is enhanced while the input image signal levels are converted by gray scale converter 4 so that that the input image signal and the display brightness will hold a constant relationship if the image display duration is shortened.

Further, gray scale converter 4 converts the input image signal levels (gray scale levels) in order to effect image display without change of gamma characteristic if the impulse ratio is varied. Specifically, for each impulse ratio, a conversion table (LUT) for converting the input image signal levels (gray scale levels), so that gamma characteristic will not vary, has been stored in ROM or the like, and gray scale converter 4 converts the input image signal levels (gray scale levels) with reference to this conversion table. In this way, it is possible to suppress the occurrence of image quality degradation due to change in gamma characteristic.

FIG. 14 is a timing chart for the scan lines (gate lines) of liquid crystal display panel 6. In order to allow the image signal to be written into pixel cells through signal lines (data lines), gate lines Y1 to Y480 are enabled from one to the next with a short period of time shifted, in one frame period. When all of 480 gate lines have been enabled to write the image signal into the pixel cells, one frame period completes.

During this period, gate lines Y1 to Y480 are enabled once again, after a delay time, which is determined based on the type of the image content, from when each line is first enabled for writing the image signal, so that a voltage displaying black is supplied to every pixel cell through data lines X. With this operation every pixel cell is set into the black display state. That is, each gate line Y is set into the high level, twice, at different times within one frame period. At the first selection, each pixel cell displays image data for a fixed period of time, then the pixel cell is forced to make black display at the following, second selection.

For example, FIGS. 15(*a*) to (*c*) show an operational example of switching of the image display duration in one frame period, into three classes, i.e., ¼ frame period, ½ frame period and 1 frame period, respectively, by variably controlling the timing at which the black display signal is written in without change of the frame frequency (60 Hz) of the input image signal.

Specifically, in a case where an input image content is one that was shot dark, outdoors, such as a broadcast of a night game of baseball or soccer (see FIG. 7(*c*)), the material was likely taken at low shutter speeds, entailing a large amount of motion blur. Therefore, there is little possibility of image quality defects such as stroboscopic effect, flickering and others occurring even if the impulse ratio is set small.

For this reason, as shown in FIG. 15(*a*), writing of the image display signal into a certain pixel has been completed, then writing of the black display signal is started after a lapse of a ¼ frame period, and the black display is kept (for a ¾ frame period) until the image write-scan of the next frame starts. Thereby, the impulse ratio is set to be 25% and it is possible to realize sharp and clear display of motion pictures by preventing occurrence of blur injuries as well as to render smooth motion of moving objects with a certain amount of motion blur.

When an input image content is, for example, a motion picture or one that was shot under strong lighting in a studio or the like (e.g., news programs, broadcasts of indoor competitions such as swimming races)(see FIG. 7(*b*)), the material was likely taken at high shutter speeds, entailing a small amount of motion blur. Therefore, there is a possibility of image quality defects such as stroboscopic effect, flickering and others occurring if the impulse ratio is set small.

For this reason, as shown in FIG. 15(*b*), writing of the image display signal into a certain pixel has been completed, then writing of the black display signal is started after a lapse of a ½ frame period, and the black display is kept (for a ½ frame period) until the image write-scan of the next frame starts. This setting increases the image display duration and determines the impulse ratio to be 50% thus making it possible to reproduce smooth motion of moving objects by preventing occurrence of blur injuries while suppressing occurrence of image quality defects such as stroboscopic effect, flickering and the like.

Further, when an input image content is one that is free from motion blur such as CG (computer graphics), animation, games and the like (see FIG. 7(*a*)), there is a high possibility of image quality defects such as stroboscopic effect, flickering and others occurring if the impulse ratio is set small.

For this reason, as shown in FIG. 15(*c*), control is made such that no write scan of the black display signal is implemented or no black display duration is provided (the image display duration is kept for one frame period). Thereby, the impulse ratio is switched to be 100% (full hold-type display mode), so that it is possible to reproduce smooth motion of moving objects (image quality defects such as stroboscopic effect, flickering etc., will be alleviated as moving objects blur).

As has been described above, the duration of the black display signal application (non-display duration of the image signal), i.e., the image display duration is varied in accordance with the image content to be displayed, whereby it is possible to appropriately inhibit image quality degradation due to blur injury, stroboscopic effect and other factors, hence realize total improvement in image quality.

The above embodiment is configured so that the image display duration in one frame period, or the impulse ratio can be switched to three classes including the full hold type display mode (impulse ratio: 100%), in accordance with the types of image contents. However, the present invention should not be limited to this. It goes without saying that the present invention can be realized as long as the impulse ratio can be switched between two or more predetermined values, in accordance with the type of the image content. For example, it is possible to construct a simple configuration in which the display is simply switched between the impulse type display mode and the hold type display mode (i.e., the impulse type display mode off), in an alternative manner.

Further, as the contents information, the EPG (electronic program guide) information that can be obtained from the broadcasting signal from a broadcasting station or, from external media can be used. Alternatively, when additional motion blur data and/or information of the shooting conditions such as shutter speed, etc., as to the input image content can be obtained, based on this information it is possible to determine the type of the image content to be displayed.

Moreover, in order to achieve the optimal image quality (video output characteristic) adjustment for each of input video sources such as “standard”, “cinema”, “game” and the like, the image display device of this kind is configured so that the user is able to select the input video source (video position) through a menu setting frame. This information as to the input video source selection designated by the user may also be used to determine the type of the image content to be displayed to thereby variably control the impulse ratio. For example, when “game” is selected and designated as the selection item of the video source (video position) through the menu setting frame, it is possible to switch and set the impulse ratio to a high value in link with this selection. In this way, it is possible to provide a configuration in which the impulse ratio is variably controlled by determining the type of the image content to be displayed with reference to the user’s instructional information concerning video adjustment items.

Furthermore, in this embodiment, the input display image signal is supplied directly to liquid crystal display panel 16 without change of its frame frequency (60 Hz). However, it goes without saying that the frame frequency of the image signal can be varied. Also, backlight 7 may be adapted to turn off during the black display duration so as to reduce the backlight illumination duration, whereby it is possible to lengthen the life of backlight 7 and realize low power consumption. Here, use of an LED device as backlight 7 also makes it possible to control the backlight brightness relatively easily by regulating its drive current.

As has been described heretofore, the liquid crystal display of the present embodiment is able to appropriately control the image quality degradation due to blur injury, stroboscopic effect, flickering and other factors, hence realize total image quality improvement, by suitably switching the ratio of the image display duration in one frame period or impulse ratio in accordance with the type of image content, in a configuration that simulates impulse-type drive display using a black insertion display scheme.

Further, since the luminous brightness of backlight 7 (backlight brightness) can be varied in accordance with the image display duration in one frame period (impulse ratio) while the gray scale levels of the input image signal are converted through gray scale converter 4, it is possible to always keep the relationship between the input image signal and the display brightness constant regardless of the impulse ratio.

[The Fourth Embodiment]

Figure 16:
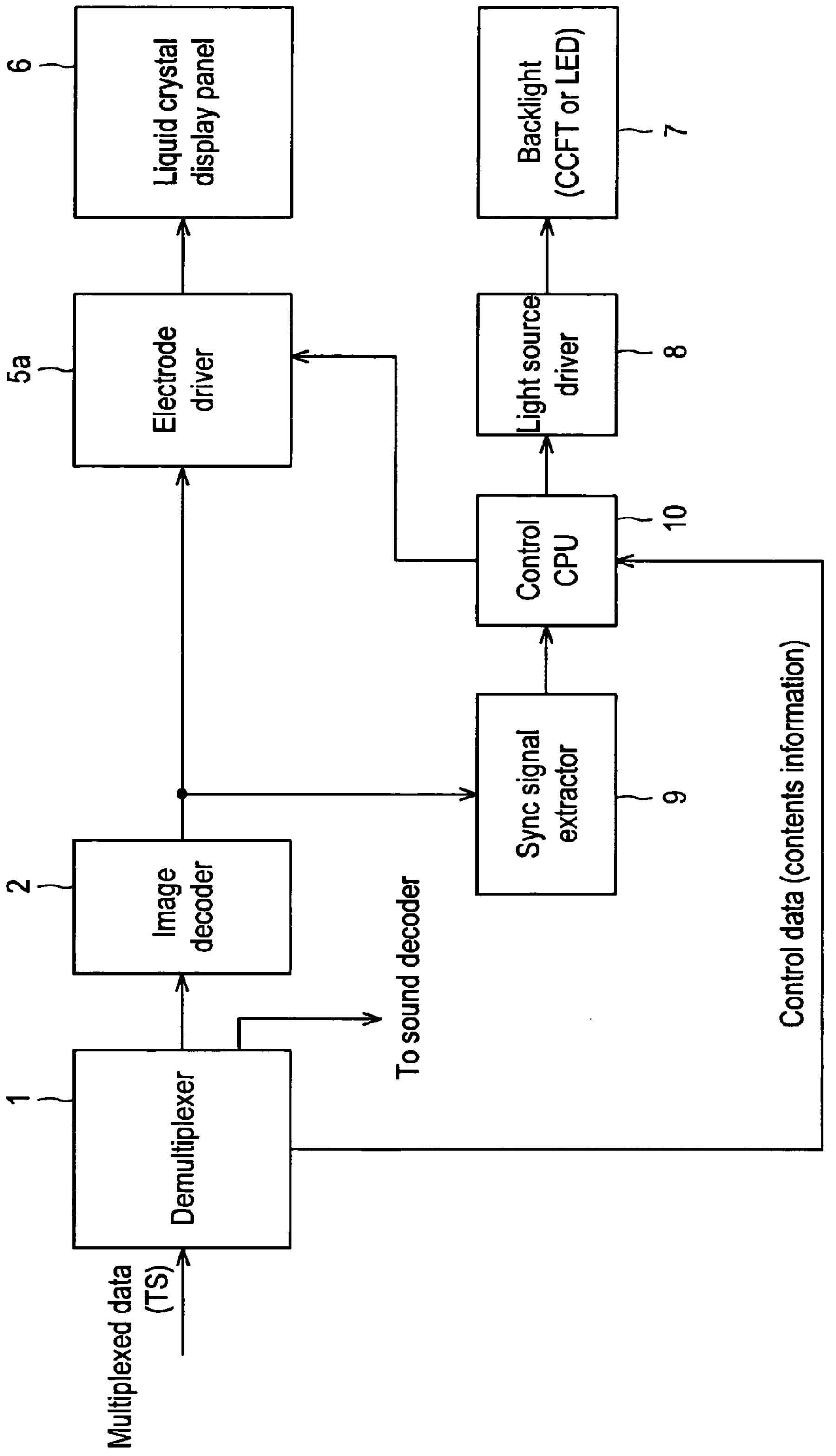
FIG. 16 is a functional block diagram showing a fundamental schematic configuration in the fourth embodiment of a liquid crystal display of the present invention.
Figure 17:
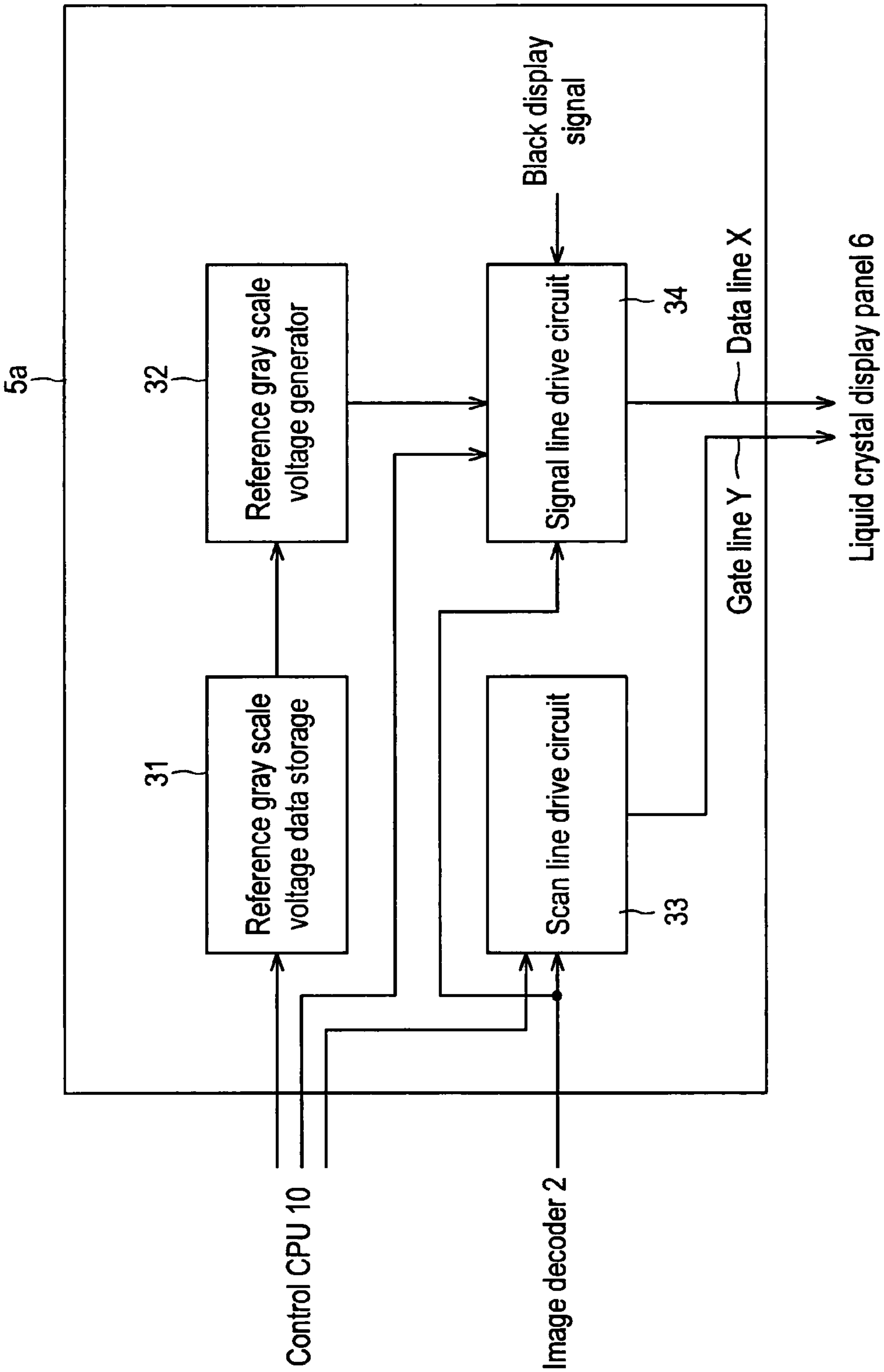
FIG. 17 is a functional block diagram showing an electrode driver in the fourth embodiment.
Figure 19:
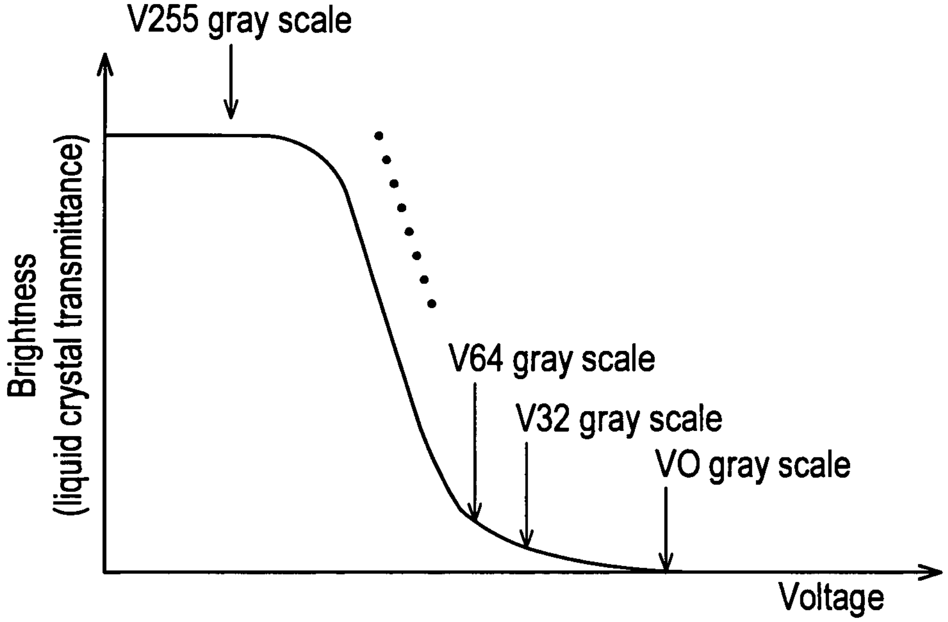
FIG. 19 is an illustrative chart showing one example of the relationship between the transmittance and the applied voltage to the liquid crystal.
Figure 20:
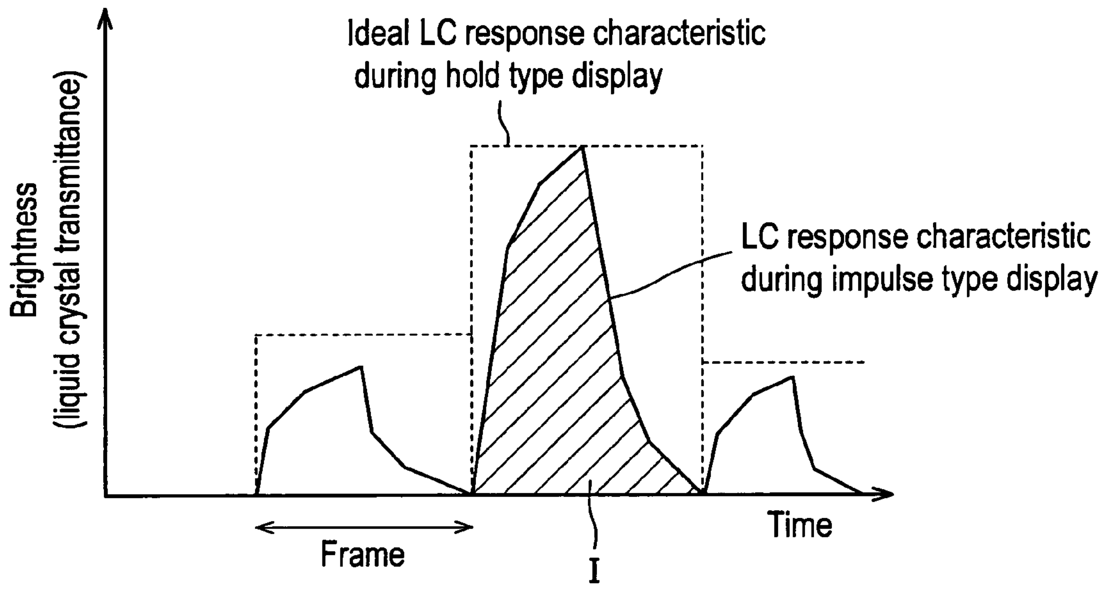
FIG. 20 is a schematic illustration showing a liquid crystal response characteristic in a liquid crystal display of the present invention.
Figure 21:
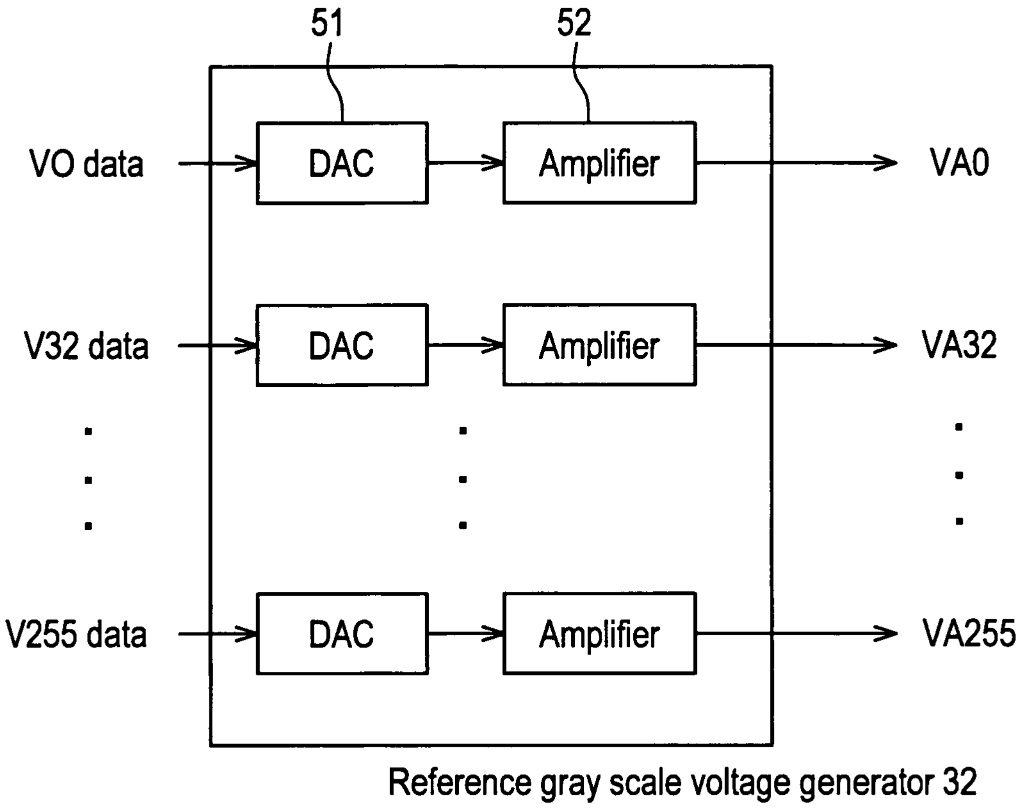
FIG. 21 is a block diagram showing a schematic configuration of a reference gray scale voltage generator in a liquid crystal display of the present invention.
Figure 22:
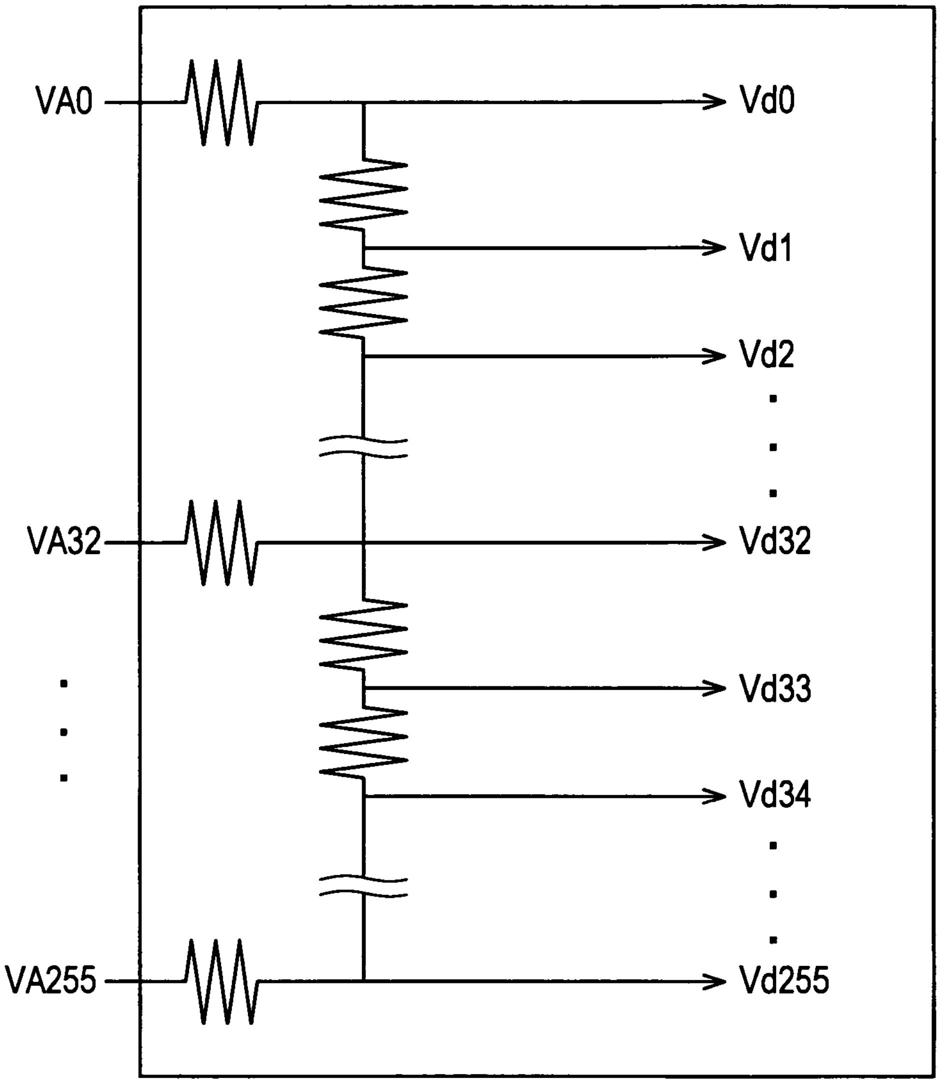
FIG. 22 is a circuit diagram showing a fundamental schematic configuration of a signal line drive circuit in a liquid crystal display of the present invention.
Figure 23:
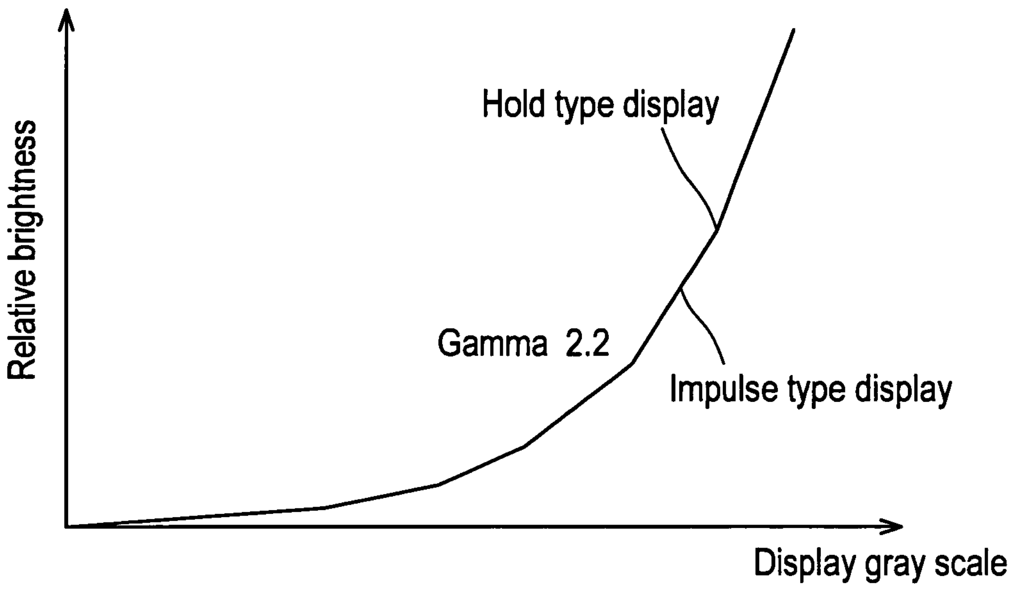
FIG. 23 is a schematic illustrative view showing gamma characteristics at hold-type display and at impulse-type display in a liquid crystal display of the present invention.

Next, the fourth embodiment of the present invention will be described with reference to FIGS. 16 to 23. The same components as in the third embodiment will be allotted with the same reference numerals and their description is omitted. Here, FIG. 16 is a functional block diagram showing a fundamental schematic configuration of a liquid crystal display of the present embodiment; FIG. 17 is a functional block diagram showing an electrode driver in the present embodiment; FIG. 18 is a schematic illustrative chart showing a content example of a data storage of reference gray scale voltage data in a liquid crystal display of the present embodiment; FIG. 19 is an illustrative chart showing one example of the relationship between the transmittance and the applied voltage to the liquid crystal; FIG. 20 is a schematic illustration showing the liquid crystal response characteristic in a liquid crystal display of the present embodiment; FIG. 21 is a block diagram showing a schematic configuration of a reference gray scale voltage generator in a liquid crystal display of the present embodiment; FIG. 22 is a circuit diagram showing a fundamental schematic configuration of a signal line drive circuit in a liquid crystal display of the present embodiment; and FIG. 23 is a schematic illustrative view showing gamma characteristics at hold-type display and at impulse-type display in a liquid crystal display of the present embodiment.

This embodiment is to prevent blur injuries arising when displaying motion pictures, by the black insertion scheme, or by writing the image display signal scan-wise and subsequently writing the black display signal scan-wise (resetting scan) into liquid crystal display panel 6 within one frame period with backlight 7 constantly activated (continuous illumination), basically similarly to the third embodiment, and is characterized in that control CPU 10 variably controls the timing when the black display signal is written by an electrode driver 5*a*, based on the type of the image content.

In the third embodiment, when the impulse ratio is varied by variable control of the black display duration, a conversion table has been prepared beforehand and gray scale converter 4 implements conversion with reference to the conversion table, in order to keep the gamma characteristic substantially unchanged. In contrast, in this embodiment, no gray scale converter 4 is provided as shown in FIG. 16, and electrode driver 5*a*, instead of gray scale converter 4, varies the gray scale voltages to be applied to liquid crystal display panel 6 in accordance with the impulse ratio so as to keep the gamma characteristic substantially unchanged.

With the variable control of the black display duration, control CPU 10 makes control of light source driver 8 so as to vary the luminous brightness of backlight 7 or makes control of electrode driver 5*a* so as to vary the gray scale voltages applied to liquid crystal display panel 6. In this case, the luminous brightness (backlight brightness) of backlight 7 is enhanced while the gray scale voltages applied to liquid crystal display panel 6 are varied by electrode driver 5*a* so that the input image signal and the display brightness will hold a constant relationship if the image display duration is shortened.

Next description will be detailed on the configuration of electrode driver 5*a*, the variable operation of the impulse ratio in use of the black display signal and the variable operation of the gray scale voltages applied to liquid crystal display panel 6. As shown in FIG. 17, this electrode driver 5*a* is composed of a reference gray scale voltage data storage 31, a reference gray scale voltage generator 32, a scan line drive circuit 33 and a signal line drive circuit 34.

For implementing impulse type display, the scan signal to be supplied from scan line drive circuit 33 to a scan line (gate line Y) of liquid crystal display panel 6 has two scan line select durations in one frame period, namely, the image display select duration for writing a gray scale voltage corresponding to the image display signal into the pixel electrode and the black display select duration for writing the voltage corresponding to the black display signal into the pixel electrode. Thereby, as shown in FIG. 14, each gate line Y is set into the high level twice at different times within one frame period. On the other hand, signal line drive circuit 34 outputs a gray scale voltage corresponding to the image display signal and the voltage corresponding to the black display signal, alternately, to liquid crystal display panel 6 through each signal line (data line X). In this way, each pixel cell displays the image display signal for a fixed period of time at the first selection, then the pixel cell is forced to make black display at the following, second selection.

Here, the black display select duration is supposed to be selected in accordance with the impulse ratio, and black display is supposed to be effected for the scan line above or below, by some multiple scan lines, the scan line of which the image display select duration is being selected. The signal line which is within the black display select duration is applied with the voltage corresponding to the black display signal so that black display can be made for every scan line. The selection of the line to which the black display signal is written in and the line to which the image display signal is written in is made by a scan line drive circuit 33, which is appropriately controlled by control CPU 10. Thus, the line to be written in with the image display signal and the line to be written in with the black display signal are successively scanned with an interval of multiple lines kept therebetween, one above and the other below.

The switching control between the image display signal and the black display signal in each frame is also done by control CPU 10. Observing one pixel column, signal line drive circuit 34 supplies signals to liquid crystal display panel 6 so that the image display signal for the image display select duration is given to one line (row) while the black display signal for the black display select duration is given to another line (row). With this configuration, it is possible to realize impulse type display for different impulse ratios by varying the ratio of the black display duration in one frame period.

To implement hold type display (impulse ratio: 100%), the input image signal is supplied to signal line drive circuit 34 while scan line drive circuit 33 is controlled by control CPU 10 so that every line is scanned in one frame period (no black display signal is written in). Thereby, it is possible to implement normal hold type display having an impulse ratio of 100%.

Next, the operation of varying the gray scale voltage to be applied to liquid crystal display panel 6 will be described. Reference gray scale voltage generator 32 supplies a reference gray scale voltage to signal line drive circuit 34 based on the reference gray scale voltage data stored in reference gray scale voltage data storage 31. Herein, reference gray scale voltage data storage 31 stores sets of reference voltage data for different impulse ratios, as shown in FIG. 18, (here, the sets for an impulse ratio of 100% corresponding to hold type display and for an impulse type display with an impulse ratio of 50% are shown), in separate ROM areas. Control CPU 10 selects and designates one from these and outputs it to reference gray scale voltage generator 32. The reference gray scale voltage data stored in reference gray scale voltage data storage 31 is set up in the following manner.

First, the reference gray scale voltage data for hold type display (impulse ratio: 100%) is determined so that, based on the relationship between the applied voltage and the liquid crystal transmittance, or the so-called V-T curve, shown in FIG. 19, the relationship between the display gray scale and the display brightness (liquid crystal transmittance) will be equivalent to the gamma 2.2 relationship, for example. In this case, when the display signal levels or the display data is represented by 8 bits or 256 gray scales, the voltage data V0, V32, . . . , V255 corresponding to gray scale levels 0, 32, 64, 96, 128, 160, 192, 224 and 255 are set up and stored. The voltage data for the gray scales other than these stored reference gray scales is set by linear resistance division using the above reference gray scale voltages. Thus, all the gray scale voltages to be applied to liquid crystal display panel 6 can be determined.

On the other hand, the reference gray scale voltage data for implementing impulse type display (impulse ratio: 50%) cannot be determined directly from the V-T curve shown in FIG. 19, but should be determined by determining the relationship between the applied voltage T to the liquid crystal and the integral I of the brightness over one frame period, the display brightness (transmittance) varying with time at the impulse type display shown in FIG. 20. The brightness integral I varies depending on the liquid crystal response speed. Also, since the liquid crystal response speed is different depending on the display gray scale, the relationship between the applied voltage and liquid crystal transmittance (brightness) shown in FIG. 19 will not hold. This means that the gray scale voltages determined from the V-T curve of FIG. 19 for implementation of hold type display are not able to provide desired gray scale representation.

Therefore, in order to implement impulse type display, the relationship between the integral I of the brightness over one frame period and the applied voltage need to be measured from the beginning to set up reference gray scale voltage data different from that for the hold type display. Setting of the reference gray scale voltage data is implemented so that the relationship between the display gray scale level and the integral I of display brightness (liquid crystal transmittance) will be equivalent to the gamma 2.2 relationship, for example. In this case, when the display signal level or the display data is represented by 8 bits or 256 gray scales, the voltage data V0, V32, . . . , V255 corresponding to gray scale levels 0, 32, 64, 96, 128, 160, 192, 224 and 255 are set up and stored. The voltage data for the gray scales other than these stored reference gray scales is set by linear resistance division using the above reference gray scale voltages. Thus, all the gray scale voltages to be applied to liquid crystal display panel 6 can be determined.

Reference gray scale voltage generator 32, as shown in FIG. 21, converts digital data V0, V32, . . . , V255 obtained from reference gray scale voltage data storage 31 into analog data through DA converters 51, then amplifies them as appropriate through respective amplifiers 52, to supply the adjusted reference gray scale voltages VA0, VA32, . . . , VA255 to signal line drive circuit 34 including source drivers, etc. In signal line drive circuit 34, as shown in FIG. 22, the input terminals of reference gray scale voltages VA0, VA32, . . . , VA255 are connected by voltage-dividing resistors so as to generate all the gray scale voltages corresponding to the image display signal. Thus it is possible to effect display of the 8 bit image display signal.

In the above description, gray scale voltages for nine reference gray scales, every 32 steps apart, specifically, gray scale levels 0, 32, 64, 96, 128, 160, 192, 224 and 255, are generated and the gray scale voltages other than these are produced by resistor division. However, generation of gray scale voltages is not limited to this. It goes without saying that gray scale voltages may be generated for reference gray scales every 16 steps apart, for example.

As has been described, in accordance with the control signal from control CPU 10 either the reference gray scale voltage data stored in reference gray scale voltage data storage 31 for implementing hold type display (impulse ratio: 100%) or that for implementing impulse type display (impulse ratio: 50%) is read out by reference gray scale voltage generator 32, and based on the reference gray scale voltage data, and the gray scale voltage, corresponding to each gray scale level of the input image signal, to be applied to liquid crystal display panel 6 is determined.

Thereby, as shown in FIG. 23, in the case where either hold type display or impulse type display is implemented, it is possible to prevent change of gamma characteristic due to difference in the liquid crystal response speed entailing black insertion between different display gray scales so as to maintain the ideal display state, whereby it is possible to suppress occurrence of image quality degradation which would be derived from a change in gamma characteristic.

In the liquid crystal display of this embodiment, the way in which the impulse ratio is varied based on the type of the image content to be displayed is the same as that shown in the third embodiment, so that detailed description is omitted.

As in the case of the third embodiment where a gray scale converter for changing the gray scale levels of the input image signal is provided so that the gray scale voltages to be applied to liquid crystal display panel 6 are varied with respect to the input image signal, the image data supplied to control CPU 10 is, after all, in effect bit compressed, so there is a risk of the display performance degrading as a result of gray scale conversion.

In contrast to this, as in this embodiment, since the reference gray scale voltages to be supplied to signal line drive circuit 34 are directly controlled, it is possible to suppress the change of gamma characteristic while retaining the 8-bit display performance. For example, even when subtle change in gray scale such as gradation needs to be displayed, it is possible to realize high quality display without producing any striped discontinuity.

It is understood that a configuration as in the above fourth embodiment where the gray scale voltages applied to the liquid crystal display panel in accordance with the gray scale levels of the input image signal are varied based on the impulse ratio, can be applied to the above first to third embodiments.

Next, the fifth to eighth embodiments of liquid crystal displays that allow the user to vary the impulse ratio at will, will be described.

[The Fifth Embodiment]

Figure 24:
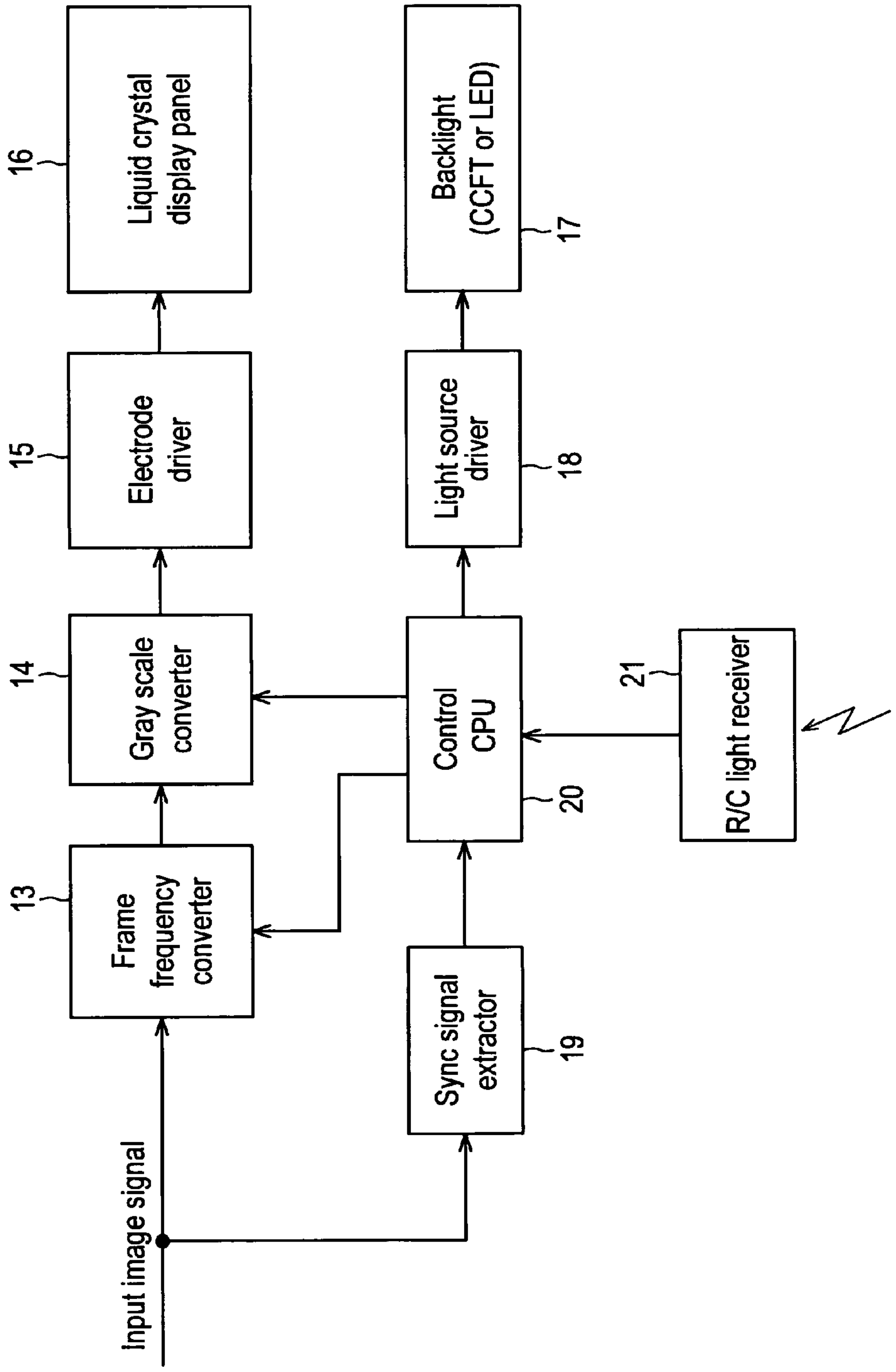
FIG. 24 is a functional block diagram showing a fundamental schematic configuration in the fifth embodiment of a liquid crystal display of the present invention.
Figure 25:
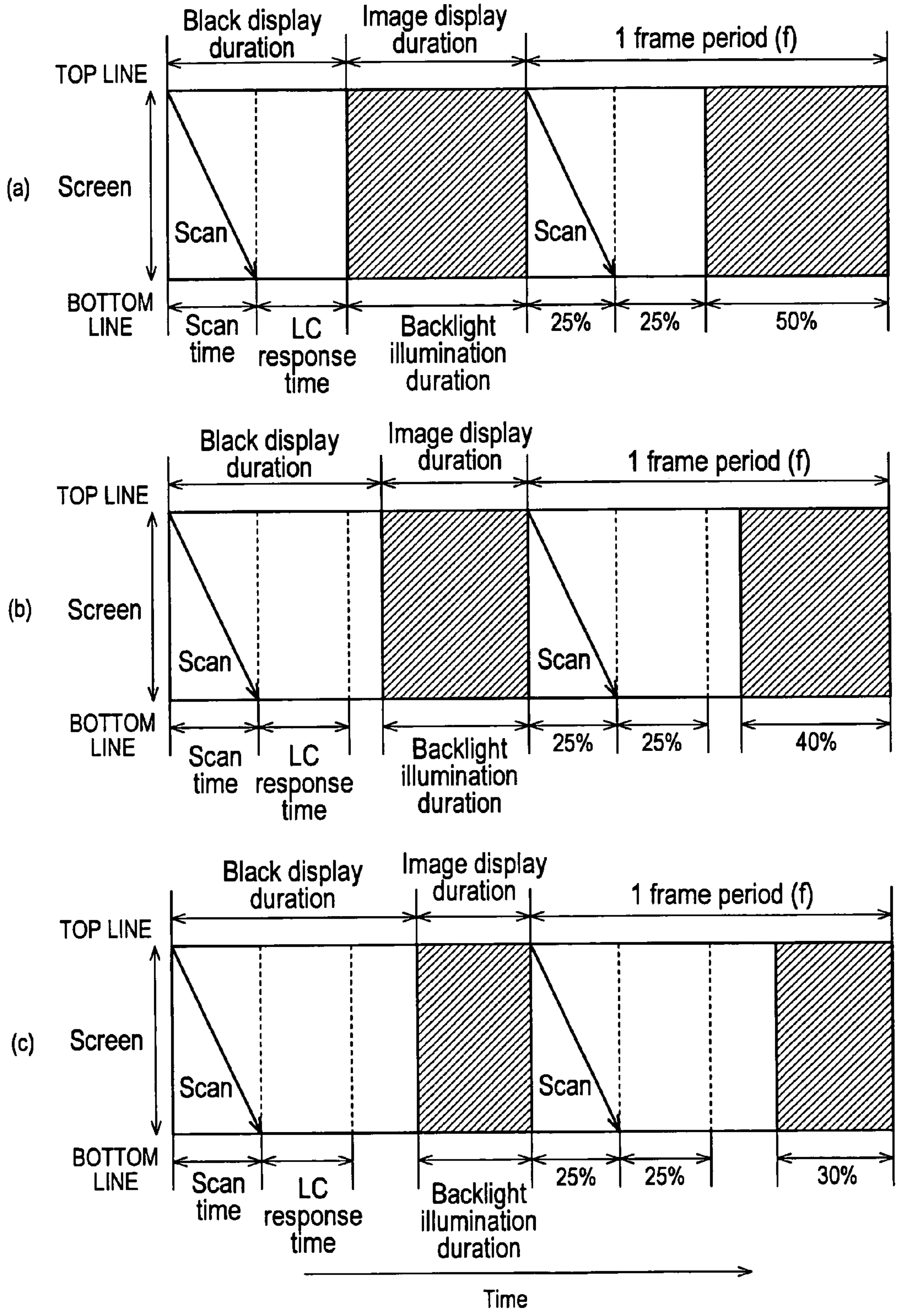
FIG. 25 is an illustrative view for explaining a basic operating mechanism in the fifth embodiment of a liquid crystal display of the present invention.
Figure 26:
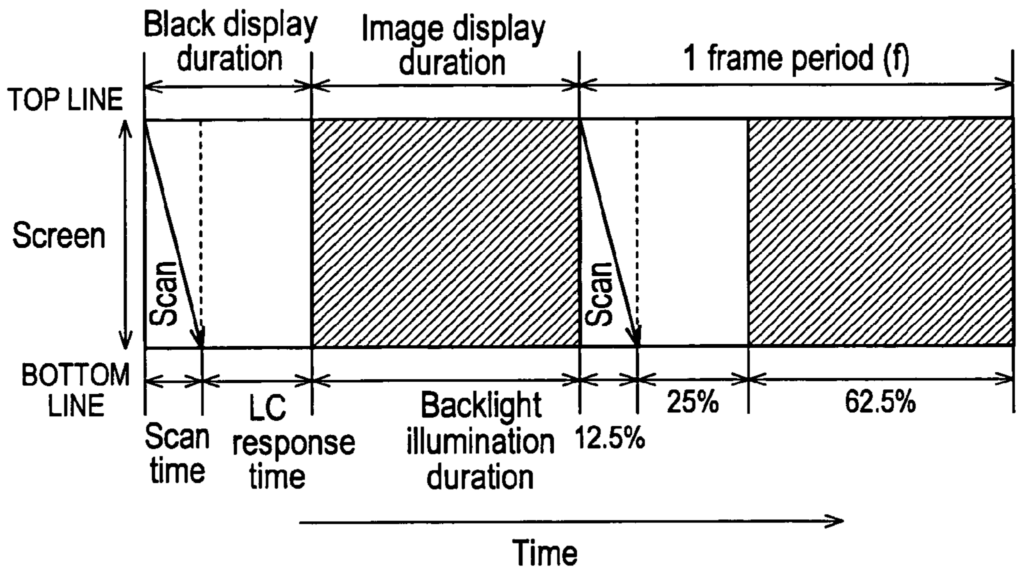
FIG. 26 is an illustrative view for explaining a basic operating mechanism in the fifth embodiment of a liquid crystal display of the present invention.
Figure 27:
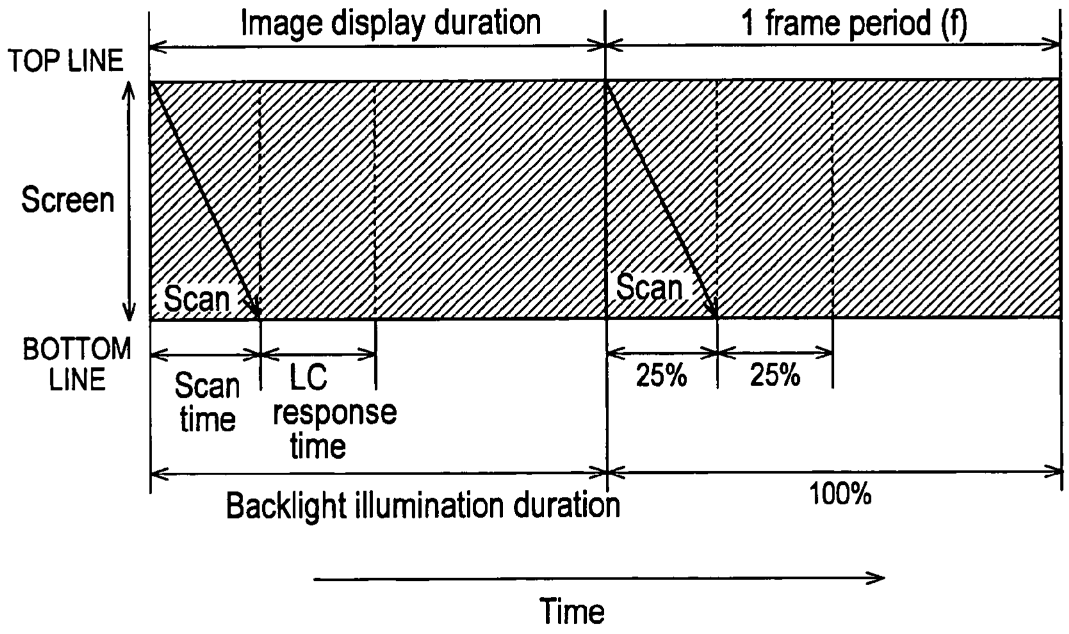
FIG. 27 is an illustrative view for explaining a basic operating mechanism in the fifth embodiment of a liquid crystal display of the present invention.
Figure 28:
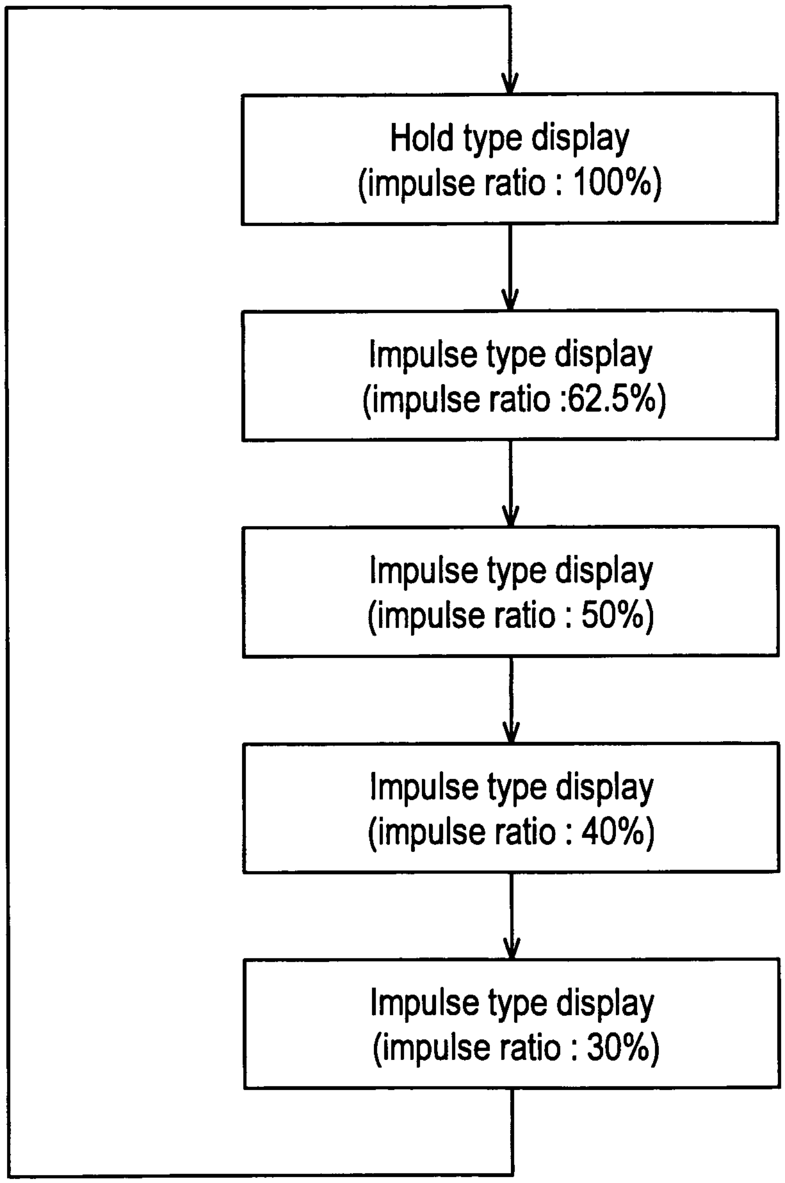
FIG. 28 is an illustrative view showing an example of a switching operation of the impulse ratio in the fifth embodiment of a liquid crystal display of the present invention.
Figure 29:
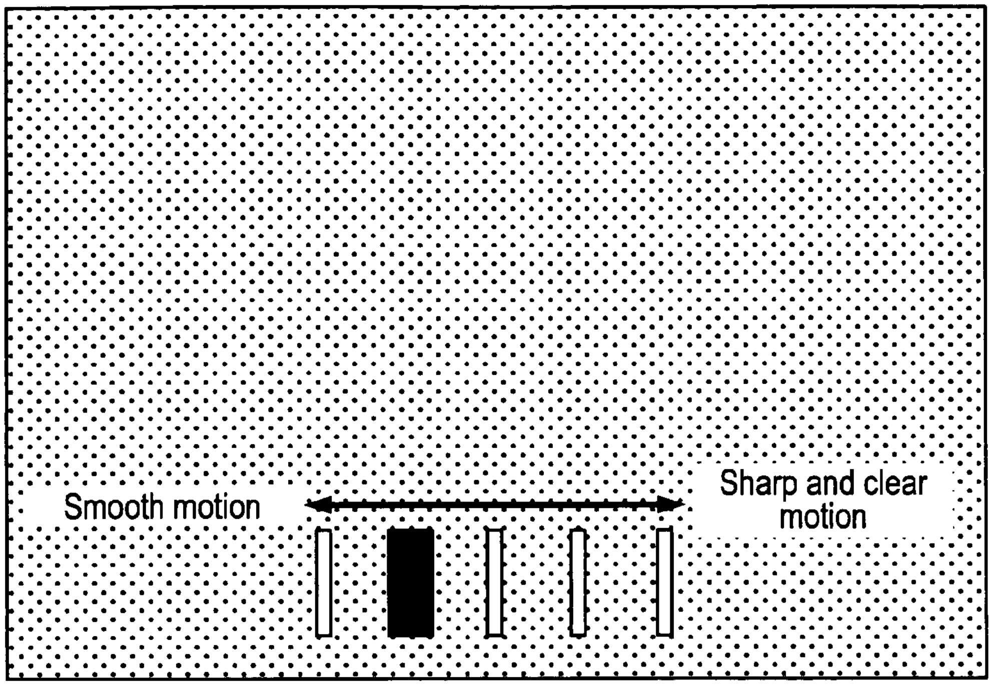
FIG. 29 is an illustrative view showing an example of a set frame for switching the impulse ratio in the fifth embodiment of a liquid crystal display of the present invention.

Next, the fifth embodiment of the present invention will be described in detail with reference to FIGS. 24 to 29. FIG. 24 is a functional block diagram showing a fundamental schematic configuration of a liquid crystal display of the present embodiment; FIGS. 25 to 27 are illustrative views for explaining basic operating mechanisms of a liquid crystal display of the present embodiment; FIG. 28 is an illustrative view showing an example of a switching operation of the impulse ratio in a liquid crystal display of the present embodiment; and FIG. 29 is an illustrative view showing an example of a set frame for switching the impulse ratio in a liquid crystal display of the present embodiment.

This embodiment, as illustrated in FIG. 24, includes: an active matrix liquid crystal display panel 16 having a liquid crystal layer and electrodes for applying scan signals and data signals to the liquid crystal layer; an electrode driver 15 for driving the data electrodes and scan electrodes of the liquid crystal display panel 16 in accordance with the input image signal; a bottom-emitting backlight 17 arranged at the back of the liquid crystal display panel 16; and a light source driver 18 for implementing intermittent drive, i.e., turning on/off the backlight 17 in one vertical display period (one frame period).

The embodiment further includes: a frame frequency converter 13 for converting the frame frequency of the input image signal into a high frequency; a gray scale converter 14 for converting the gray scale levels of the input image signal; a synchronizing signal extractor 19 for extracting synchronizing signals from the input image signal; a remote-control light receiver 21 for receiving command signals input through an unillustrated R/C device (remote-controller) by the user; and a control CPU 20 which detects and analyzes the command signal received by R/C light receiver 21 and outputs a control signal to light source driver 18 for controlling the on/off timing of backlight 17 based on the vertical synchronizing signal extracted through the synchronizing signal extractor 19.

The control CPU 20 also makes control of light source driver 18 so as to vary the luminous brightness of backlight 17 or makes control of gray scale converter 14 so as to vary the gray scale levels of the input image signal as it variably controls the illumination duration of backlight 17 (image display duration). In this case, the luminous brightness (backlight brightness) of backlight 17 is enhanced while the input image signal levels are converted by gray scale converter 14 so that that the input image signal and the display brightness will hold a constant relationship if the illumination duration (illumination ratio) of backlight 17 is reduced.

Gray scale converter 14 converts the input image signal levels (gray scale levels) in order to effect image display without change of gamma characteristic if the impulse ratio is varied. Specifically, for each impulse ratio, a conversion table (LUT) for converting the input image signal levels (gray scale levels) so that gamma characteristic will not vary has been stored in ROM or the like, and gray scale converter 14 converts the input image signal levels (gray scale levels) with reference to this conversion table. In this way, it is possible to suppress the occurrence of image quality degradation due to change in gamma characteristic.

If the impulse ratio is made lower without change of the luminous brightness of backlight 17, pixels with low brightness values are marred, hence the input image signal levels (gray scale levels) are converted so as to increase the display brightness and enhance the contrast in dark gray scales. Alternatively, if the impulse ratio is made higher, pixels with high brightness values are marred, hence the input image signal levels (gray scale levels) are converted so as to decrease the display brightness and enhance the contrast in light gray scales. Thus, it is possible to achieve vivid image display.

Further, the control CPU 20 controls frame frequency converter 13, as required, so as to very the frame frequency of the image signal to be supplied to liquid crystal display panel 16. Frame frequency converter 13, for example, having a frame memory, stores one frame of image of the input image signal, into the frame memory, then outputs the image signal of which the frame frequency has been converted into a predetermined value based on the control signal from control CPU 20, to thereby compress the input image signal with respect to the temporal axis.

As the backlight 17, other than bottom-emitting fluorescent lamps, bottom-emitting or side-illuminating LED light sources, EL light sources and the like can be used. In particular, an LED (light emitting diode) which has a response speed of some tens nsec to some hundreds nsec, is good in response compared to a fluorescent lamp having a response speed of millisecond order, hence is able to achieve more preferable on/off performance for switching.

The liquid crystal display of the present embodiment is to prevent blur injury arising when displaying motion pictures, using a full-screen flashing type backlight lighting system. Illustratively, the whole frame of display has been completely scanned (written with an image), then a drive waveform is applied to backlight 17 after a lapse of a predetermined time, so that backlight 17 is totally lighted at once (made to flash) to illuminate the full screen of the display frame, in the backlight illumination duration indicated by hatching in FIGS. 25 to 27.

Here, the backlight illumination duration indicated by hatching in FIGS. 25 to 27, i.e., the image display duration in one frame period (impulse ratio) is varied based on the instruction input through the R/C device (not shown) by the user, whereby image quality degradation occurring depending on the image contents type, details of the image, as a result of blur injury, stroboscopic effect, flickering and other factors, is appropriately controlled, thus total image quality improvement for the user can be realized.

For example, FIGS. 25(*a*) to (*c*) show an operational example of variable control of the impulse ratio, into three classes, i.e., 50%, 40% and 30%, respectively. When image quality degradation due to stroboscopic effect and flickering needs to be reduced, as shown in FIG. 25(*a*) the image scanning has been completed, then immediately after a lapse of just the predetermined liquid crystal response time (here, a ¼ frame period), backlight 17 is activated and kept lit for the backlight illumination duration (image display duration) until the image write-scan of the next frame starts.

When image quality degradation due to blur injury needs to be reduced while no image quality degradation due to stroboscopic effect and flickering occurs, as shown in FIGS. 25(*b*) and (*c*) the backlight illumination duration (image display duration) is reduced by delaying the backlight activation timing or by advancing the backlight deactivation timing, so as to make the impulse ratio small.

Further, in the example shown in FIG. 25, since it is necessary to implement write-scan of one frame of the image signal over the full screen of liquid crystal display panel 16, within the remaining period, i.e., one frame period minus the liquid crystal response time and backlight illumination duration, the frame frequency (60 Hz) of the input image signal is converted fourfold into 240 Hz by frame frequency converter 13. However, in order to secure a long enough backlight illumination duration, control CPU 20 is adapted to control frame frequency converter 13 so as to convert the frame frequency of the input image signal to a higher frequency (480 Hz) as shown in FIG. 26, for example, and shorten the image write-scanning duration, whereby it is possible to increase the impulse ratio to 62.5%.

Accordingly, when image quality degradation due to stroboscopic effect and flickering are obvious, the frame frequency of the image signal may be variably controlled and increased based on the user's instruction so that the backlight illumination duration will increase, whereby it is possible to obtain image display of smooth motion (image quality defects such as stroboscopic effect, flickering etc., will be alleviated as moving objects blur). In this way, it is possible to improve the setup flexibility of the backlight illumination duration by converting the frame frequency of the input image signal, as required, into high frequencies.

Further, when image quality degradation due to stroboscopic effect and flickering are obvious, backlight 17 may be controlled in accordance with the user's instruction so that the light source will be continuously and fully activated (continuous illumination) without regard to the liquid crystal response duration, or the impulse ratio is switched to be 100% (full hold-type display mode) as shown in FIG. 27, whereby it is possible to completely prevent these image quality defects.

As has been described, in the present embodiment, the display mode can be switched to five modes including the full hold type display mode (impulse ratio: 100%) and impulse type display modes (impulse ratios: 62.5%, 50%, 40% and 30%), in accordance with the user's instruction. The mode change can be done one to the next every time the switch button provided on a R/C device (not shown) is pressed down, as shown in FIG. 28. Or, the desired impulse ratio can be selected by operating left and right arrow keys provided on a R/C device (not shown) while the impulse ratio setting frame is being displayed as shown in FIG. 29. In the example shown in FIG. 29, OSD display, i.e., display on the screen, is used to guide selection from five levels between the "smooth motion" (hold type display) mode and the "sharp and clear motion" (impulse type display) mode.

The above embodiment is configured so that the backlight illumination duration (image display duration) in one frame period, or the impulse ratio, can be switched to five classes in a range in which the impulse ratio is 100% or below. However, the present invention should not be limited to this. It goes without saying that the present invention can be realized as long as the impulse ratio can be switched freely between two or more predetermined values, in accordance with the user's instruction. For example, it is possible to construct a simple configuration in which the user is able to switch the display simply between the impulse type display mode and the hold type display mode (i.e., the impulse type display mode off), in an alternative manner.

Moreover, in order to achieve the optimal image quality (video output characteristic) adjustment for each of input video sources such as "standard", "cinema", "game" and the like, the image display device of this kind is configured so that the user is able to select the input video source (video position) through a menu setting frame. This information as to the input video source selection designated by the user may also be used for variable control of the impulse ratio. For example, when "game" is selected and designated as the selection item of the video source (video position) through the menu setting frame, it is possible to switch and set the impulse ratio to a high value in link with this selection.

It is also possible to variably control the impulse ratio based on information from user's adjustment commands for display brightness, contrast and the like. For example, when the contrast adjustment is designated to be large in the video adjustment items of the menu setting frame, it is possible to make control of switching in link with this adjustment so as to increase the impulse ratio and enhance the display brightness.

In this way, it is also possible to provide a configuration in which the impulse ratio is variably controlled in an indirect manner in link with the user's command of diverse video adjustment items, not limited to the user's direct control of the impulse ratio.

As has been described heretofore, the liquid crystal display of the present embodiment is able to appropriately control the image quality degradation due to blur injury, stroboscopic effect, flickering and other factors, hence realize total image quality improvement for the user, by suitably switching the backlight illumination duration or the ratio of the image display duration in one frame period (impulse ratio) in accordance with the user's instruction, in a configuration that simulates impulse-type drive display using full-screen flashing type backlight illumination.

Further, since the luminous brightness of backlight 17 (backlight brightness) can be varied in accordance with the illumination duration of backlight 17 in one frame period (impulse ratio) while the gray scale levels of the input image signal are converted through gray scale converter 14, it is possible to always keep the relationship between the input image signal and the display brightness constant regardless of the impulse ratio.

Instead of driving backlight 17 in a full-screen flashing illumination (intermittent illumination) manner as in the above embodiment, it is also possible to modulate the image display light by arranging a shutter device such as of LCD or the like that limits the light transmitting duration (image display duration) in one frame period, between a continuously illuminating backlight and a liquid crystal display panel.

[The Sixth Embodiment]

Next, the sixth embodiment of the present invention will be described with reference to FIGS. 30 to 32. The same components as in the above fifth embodiment will be allotted with the same reference numerals and their description is omitted. Here, FIGS. 30 to 32 are illustrative views for explaining basic operating mechanisms in the liquid crystal display of the present embodiment.

The liquid crystal display of the present embodiment is to prevent blur injury arising when displaying motion pictures, with scanning type backlight illumination, and the basic functional block diagram is much the same as the fifth embodiment described above with reference to 17. The difference is that a multiple number of bottom-emitting fluorescent lamps disposed parallel to the scan lines, or a multiple number of bottom-emitting or side-illuminating LED light sources or EL light sources, or others are used to constitute a backlight 17, and the light source is divided into luminous sections every predetermined number so that these sections are controlled to sequentially illuminate scan-wise in one frame period. Control CPU 20 controls the timing of activating scan-wise the luminous sections one to another in the backlight, based on the vertical/horizontal synchronizing signals (scan signals) extracted through synchronizing signal extractor 19 and the user's command signal received by R/C light receiver 21.

Figure 30:
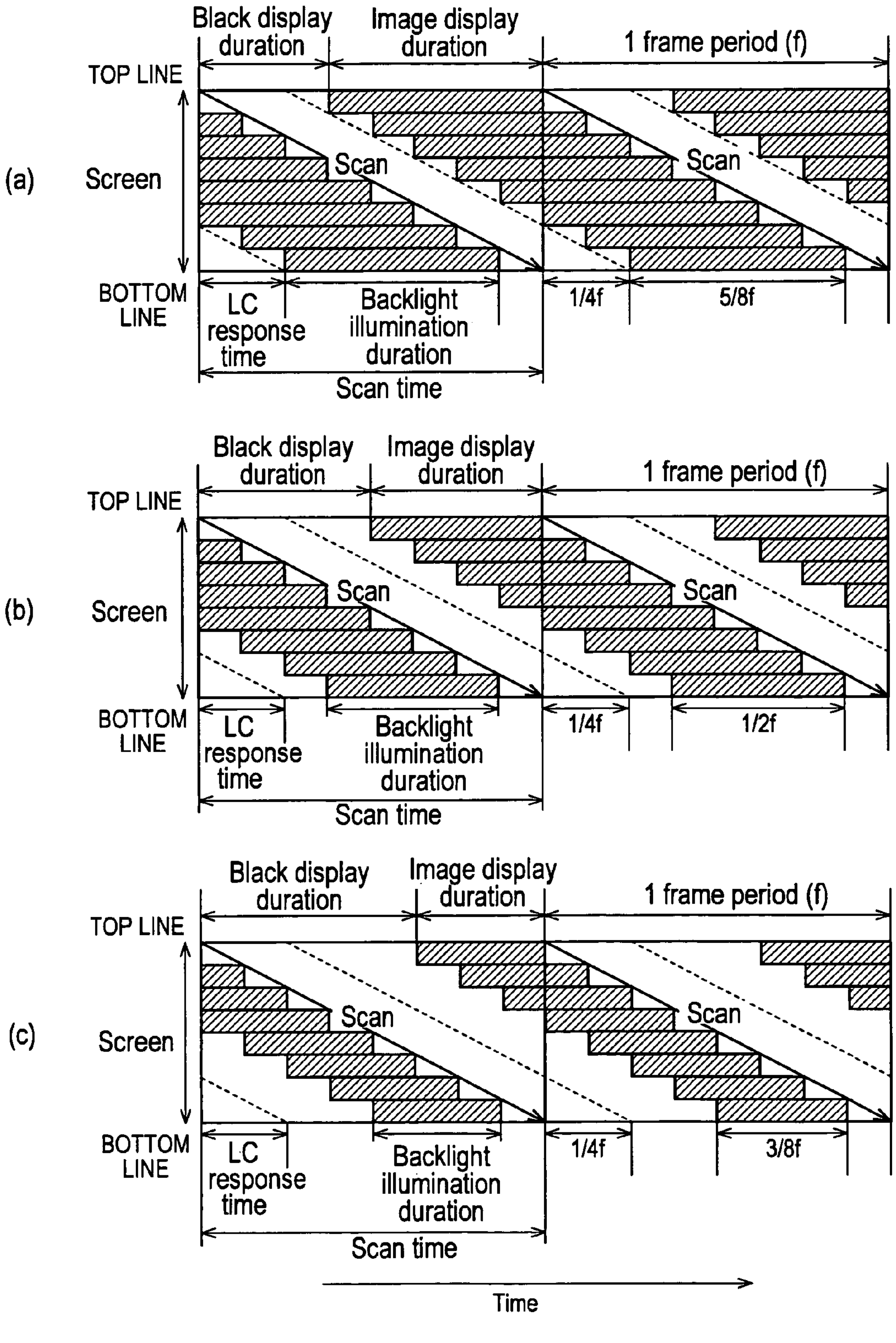
FIG. 30 is an illustrative view for explaining a basic operating mechanism in the sixth embodiment of a liquid crystal display of the present invention.

Illustratively, as shown in FIG. 30, in the present embodiment, scanning (image writing) of a certain group of horizontal lines (divided display section) has been completed, then the luminous section (made of a group of fluorescent lamps or a group of LEDs) of backlight 17 corresponding to the group of horizontal lines is activated taking into account a lapse of the LC response delay. This process is repeated one to the next in the vertical direction. In this way, it is possible to sequentially shift the backlight illumination duration corresponding to the write-scanning section of the image signal, from one luminous section to the next with the passage of time, as indicated by hatching in FIGS. 30 to 32.

Figure 31:
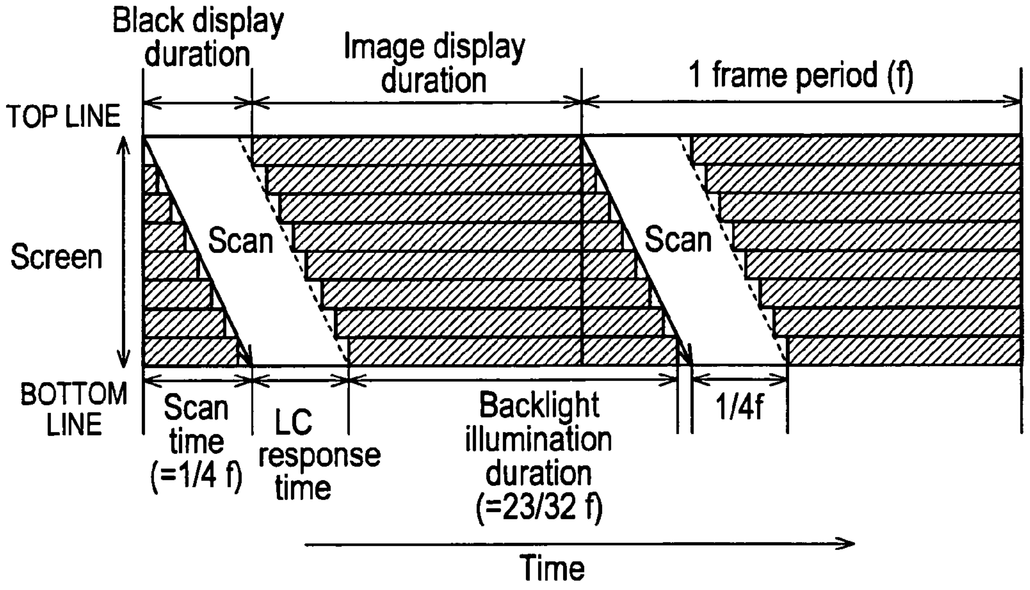
FIG. 31 is an illustrative view for explaining a basic operating mechanism in the sixth embodiment of a liquid crystal display of the present invention.
Figure 32:
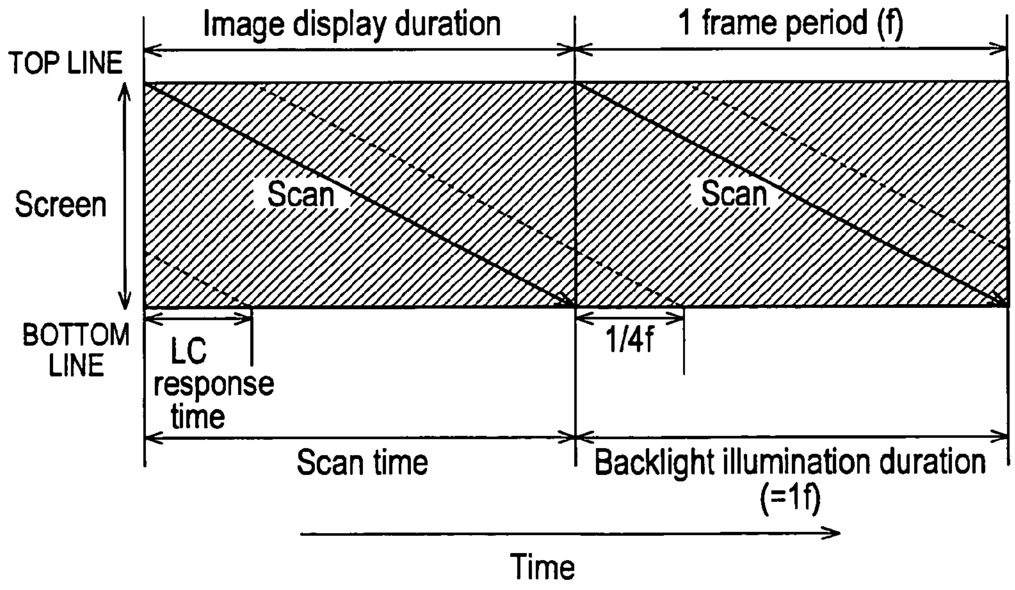
FIG. 32 is an illustrative view for explaining a basic operating mechanism in the sixth embodiment of a liquid crystal display of the present invention.

The backlight illumination duration of each luminous section indicated by hatching in FIGS. 30 to 32, the image display duration in one frame period (impulse ratio), is varied in accordance with the instruction input through the R/C device (not shown) by the user, whereby image quality degradation arising depending on the type of the image content, image details, etc., due to blur injury, stroboscopic effect, flickering and other factors is appropriately controlled, thus total image quality improvement for the user is realized.

Also in this embodiment, control CPU 20 makes control of light source driver 18 so as to vary the luminous brightness of backlight 17 or makes control of gray scale converter 14 so as to vary the gray scale levels of the input image signal as it variably controls the illumination duration of backlight 17 (image display duration). In this case, the luminous brightness (backlight brightness) of backlight 17 is enhanced while the input image signal levels are converted by gray scale converter 14 so that the input image signal and the display brightness will hold a constant relationship if the illumination duration (illumination ratio) of backlight 17 is reduced.

Gray scale converter 14 converts the input image signal levels (gray scale levels) in order to effect image display without change of gamma characteristic if the impulse ratio is varied. Specifically, for each impulse ratio, a conversion table (LUT) for converting the input image signal levels (gray scale levels) so that gamma characteristic will not vary has been stored in ROM or the like, and gray scale converter 14 converts the input image signal levels (gray scale levels) with reference to this conversion table. In this way, it is possible to suppress the occurrence of image quality degradation due to change in gamma characteristic.

Further, the control CPU 20 controls frame frequency converter 13, as required, so as to very the frame frequency of the image signal to be supplied to liquid crystal display panel 16. Frame frequency converter 13, having, for example, a frame memory, stores one frame of image of the input image signal, into the frame memory, then outputs the image signal of which the frame frequency has been converted into a predetermined value based on the control signal from control CPU 20, to thereby compress the input image signal with respect to the temporal axis.

For example, FIGS. 30(*a*) to (*c*) show an operational example of switching of the image display duration in one frame period, into three classes, i.e., ⅝ frame period, ½ frame period and ⅜ frame period, respectively. When image quality degradation due to stroboscopic effect and flickering needs to be reduced, as shown in FIG. 30(*a*) the image scanning of a certain group of horizontal lines has been completed, then immediately after a lapse of just the predetermined liquid crystal response time (here, a ¼ frame period),the luminous section of backlight 17 corresponding to the group of horizontal lines is activated and kept lit for the backlight illumination duration until the image write-scan of the next frame starts.

When image quality degradation due to blur injury needs to be reduced, as shown in FIGS. 30(*b*) and (*c*) the backlight illumination duration is reduced by delaying the backlight activation timing or by advancing the backlight deactivation timing, so as to make the impulse ratio small. In this case, in order to prevent occurrence of brightness unevenness across screen positions, the backlight illumination duration of individual luminous sections is determined every frame, which means that the duration should not change within one frame.

Further, in the example shown in FIG. 30, since write-scan of one frame of the image signal is implemented over the full screen of liquid crystal display panel 16 within one frame period, the frame frequency (60 Hz) of the input image signal is not changed. However, in order to secure a long enough backlight illumination duration for each luminous section, control CPU 20 is adapted to control frame frequency converter 13 so as to convert the frame frequency of the input image signal to a higher frequency (240 Hz) as shown in FIG. 31, for example, and shorten the image write-scanning duration, whereby it is possible to increase the impulse ratio to approximately 72%.

Accordingly, when image quality degradation due to stroboscopic effect and flickering are obvious, the frame frequency of the image signal may be variably controlled and increased based on the user's instruction so that the backlight illumination duration will increase, whereby it is possible to obtain image display of smooth motion (image quality defects such as stroboscopic effect, flickering etc., will be alleviated as moving objects blur). In this way, it is possible to improve the setup flexibility of the backlight illumination duration by converting the frame frequency of the input image signal, as required.

Further, when image quality degradation due to stroboscopic effect and flickering are obvious, it is possible to control backlight 17 in accordance with the user's instruction so that the light source will be continuously and fully activated (continuous illumination) without regard to the liquid crystal response duration, or the impulse ratio is switched to be 100% (full hold-type display mode) as shown in FIG. 32, whereby it is possible to completely prevent these image quality defects.

As has been described, in the present embodiment, the display mode can be switched to five modes including the full hold type display mode (impulse ratio: 100%) and impulse type display modes (impulse ratios: approximately 72%, 62.5%, 50% and 37.5%), in accordance with the user's instruction. The mode change can be done one to the next every time the switch button provided on a R/C device (not shown) is pressed down, as shown in FIG. 28. Or, the desired impulse ratio can be selected by operating left and right arrow keys provided on a R/C device (not shown) while the impulse ratio setting frame is being displayed as shown in FIG. 29.

The above embodiment is configured so that the backlight illumination duration (image display duration) in one frame period, or the impulse ratio, can be switched to five classes in a range in which the impulse ratio is 100% or below. However, the present invention should not be limited to this. It goes without saying that the present invention can be realized as long as the impulse ratio can be switched freely between two or more predetermined values, in accordance with the user's instruction. For example, it is possible to construct a simple configuration in which the user is able to switch the display simply between the impulse type display mode and the hold type display mode (i.e., the impulse type display mode off), in an alternative manner.

Moreover, in order to achieve the optimal image quality (video output characteristic) adjustment for each of input video sources such as “standard”, “cinema”, “game” and the like, the image display device of this kind is configured so that the user is able to select the input video source (video position) through a menu setting frame. This information as to the input video source selection designated by the user may also be used for variable control of the impulse ratio. For example, when “game” is selected and designated as the selection item of the video source (video position) through the menu setting frame, it is possible to switch and set the impulse ratio at a high value in link with this selection.

It is also possible to variably control the impulse ratio based on information from user’s adjustment commands for display brightness, contrast and the like. For example, when the contrast adjustment is designated to be large in the video adjustment items of the menu setting frame, it is possible to make control of switching in link with this adjustment so as to increase the impulse ratio and enhance the display brightness.

In this way, it is also possible to provide a configuration in which the impulse ratio is variably controlled in an indirect manner in link with the user’s command of diverse video adjustment items, not limited to the user’s direct control of the impulse ratio.

Moreover, in the above embodiment, backlight 17 is divided into eight luminous sections (groups of horizontal lines) so that the sections are sequentially illuminated scanwise. However, the backlight may be divided into any number of luminous sections as long as it is divided into two or more. Further, it is obvious that backlight 17 is not necessarily divided into horizontal strips (parallel to the scan lines) of luminous sections. Also in this respect, use of a bottom-emitting planar LED device as a backlight 17 can afford improved flexibility for designing the divided luminous sections, compared to the others. Further, use of a planar LED device as a backlight 17 also makes it possible to control the backlight brightness relatively easily by regulating its drive current.

As has been described heretofore, the liquid crystal display of the present embodiment is able to appropriately control the image quality degradation due to blur injury, stroboscopic effect, flickering and other factors, hence realize total image quality improvement for the user, by suitably switching the backlight illumination duration of each luminous section, or the ratio of the image display duration in one frame period (impulse ratio) in accordance with the user’s instruction, in a configuration that simulates impulse-type drive display using scanning type backlight illumination.

Further, since the luminous brightness of backlight 17 (backlight brightness) can be varied in accordance with the illumination duration of backlight 17 in one frame period (impulse ratio) while the gray scale levels of the input image signal are converted through gray scale converter 14, it is possible to always keep the relationship between the input image signal and the display brightness constant regardless of the impulse ratio.

Instead of driving multiply divided luminous sections of backlight 17 in a sequential scanning illumination (intermittent illumination) manner as in the above embodiment, it is also possible to modulate the image display light by arranging a shutter device such as of LCD or the like that limits the light transmitting duration (image display duration) for each divided display section in one frame period, between a continuously illuminating backlight and a liquid crystal display panel.

[The Seventh Embodiment]

Figure 33:
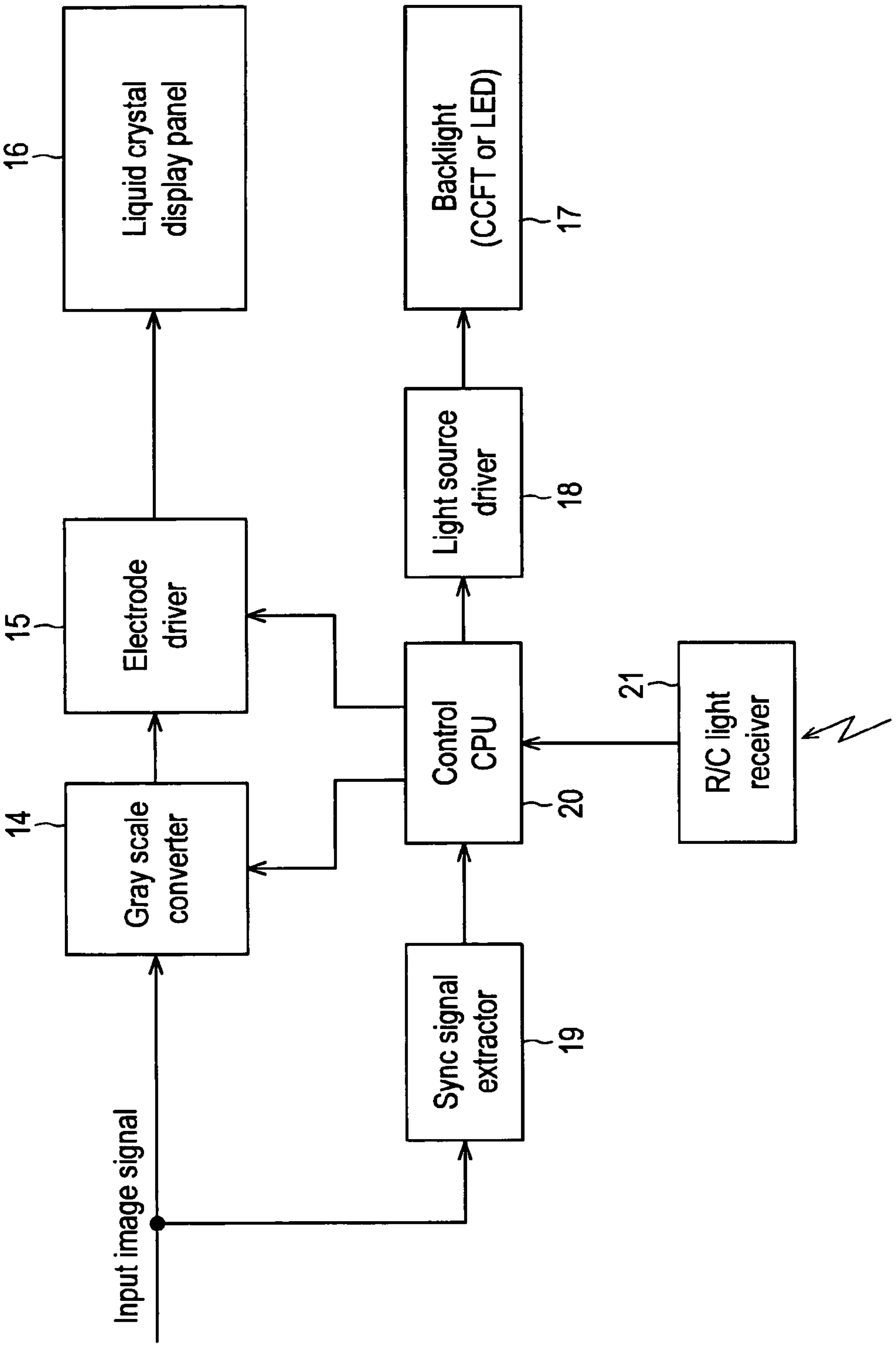
FIG. 33 is a functional block diagram showing a fundamental schematic configuration in the seventh embodiment of a liquid crystal display of the present invention.
Figure 34:
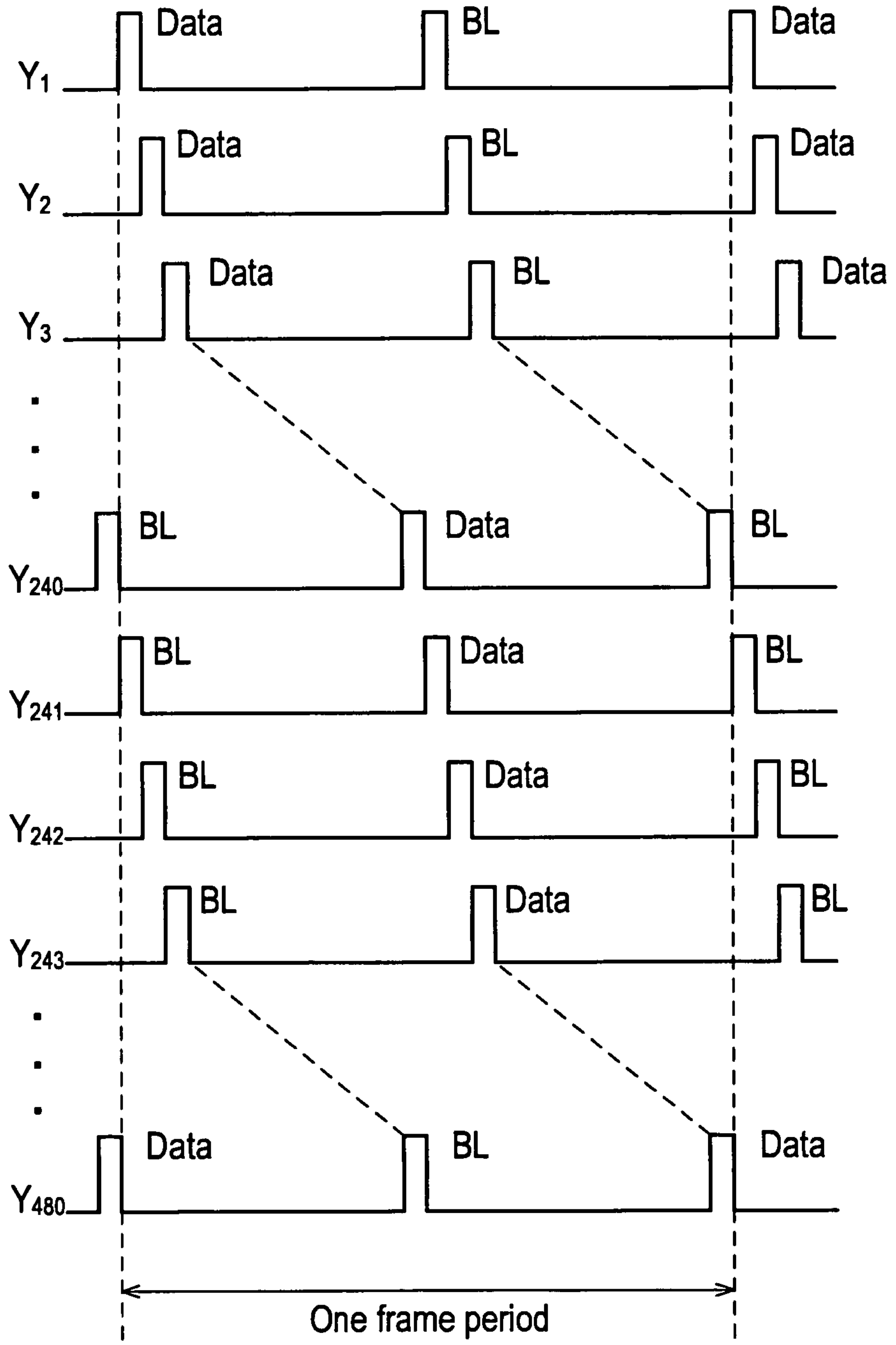
FIG. 34 is a timing chart for explaining an electrode drive operation in the seventh embodiment of a liquid crystal display of the present invention.
Figure 35:
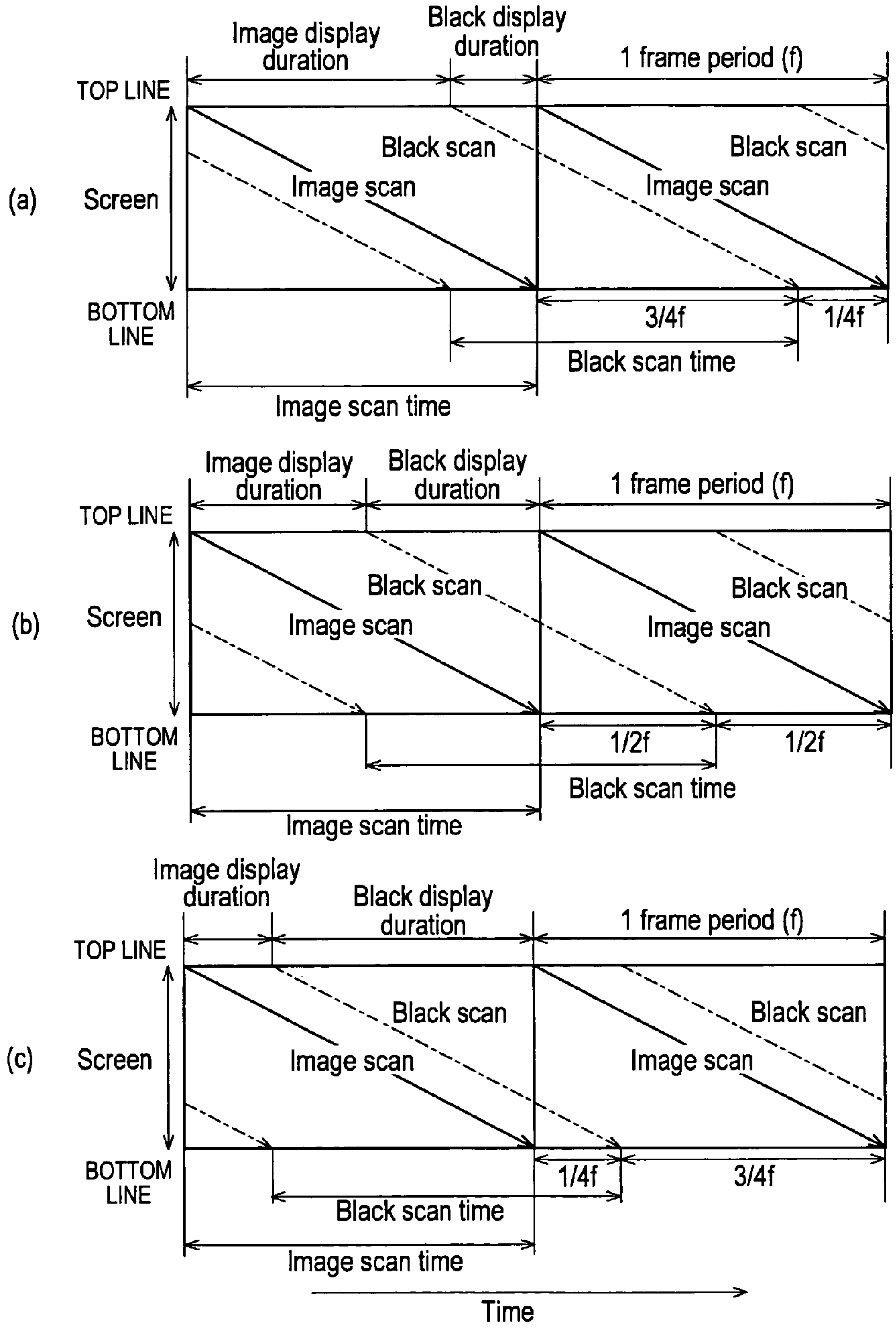
FIG. 35 is an illustrative view for explaining a basic operating mechanism in the seventh embodiment of a liquid crystal display of the present invention.

Next, the seventh embodiment of the present invention will be described with reference to FIGS. 33 to 35. The same components as in the sixth embodiment will be allotted with the same reference numerals and their description is omitted. Here, FIG. 33 is a functional block diagram showing a fundamental schematic configuration of a liquid crystal display of the present embodiment; FIG. 34 is a timing chart for explaining an electrode drive operation in a liquid crystal display of the present embodiment; and FIG. 35 is an illustrative view for explaining the basic operating mechanism in a liquid crystal display of the present embodiment.

The liquid crystal display of this embodiment is to prevent blur injuries arising when displaying motion pictures by black insertion, or by writing the image display signal scanwise and subsequently writing the black display signal scanwise (resetting scan) into liquid crystal display panel 16 within one frame period with backlight 17 constantly activated (continuous illumination), as shown in FIG. 33, and is characterized in that control CPU 20 variably controls the timing when the black display signal is written by electrode driver 15, in accordance with the user’s instructional input.

Specifically, electrode driver 15 selects each scan line for image display and selects the same line once again for black display. In time with these selections, the driver provides the input image signal and black display signal to every data line. This series of operations is performed in a cycle of one frame period. Thus, the duration for displaying the black signal (black display duration) is generated between one frame of image display and the next frame of image display. Here, the write-timing (delay time) of the black display signal relative to the write-timing of the image signal is varied in accordance with the user’s instruction.

With the variable control of the black display duration, control CPU 20 further makes control of light source driver 18 so as to vary the luminous brightness of backlight 17 or makes control of gray scale converter 14 so as to vary the gray scale levels of the input image signal. In this case, the luminous brightness (backlight brightness) of backlight 17 is enhanced while the input image signal levels are converted by gray scale converter 14 so that that the input image signal and the display brightness will hold a constant relationship if the image display duration is shortened.

Further, gray scale converter 14 converts the input image signal levels (gray scale levels) in order to effect image display without change of gamma characteristic if the impulse ratio is varied. Specifically, for each impulse ratio, a conversion table (LUT) for converting the input image signal levels (gray scale levels) so that gamma characteristic will not vary has been stored in ROM or the like, and gray scale converter 14 converts the input image signal levels (gray scale levels) with reference to this conversion table. In this way, it is possible to suppress the occurrence of image quality degradation due to change in gamma characteristic.

FIG. 34 is a timing chart for the scan lines (gate lines) of liquid crystal display panel 16. In order to allow the image signal to be written into pixel cells through signal lines (data lines), gate lines Y1 to Y480 are enabled from one to the next with a short period of time shifted, in one frame period. When all of 480 gate lines have been enabled to write the image signal into the pixel cells, one frame period completes.

During this period, gate lines Y1 to Y480 are enabled once again, after a delay time, which is determined based on the user’s instruction from when each line was first enabled for writing the image signal, so that a voltage displaying black is supplied to every pixel cell through data lines X. With this operation every pixel cell is set into the black display state. That is, each gate line Y is set into the high level, twice, at different times within one frame period. At the first selection, each pixel cell displays image data for a fixed period of time, then the pixel cell is forced to make black display at the following, second selection.

For example, FIGS. 35(*a*) to (*c*) show an operational example of switching of the image display duration in one frame period, into three classes, i.e., ¾ frame period, ½ frame period and ¼ frame period, respectively. When image quality degradation due to stroboscopic effect and flickering needs to be reduced, as shown in FIG. 35(*a*) writing of the image display signal into a certain pixel has been completed, then writing of the black display signal is started after a lapse of a ¾ frame period, and the black display is kept on (for a ¼ frame period) until the image write-scan of the next frame starts.

When image quality degradation due to blur injury needs to be reduced, as shown in FIGS. 35(*b*) and (*c*) the start time of writing the black display signal is advanced to increase the duration for supplying the black display signal (non-display duration of the image signal) and shorten the image display duration, so that the impulse ratio is made small. In this case, in order to prevent occurrence of brightness unevenness across screen positions, the timing (the delayed time) of writing black data relative to the timing of image writing into each horizontal line is determined every frame, which means that the duration should not change within one frame.

Further, when image quality degradation due to stroboscopic effect and flickering are obvious, control is made based on the user's instruction, so that no write-scan of the black display signal is implemented, in other words, no black display duration is provided, meaning that the impulse ratio is switched to be 100% (full hold-type display mode) as shown in FIG. 32, whereby it is possible to completely prevent these image quality defects.

As has been described, in the present embodiment, the display mode can be switched to four modes including the full hold type display mode (impulse ratio: 100%) and impulse type display modes (impulse ratios: approximately 75%, 50% and 25%), in accordance with the user's instruction. The mode change can be done one to the next every time the switch button provided on a R/C device (not shown) is pressed down, as shown in FIG. 28. Or, the desired impulse ratio can be selected by operating left and right arrow keys provided on a R/C device (not shown) while the impulse ratio setting frame is being displayed as shown in FIG. 29.

The above embodiment is configured so that the image display duration in one frame period (impulse ratio) can be switched to four classes in a range in which the impulse ratio is 100% or below. However, the present invention should not be limited to this. It goes without saying that the present invention can be realized as long as the impulse ratio can be switched freely between two or more predetermined values, in accordance with the user's instruction. For example, it is possible to construct a simple configuration in which the user is able to switch the display simply between the impulse type display mode and the hold type display mode (i.e., the impulse type display mode off), in an alternative manner.

Moreover, in order to achieve the optimal image quality (video output characteristic) adjustment for each of input video sources such as "standard", "cinema", "game" and the like, the image display device of this kind is configured so that the user is able to select the input video source (video position) through a menu setting frame. This information as to the input video source selection designated by the user may also be used for variable control of the impulse ratio. For example, when "game" is selected and designated as the selection item of the video source (video position) through the menu setting frame, it is possible to switch and set the impulse ratio to a high value in link with this selection.

It is also possible to variably control the impulse ratio based on information from user's adjustment commands for display brightness, contrast and the like. For example, when the contrast adjustment is designated to be large in the video adjustment items of the menu setting frame, it is possible to make control of switching in link with this adjustment so as to increase the impulse ratio and enhance the display brightness.

In this way, it is also possible to provide a configuration in which the impulse ratio is variably controlled in an indirect manner in link with the user's command of diverse video adjustment items, not limited to the user's direct control of the impulse ratio.

Furthermore, in this embodiment, the input display image signal is supplied directly to liquid crystal display panel 16 without change of its frame frequency (60 Hz). However, it goes without saying that the frame frequency of the image signal can be varied. Also, backlight 17 may be adapted to turn off during the black display duration so as to reduce the backlight illumination duration, whereby it is possible to lengthen the life of backlight 17 and realize low power consumption. Here, use of an LED device as backlight 17 also makes it possible to control the backlight brightness relatively easily by regulating its drive current.

As has been described heretofore, the liquid crystal display of the present embodiment is able to appropriately control the image quality degradation due to blur injury, stroboscopic effect, flickering and other factors, hence realize total image quality improvement for the user, by suitably switching the black display duration (image non-display duration), or the ratio of the image display duration in one frame period (impulse ratio) in accordance with the user's instruction, in a configuration that simulates impulse-type drive display using a black insertion display scheme.

Further, since the luminous brightness of backlight 17 (backlight brightness) can be varied in accordance with the image display duration in one frame period (impulse ratio) while the gray scale levels of the input image signal are converted through gray scale converter 14, it is possible to always keep the relationship between the input image signal and the display brightness constant regardless of the impulse ratio.

[The Eighth Embodiment]

Figure 36:
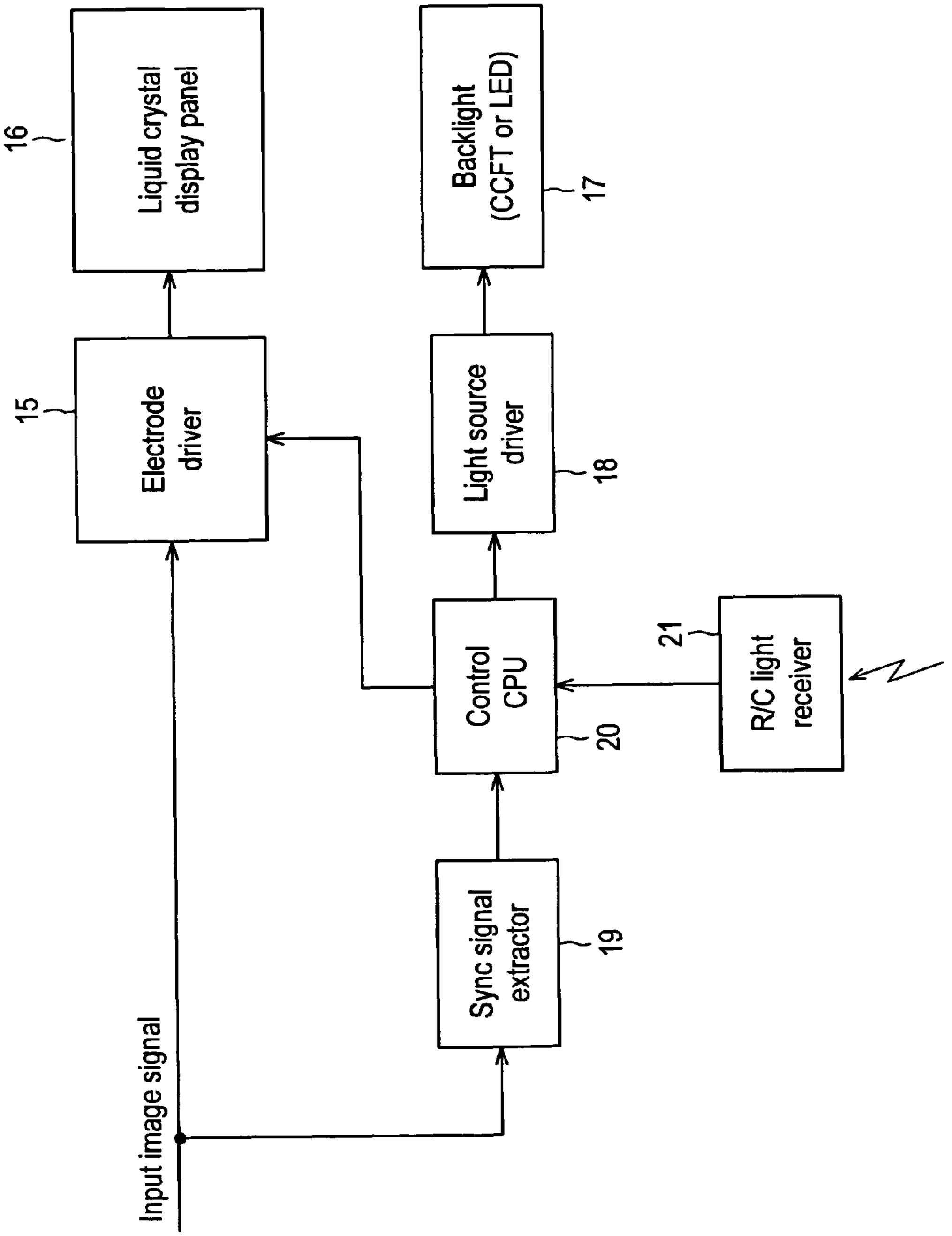
FIG. 36 is a functional block diagram showing a fundamental schematic configuration in the eighth embodiment of a liquid crystal display of the present invention.
Figure 37:
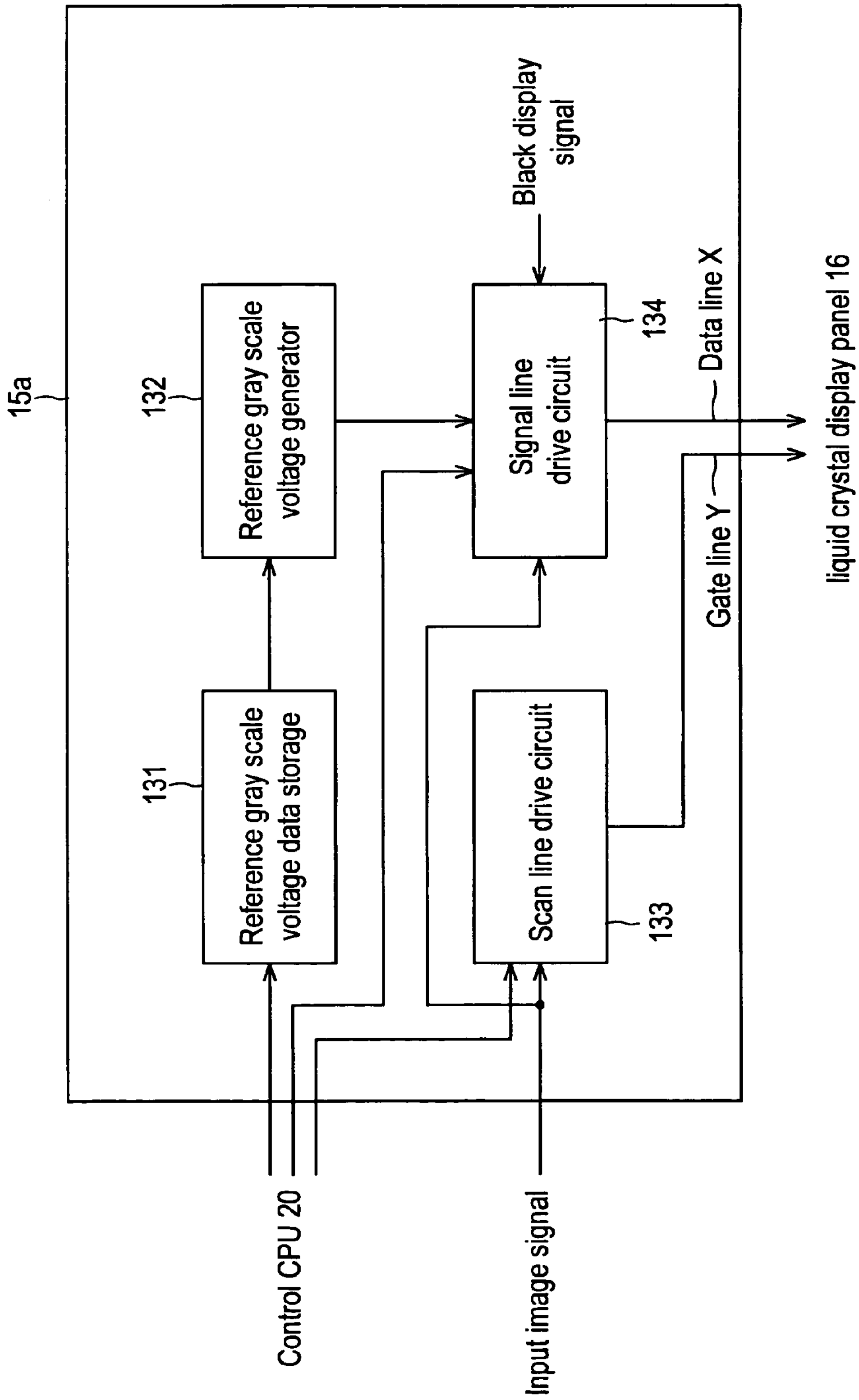
FIG. 37 is a functional block diagram showing an electrode driver in the eighth embodiment.

Next, the eighth embodiment of the present invention will be described with reference to FIGS. 36 to 37 and FIGS. 18 to 23 used for the fourth embodiment. The same components as in the above seventh embodiment will be allotted with the same reference numerals and their description is omitted. Here, FIG. 36 is a functional block diagram showing a fundamental schematic configuration of a liquid crystal display of the present embodiment, and FIG. 37 is a functional block diagram showing an electrode driver in the present embodiment.

This embodiment is to prevent blur injuries arising when displaying motion pictures, by black insertion, or by writing the image display signal scan-wise and subsequently writing the black display signal scan-wise (resetting scan) into liquid crystal display panel 16 within one frame period with backlight 17 constantly activated (continuous illumination), basically, similarly to, the seventh embodiment, and is characterized in that control CPU 20 variably controls the timing when the black display signal is written by an electrode driver 15*a*, based on the user's instructional input.

In the seventh embodiment, when the impulse ratio is varied by variable control of the black display duration, a conversion table has been prepared beforehand and gray scale converter 14 implements conversion with reference to the conversion table, in order to keep the gamma characteristic substantially unchanged. In contrast, in this embodiment, no gray scale converter 14 is provided as shown in FIG. 36, and electrode driver 15*a*, instead of gray scale converter 14, varies the gray scale voltages to be applied to liquid crystal display panel 16 in accordance with the impulse ratio so as to keep the gamma characteristic substantially unchanged.

With the variable control of the black display duration, control CPU 20 makes control of light source driver 18 so as to vary the luminous brightness of backlight 17 or makes control of electrode driver 15*a* so as to vary the gray scale voltages applied to liquid crystal display panel 16. In this case, the luminous brightness of backlight 17 (backlight brightness) is enhanced while the gray scale voltages applied to liquid crystal display panel 16 are varied by electrode driver 15*a* so that the input image signal and the display brightness will hold a constant relationship if the image display duration is shortened.

Next description will be detailed on the configuration of electrode driver 15*a*, the variable operation of the impulse ratio in use of the black display signal and the variable operation of the gray scale voltages applied to liquid crystal display panel 16. As shown in FIG. 37, this electrode driver 15*a* is composed of a reference gray scale voltage data storage 131, a reference gray scale voltage generator 132, a scan line drive circuit 133 and a signal line drive circuit 134.

For implementing impulse type display, the scan signal to be supplied from scan line drive circuit 133 to a scan line (gate line Y) of liquid crystal display panel 16 has two scan line select durations, namely, the image display select duration for writing a gray scale voltage corresponding to the image data into the pixel electrode and the black display select duration for writing the voltage for black display into the pixel electrode. Thereby, as shown in FIG. 34, each gate line Y is set into the high level twice at different times within one frame period. On the other hand, signal line drive circuit 134 outputs a gray scale voltage corresponding to the image display signal and the voltage corresponding to the black display signal, alternately, to liquid crystal display panel 16 through each signal line (data line X). In this way, each pixel cell displays the image display signal for a fixed period of time at the first selection, then the pixel cell is forced to make black display at the following, second selection.

Here, the black display select duration is supposed to be selected in accordance with the impulse ratio, and black display is supposed to be effected for the scan line above or below, by some multiple scan lines, the scan line of which the image display select duration is being selected. The signal line which is within the black display select duration is applied with the voltage corresponding to the black display signal so that black display can be made for every scan line. The selection of the line to which the black display signal is written in and the line to which the image display signal is written in is made by a scan line drive circuit 133, which is appropriately controlled by control CPU 20. Thus, the line to be written in with the image display signal and the line to be written in with the black display signal are successively scanned with an interval of multiple lines kept therebetween, one above and the other below.

The switching control between the image display signal and the black display signal in each frame is also done by control CPU 20. Observing one pixel column, signal line drive circuit 134 supplies signals to liquid crystal display panel 16 so that the image display signal for the image display select duration is given to one line (row) while the black display signal for the black display select duration is given to another line (row). With this configuration, it is possible to realize impulse type display for different impulse ratios by varying the ratio of the black display duration in one frame period.

To implement hold type display (impulse ratio: 100%), the input image signal is supplied to signal line drive circuit 134 while scan line drive circuit 133 is controlled by control CPU 20 so that every line is scanned in one frame period (no black display signal is written in). Thereby, it is possible to implement normal hold type display having an impulse ratio of 100%.

Next, the operation of varying the gray scale voltage to be applied to liquid crystal display panel 16 will be described. Reference gray scale voltage generator 132 supplies a reference gray scale voltage to signal line drive circuit 134 based on the reference gray scale voltage data stored in reference gray scale voltage data storage 131. Herein, reference gray scale voltage data storage 131 stores sets of reference gray scale voltage data for different impulse ratios, as shown in FIG. 18, (here, the sets for an impulse ratio of 100% corresponding to hold type display and for an impulse type display with an impulse ratio of 50% are shown), in separate ROM areas. Control CPU 20 selects and designates one from these and outputs it to reference gray scale voltage generator 132. The reference gray scale voltage data stored in reference gray scale voltage data storage 131 is set up in the following manner.

First, the reference gray scale voltage data for hold type display (impulse ratio: 100%) is determined so that, based on the relationship between the applied voltage and the liquid crystal transmittance, or the so-called V-T curve, shown in FIG. 19, the relationship between the display gray scale and the display brightness (liquid crystal transmittance) will be equivalent to the gamma 2.2 relationship, for example. In this case, when the display signal or the display data is represented by 8 bits or 256 gray scales, the voltage data V0, V32, . . . , V255 corresponding to gray scale levels 0, 32, 64, 96, 128, 160, 192, 224 and 255 gray scales are set up and stored. The voltage data for the gray scales other than these stored reference gray scales is set by linear resistance division using the above reference gray scale voltages. Thus, all the gray scale voltages to be applied to liquid crystal display panel 16 can be determined.

On the other hand, the reference gray scale voltage data for implementing impulse type display (impulse ratio: 50%) cannot be determined directly from the V-T curve shown in FIG. 19, but should be determined by determining the relationship between the applied voltage T to the liquid crystal and the integral I of the brightness over one frame period, the display brightness (transmittance) varying with time at the impulse type display shown in FIG. 20. The brightness integral I varies depending on the liquid crystal response speed. Also, since the liquid crystal response speed is different depending on the display gray scale, the relationship between the applied voltage and liquid crystal transmittance (brightness) shown in FIG. 19 will not hold. This means that the gray scale voltages determined from the V-T curve of FIG. 19 for implementation of hold type display are not able to provide desired gray scale representation.

Therefore, in order to implement impulse type display, the relationship between the integral I of the brightness over one frame period and the applied voltage need to be measured from the beginning to set up reference gray scale voltage data different from that for the hold type display. Setting of the reference gray scale voltage data is implemented so that the relationship between the display gray scale level and the integral I of display brightness (liquid crystal transmittance) will be equivalent to the gamma 2.2 relationship, for example. In this case, when the display signal or the display data is represented by 8 bits or 256 gray scales, the voltage data V0, V32, . . . , V255 corresponding to gray scale levels 0, 32, 64, 96, 128, 160, 192, 224 and 255 gray scales are set up and stored. The voltage data for the gray scales other than these stored reference gray scales is set by linear resistance division using the above reference gray scale voltages. Thus, all the gray scale voltages to be applied to liquid crystal display panel 16 can be determined.

Reference gray scale voltage generator 132, as shown in FIG. 21, converts digital data V0, V32, . . . , V255 obtained from reference gray scale voltage data storage 131 into analog data through DA converters 51, then amplifies them as appropriate through respective amplifiers 52, to supply the adjusted reference gray scale voltages VA0, VA32, . . . , VA255 to signal line drive circuit 134 including source drivers, etc. In signal line drive circuit 134, as shown in FIG. 22, the input terminals of reference gray scale voltages VA0, VA32, . . . , VA255 are connected by voltage-dividing resistors so as to generate all the gray scale voltages corresponding to the image display signal. Thus it is possible to effect display of the 8 bit image display signal.

In the above description, gray scale voltages for nine reference gray scales, each being 32 steps apart, specifically, gray scale levels 0, 32, 64, 96, 128, 160, 192, 224 and 255, are generated and the gray scale voltages other than these are produced by resistor division. However, generation of gray scale voltages is not limited to this. It goes without saying that gray scale voltages may be generated for reference gray scales each being 16 steps apart, for example.

As has been described, in accordance with the control signal from control CPU 20 either the reference gray scale voltage data stored in reference gray scale voltage data storage 131 for implementing hold type display (impulse ratio: 100%) or that for implementing impulse type display (impulse ratio: 50%) is read out by reference gray scale voltage generator 132, and based on the reference gray scale voltage data, the gray scale voltage, corresponding to each gray scale level of the input image signal, to be applied to liquid crystal display panel 16 is determined.

Thereby, as shown in FIG. 23, in the case where either the hold type display or impulse type display is implemented, it is possible to prevent change of gamma characteristic due to difference in the liquid crystal response speed entailing black insertion between different display gray scales so as to maintain the ideal display state, whereby it is possible to suppress occurrence of image quality degradation which would be derived from a change of gamma characteristic.

In the liquid crystal display of this embodiment, the way in which the impulse ratio is varied based on the user's instruction is the same as that shown in the seventh embodiment, so that detailed description is omitted.

As in the case of the seventh embodiment where a gray scale converter for changing the gray scale levels of the input image signal is provided so that the gray scale voltages to be applied to liquid crystal display panel 16 are varied with respect to the input image signal, the image data supplied to control CPU 20 is, after all, in effect, bit compressed, so there is a risk of the display performance degrading as a result of gray scale conversion.

In contrast to this, as in this embodiment, since the reference gray scale voltages to be supplied to signal line drive circuit 134 are directly controlled, it is possible to suppress the change of gamma characteristic while retaining the 8-bit display performance. For example, even when subtle change in gray scale such as gradation needs to be displayed, it is possible to realize high quality display without producing any striped discontinuity.

It is understood that a configuration as in the above eighth embodiment where the gray scale voltages applied to the liquid crystal display panel in accordance with the gray scale levels of the input image signal are varied based on the impulse ratio, can be applied to the above fifth to seventh embodiments.

Also, the fifth to eighth embodiments of the present invention have been described explaining the cases where an unillustrated R/C device is used to input the user's instruction as to variable selection of the impulse ratio. However, it goes without saying that use's instruction can be input through a control portion or the like which is provided on the main apparatus body.

Now, in the configuration where the impulse ratio is automatically changed in accordance with the detection of the type of the image content to be displayed (the first to fourth embodiments), the impulse ratio is set to be large for a game (CG animation) image, for example, on the basis that the game image is not added with motion blurs. However, for game (CG animation) images which are added with motion blurs by an advanced image process, it is preferred that the impulse ratio is made small so as to prevent occurrence of defects from blur injuries. Even in such a case, as in the fifth to eighth embodiments described above, the configuration allowing the user to select a desired impulse ratio makes it possible to set the optimal impulse ratio suited to the image to be displayed.

Figure 38:
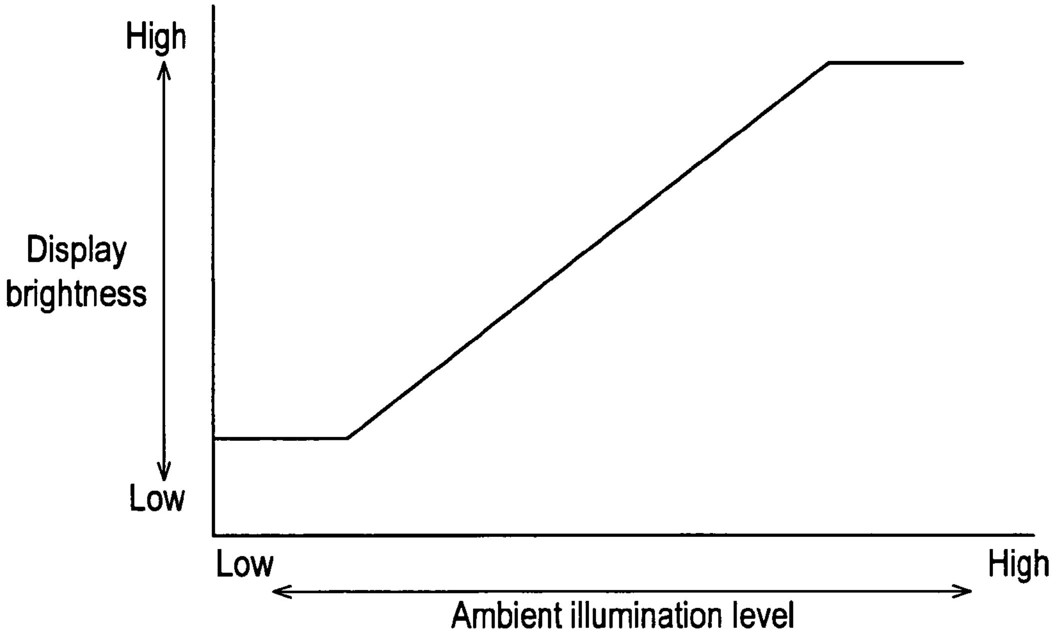
FIG. 38 is a characteristic chart showing the relationship between ambient illumination in the usage environment and display brightness in a liquid crystal display of the present invention.

Further, in the display device of this kind, the display brightness is variably controlled in accordance with the ambient illumination (lightness) in the usage environment of the subject device as shown in FIG. 38, so as to provide easy viewable screen display for the user in any condition where, for example, direct sunshine is incident on the display screen or when the display is viewed in a dark room. Accordingly, it is preferred that the impulse ratio is set high when the ambient illumination in the usage environment of the device is high while the impulse ratio is set low when the ambient illumination is low. Therefore, as the user is able to select the optimal impulse ratio in accordance with the lightness (the intensity of the ambient illumination) in the usage environment of the device, it is possible to facilitate easy viewable image display for the user by display brightness modulation, in addition to improvement in image quality by prevention of blur injury.

In particular, in a configuration where the impulse ratio is automatically changed in accordance with the ambient illumination level (surrounding lightness) detected by an illumination sensor, when, for example, part of the display screen is put in a sunny place or direct sunshine, the detected illumination by the illumination sensor may cause a serious error, resulting in failure to present the optimal display brightness. However, the configuration as in the fifth to eighth embodiments described above, permits the user to select the desired impulse ratio, hence makes it possible for the user to set the optimal impulse ratio suited to the ambient illumination in the usage environment of the device. As a result, it is possible to always provide easy viewable image display for the user.

Figure 39:
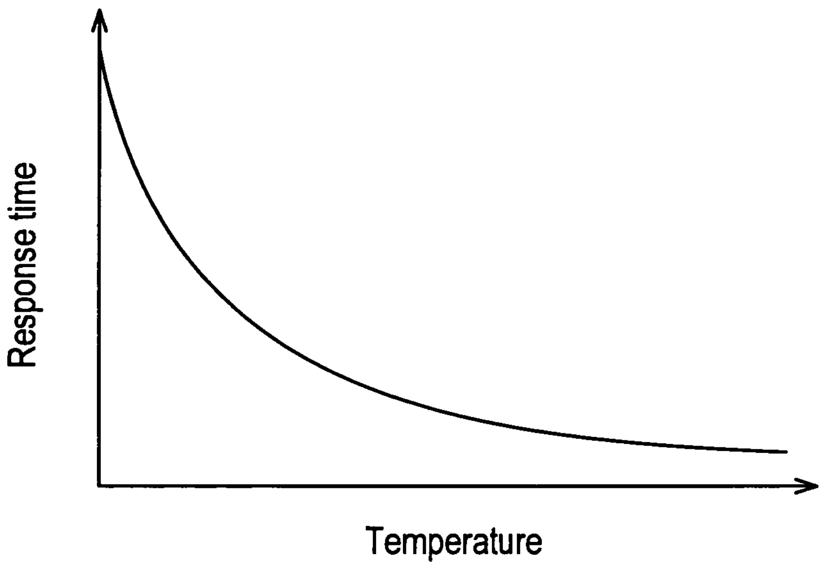
FIG. 39 is a characteristic chart showing the relationship between response time and temperature in a liquid crystal display of the present invention.

Further, it is common knowledge that the response speed of liquid crystal greatly depends on the temperature, particularly, liquid crystal presents extremely poor tracking of the input signal at low temperatures, presenting increase in response speed, as shown in FIG. 39. That is, when the device interior temperature is low, it is preferred that the backlight starts to be activated or the black display signal (image display signal) starts to be written in after when the liquid crystal fully reacts and reaches the set brightness, by providing a longer liquid crystal response time. Therefore, the user is able to set the optimal impulse ratio in accordance with the device interior temperature, whereby it is possible to improve the display quality of motion pictures by inhibiting occurrence of afterimages such as shadow tailing and the like in addition to improvement in image quality by prevention against blur injuries.

In particular, in a configuration where the impulse ratio is automatically changed in accordance with the device interior temperature (panel temperature) detected by a temperature sensor, when, for example, part of the display screen is put in a place where air is blown onto it from a room air-conditioner or in a sunny place or direct sunshine, the detected temperature by the temperature sensor may cause a serious error, resulting in failure to secure the optimal liquid crystal response time, hence causing afterimages such as shadow tailing and others. However, the configuration as in the fifth to eighth embodiments described above, permits the user to select the desired impulse ratio, hence makes it possible for the user to set the optimal impulse ratio suited to the device interior temperature (panel temperature). As a result, it is possible to always display optimal motion pictures for the user.

Also, the configuration that permits the user to select the desired impulse ratio enables the user to intentionally produce special video effects such as creating a shuddering (stroboscopic) motion or blurred motion (blur injury).

Industrial Applicability

The liquid crystal display according to the present invention is to prevent blur injury arising when displaying motion pictures by simulating impulse type display, and is suitable to monitors for liquid crystal television apparatus, computers, and others.

The invention claimed is:

1. A liquid crystal display device, comprising:

a section that detects a type of content of an image to be displayed on a liquid crystal display panel, based on electronic program information other than the image signal to be displayed and on additional information as to motion blur, the detected type of content being based on a classification defined in the electronic program information, where motion blur is blur recorded in the image signal due to at least one of relative subject motion and image shooting conditions during capture of the image;

a section that stores a plurality of predetermined illumination durations which respectively correspond to possible types of content of an image;

an electrode driver supplying a driving signal to at least one picture element; and a section that variably controls the illumination duration of a backlight within one frame period and the duration in which a black display signal is supplied from the electrode driver to at least one picture element of a liquid crystal display panel based on the detected type of content of the image according to the stored illumination duration which corresponds to the detected type of content of the image based on the classification defined in the electronic program information, wherein the image signal to be displayed is written into the liquid crystal display panel while the backlight is activated intermittently within the one frame period, the stored plurality of predetermined illumination durations are set in such a manner that:

the larger an amount of motion blur entailed in the image with respect to its detected type of content, the shorter the corresponding illumination duration within the one frame period, and the smaller the amount of motion blur entailed in the image with respect to its detected type of content, the longer the corresponding illumination duration within the one frame period.

2. The liquid crystal display device according to claim 1, wherein the backlight emits a flash of light over the full screen every one frame period in synchronization with a vertical synchronizing signal supplied to the liquid crystal display panel.

3. The liquid crystal display device according to claim 1, wherein the backlight is operated so that multiple luminous sections are activated, one to the next, scan-wise in synchronization with vertical and horizontal synchronizing signals supplied to the liquid crystal display panel.

4. The liquid crystal display device according to claim 1, wherein the luminous intensity of the backlight is varied in accordance with the illumination duration of the backlight.

5. The liquid crystal display device according to claim 1, wherein the gray scale levels of the input image signal are varied depending on the illumination duration of the backlight such that a relationship between the input image signal and the display brightness is held constant.

6. The liquid crystal display device according to claim 1, wherein gray scale voltages applied to the liquid crystal display panel in response to the input image signal are varied depending on the illumination duration of the backlight such that a relationship between the input image signal and the display brightness is held constant.

7. The liquid crystal display device according to claim 1, wherein the frame frequency of the input image signal is varied based on the detected type of content of the image.

8. The liquid crystal display device according to claim 1, wherein the electronic program information is included in program guide information included in broadcast data.

9. The liquid crystal display device according to claim 1, wherein the electronic program information is included in contents information obtained from external media.

10. The liquid crystal display device according to claim 1, wherein the electronic program information is based on video source select command information input by the user.

11. A liquid crystal display device, comprising:

a section that detects a type of content of an image to be displayed on a liquid crystal display panel, based on electronic program information other than an image signal to be displayed and on additional information as to motion blur, the type of content being based on a classification defined in the electronic program information, where motion blur is blur recorded in the image signal due to at least one of relative subject motion and image shooting conditions during capture of the image;

a section that stores a plurality of predetermined illumination durations, for illumination of a backlight, which respectively correspond to possible types of content of an image;

a driving section configured to drive the liquid crystal display panel; and a section that variably controls a duration in which a black display signal is supplied from the driving section to the liquid crystal display panel and an illumination duration of a backlight within one frame period based on the detected type of content of the image according to the stored illumination duration which corresponds to the detected type of content of the image based on the classification defined in the electronic program information, wherein the image signal to be displayed and the black display signal are written into picture elements of the liquid crystal display panel within one frame period, the stored plurality of predetermined illumination durations are set in such a manner that:

the larger an amount of motion blur entailed in the image with respect to its detected type of content, the shorter the corresponding illumination duration within the one frame period, and the smaller the amount of motion blur entailed in the image with respect to its detected type of content, the longer the corresponding illumination duration within the one frame period.

12. The liquid crystal display device according to claim 11, wherein the luminous intensity of the backlight that illuminates the liquid crystal display panel is varied in accordance with the application duration of the black display signal.

13. The liquid crystal display device according to claim 11, wherein the gray scale levels of the input image signal are varied depending on the application duration of the black display signal such that a relationship between the input image signal and the display brightness is held constant.

14. The liquid crystal display device according to claim 11, wherein the gray scale voltages applied to the liquid crystal display panel in response to the input image signal are varied depending on the application duration of the black display signal such that a relationship between the input image signal and the display brightness is held constant.

15. The liquid crystal display device according to claim 11, wherein the electronic program information is included in electronic program guide information included in broadcast data.

16. The liquid crystal display device according to claim 11, wherein the electronic program information is included in contents information obtained from external media.

17. The liquid crystal display device according to claim 11, wherein the electronic program information is based on video source select command information input by the user.

18. A liquid crystal display device, comprising:

a section that detects a type of content of an image to be displayed on a liquid crystal display panel, based on electronic program information other than an image signal to be displayed and on additional information as to motion blur, the type of content being based on a classification defined in the electronic program information, where motion blur is blur recorded in the image signal due to at least one of relative subject motion and image shooting conditions during capture of the image;

a section that stores a plurality of predetermined illumination durations which respectively correspond to possible types of content of an image; and a section that variably controls a ratio of display duration of the image signal in one frame period and an illumination duration of a backlight within one frame period, based on the detected type of content of the image according to the stored illumination duration which corresponds to the detected type of content of the image based on the classification defined in the electronic program information, wherein display duration of the image signal and non-display duration are provided in the one frame period, the stored plurality of predetermined illumination durations are set in such a manner that:

the larger an amount of motion blur entailed in the image with respect to its detected type of content, the shorter the corresponding illumination duration within the one frame period, and the smaller the amount of motion blur entailed in the image with respect to its detected type of content, the longer the corresponding illumination duration within the one frame period.

19. The liquid crystal display device according to claim 18, wherein the gray scale levels of the input image signal are varied depending on the ratio of the display duration of the image signal in the one frame period such that a relationship between the input image signal and the display brightness is held constant.

20. The liquid crystal display device according to claim 18, wherein gray scale voltages applied to the liquid crystal display panel in response to the input image signal are varied depending on the ratio of the display duration of the image signal in the one frame period such that a relationship between the input image signal and the display brightness is held constant.

21. The liquid crystal display device according to claim 18, wherein the electronic program information is included in electronic program guide information included in broadcast data.

22. The liquid crystal display device according to claim 18, wherein the electronic program information is included in contents information obtained from external media.

23. The liquid crystal display device according to claim 18, wherein the electronic program information is based on video source select command information input by the user.

24. A liquid crystal display device, comprising:

a section that detects a user's instructional input designating classification of type of content to be displayed;

an electrode driver supplying a driving signal to at least one picture element; and a section that variably controls the duration in which a black display signal is supplied from the electrode driver to the at least one picture element of a liquid crystal display panel and an illumination duration of a backlight within one frame period based on the classification of the type of content provided by the user's instructional input, wherein an image signal to be displayed and the black display signal are written into the at least one picture element of the liquid crystal display panel within one frame period, and gray scale levels of the input image signal applied to the at least one picture element are varied depending on the application duration of the black display signal such that a relationship between the input image signal and the display brightness is held constant.

25. The liquid crystal display device according to claim 24, wherein the luminous intensity of a backlight that illuminates the liquid crystal display panel is varied in accordance with the application duration of the black display signal.

26. A liquid crystal display device, comprising:

a section that detects a user's instructional input designating classification of type of content to be displayed;

an electrode driver supplying a driving signal to at least one picture element; and a section that variably controls the duration in which a black display signal is supplied from the electrode driver to the at least one picture element of a liquid crystal display panel and an illumination duration of a backlight within one frame period based on the classification of the type of content provided by the user's instructional input, wherein an image signal to be displayed and the black display signal are written into the at least one picture element of liquid crystal display panel within one frame period, and gray scale voltages applied to the at least one picture element of the liquid crystal display panel in response to the input image signal are varied depending on the application duration of the black display signal such that a relationship between the input image signal and the display brightness is held constant.

27. The liquid crystal display device according to claim 24, wherein the application duration of the black display signal is varied based on video source select command information input by the user.

28. The liquid crystal display device according to claim 24, wherein the application duration of the black display signal is varied based on video adjustment command information input by the user.

29. A liquid crystal display device comprising:

a section that detects a user's instruction designating classification of type of content to be displayed; and a section that variably controls a ratio of display duration of an image signal within one frame period and an illumination duration of a backlight within one frame period, based on the classification of the type of content provided by the detected user's instruction, wherein the display duration of the image signal and non-display duration are provided in the one frame period, and the gray scale levels of the input image signal to be applied to picture elements of a liquid crystal display panel of the liquid crystal display device are varied depending on the ratio of the display duration of the image signal in the one frame period such that a relationship between the input image signal and the display brightness is held constant.

30. A liquid crystal display device comprising:

a section that detects a user's instructional input designating classification of type of content to be displayed; and a section that variably controls a ratio of display duration of an image signal within one frame period and an illumination duration of a backlight within one frame period, based on the classification of the type of content provided by the detected user's instructional input, wherein the display duration of the image signal and non-display duration are provided in the one frame period, and gray scale voltages applied to picture elements of the liquid crystal display panel in response to the input image signal are varied depending on the ratio of the display duration of the image signal in the one frame period such that a relationship between the input image signal and the display brightness is held constant.

31. The liquid crystal display device according to claim 29, wherein the ratio of the display duration of the image signal in the one frame period is varied based on video source select command information input by the user.

32. The liquid crystal display device according to claim 29, wherein the ratio of the display duration of the image signal in the one frame period is varied based on video adjustment command information input by the user.

33. The liquid crystal display device according to claim 26, wherein the luminous intensity of a backlight that illuminates the liquid crystal display panel is varied in accordance with the application duration of the black display signal.

34. The liquid crystal display device according to claim 26, wherein the application duration of the black display signal is varied based on video source select command information input by the user.

35. The liquid crystal display device according to claim 26, wherein the application duration of the black display signal is varied based on video adjustment command information input by the user.

36. The liquid crystal display device according to claim 30, wherein the ratio of the display duration of the image signal in the one frame period is varied based on video source select command information input by the user.

37. The liquid crystal display device according to claim 30, wherein the ratio of the display duration of the image signal in the one frame period is varied based on video adjustment command information input by the user.

* * * * *